US012779897B2

(12) United States Patent
McGee

(10) Patent No.: US 12,779,897 B2
(45) Date of Patent: Nov. 3, 2026

(54) CARPENTER TOOLS

(71) Applicant: Daniel Wayne McGee, Young, AZ (US)

(72) Inventor: Daniel Wayne McGee, Young, AZ (US)

( * ) Notice: Subject to any disclaimer, the term of this patent is extended or adjusted under 35 U.S.C. 154(b) by 0 days.

(21) Appl. No.: 18/940,155

(22) Filed: Nov. 7, 2024

(65) Prior Publication Data

US 2025/0058580 A1 Feb. 20, 2025

Related U.S. Application Data

(63) Continuation of application No. 18/231,835, filed on Aug. 9, 2023, now Pat. No. 12,145,397, which is a continuation of application No. 18/132,075, filed on Apr. 7, 2023, now Pat. No. 11,987,069, which is a continuation-in-part of application No. 17/715,460, filed on Apr. 7, 2022, now Pat. No. 11,780,260.

(60) Provisional application No. 63/442,110, filed on Jan. 30, 2023.

(51) Int. Cl.

| | |
|---|---|
| ***B43L 7/12*** | (2006.01) |
| ***B43L 7/027*** | (2006.01) |
| ***B43L 13/02*** | (2006.01) |
| ***G01B 3/56*** | (2006.01) |
| ***G01C 9/18*** | (2006.01) |
| ***G01C 15/00*** | (2006.01) |
| *B25H 7/00* | (2006.01) |
| *B43L 12/02* | (2006.01) |

(52) U.S. Cl.
CPC ............... *B43L 7/0275* (2013.01); *B43L 7/12* (2013.01); *B43L 13/028* (2013.01); *G01B 3/566* (2013.01); *G01C 9/18* (2013.01); *G01C 15/002* (2013.01); *B25H 7/00* (2013.01); *B43L 12/02* (2013.01)

(58) Field of Classification Search
CPC ........ B43L 7/0275; B43L 7/12; B43L 13/028; B43L 12/02; G01B 3/566; G01C 9/18; G01C 15/002; B25H 7/00
See application file for complete search history.

(56) References Cited

U.S. PATENT DOCUMENTS 456,086 A * 7/1891 Forwood .................. G01C 9/36 33/390
1,159,516 A * 11/1915 Machin et al. .......... G01C 9/34 33/390
1,204,768 A * 11/1916 Hommel .................. G01C 9/36 33/390
1,233,756 A * 7/1917 Cox ......................... G01C 9/28 33/379

(Continued)

*Primary Examiner* — Yaritza Guadalupe-Mccall
(74) *Attorney, Agent, or Firm* — Galvani Smith PLLC; Thomas W. Galvani; Rowan P. Smith

(57) ABSTRACT

A carpenter tool including a body having a first edge and a second edge, a bubble level carried in the body, the bubble level having a tubular sidewall terminating at opposed first and second closed ends. The tubular sidewall has a first section and a second section, wherein at least one of the first and second sections is parallel to at least one of the first and second edges. The first and second sections are oriented normally with respect to each other. The first and second sections are joined to each other in fluid communication and partially filled with a fluid and a bubble in the fluid, such that the bubble is enabled to move between the first and second sections freely.

16 Claims, 31 Drawing Sheets

(56) References Cited

U.S. PATENT DOCUMENTS 1,784,550 A * 12/1930 Sinner ...................... G01C 9/34 33/390
2,770,889 A * 11/1956 Allegretti ................. G01C 9/26 33/381
3,584,212 A * 6/1971 Hansen .................... G01C 9/18 362/802
4,854,047 A * 8/1989 Conanan .................. G01C 9/20 33/451
4,912,854 A * 4/1990 Weadon ................... G01C 9/28 33/379
5,157,842 A * 10/1992 Swanda ................... G01C 9/10 33/365
5,476,258 A * 12/1995 Frisone .................... G01C 9/10 473/406
6,098,300 A * 8/2000 Angelucci ................ G01C 9/26 33/379
6,230,416 B1 * 5/2001 Trigilio ................ G01C 15/008 33/DIG. 21
6,386,994 B1 * 5/2002 H'Doubler ......... A63B 69/3676 33/379
6,779,276 B1 * 8/2004 Turner ..................... G01C 9/34 33/351
7,398,601 B2 * 7/2008 Morrell .................... B25H 7/00 33/429
7,775,899 B1 * 8/2010 Cannon .............. A63B 69/3632 473/226
7,882,643 B1 * 2/2011 Portinen .................. G01B 3/04 33/474
8,109,005 B2 * 2/2012 Hudson .................... G01C 9/14 33/379
8,146,260 B1 * 4/2012 Visser ................... B43L 13/028 33/418
9,429,424 B2 * 8/2016 Butler ................... B43L 7/0275
10,634,493 B2 * 4/2020 Norris ...................... G01C 9/16
11,161,366 B2 * 11/2021 Walsh ................... B43L 7/0275
11,780,260 B1 * 10/2023 McGee ................. B43L 13/028 33/474
11,987,069 B2 * 5/2024 McGee .................... G01C 9/18
12,145,397 B2 * 11/2024 McGee ................. B43L 7/0275
2004/0172839 A1 * 9/2004 Zirk ...................... B26B 11/008 33/451
2005/0155241 A1 * 7/2005 Scheyer ................. G01C 25/00 33/379
2005/0223576 A1 * 10/2005 Scarborough ............ G01C 9/34 33/379
2005/0223578 A1 * 10/2005 Scarborough ............ G01C 9/28 33/451
2010/0005671 A1 * 1/2010 Hudson .................... G01C 9/18 33/377
2010/0139106 A1 * 6/2010 Atwood .................... B43L 7/12 33/418
2010/0257745 A1 * 10/2010 Sparrow .................. G01C 9/32 33/379
2012/0324746 A1 * 12/2012 Hanson .................... G01C 9/18 33/377
2013/0227846 A1 * 9/2013 Buzzell ................. B43L 7/0275 33/32.2
2016/0047650 A1 * 2/2016 Butler ................... B43L 7/0275 33/381
2023/0322011 A1 * 10/2023 McGee .................... G01C 9/18
2023/0322012 A1 * 10/2023 McGee ................. B43L 13/028
2023/0382150 A1 * 11/2023 McGee ................ G01C 15/002
2024/0142209 A1 * 5/2024 Kysar ...................... G01C 9/28
2024/0310170 A1 * 9/2024 Palatshe ................... G01C 9/34
2025/0058580 A1 * 2/2025 McGee ................ G01C 15/002

* cited by examiner

CARPENTER TOOLS

CROSS-REFERENCE TO RELATED APPLICATIONS

This application is a continuation of and claims the benefit of prior U.S. patent application Ser. No. 18/231,835, filed Aug. 9, 2023, which is a continuation of and claims the benefit of prior U.S. patent application Ser. No. 18/132,075, filed Apr. 7, 2023. U.S. patent application Ser. No. 18/132,075 is a continuation-in-part of and claims the benefit of prior U.S. patent application Ser. No. 17/715,460, filed Apr. 7, 2022 (now U.S. Pat. No. 11,780,260, issued Oct. 10, 2023), and U.S. patent application Ser. No. 18/132,075 also claims the benefit of U.S. Provisional Application No. 63/442,110, filed Jan. 30, 2023. All of the above-identified applications are hereby incorporated by reference in their entireties.

FIELD

The present specification relates generally to hand tools, and more particularly to carpenter squares.

BACKGROUND

Carpenters and other tradesmen use a variety of tools in their lines of work. Some tools are specifically designed for certain jobs, while other tools are useful in a wide range of applications. One tool that is frequently used is a carpenter's square or carpenter square.

Conventionally, a carpenter square is a triangular piece of plastic or metal having two short sides extending out from a right corner and a longer hypotenuse side between the two short sides. One of the short sides has a fence, which is a length of material fixed to the side but aligned normal to the body of the square. The fence thus projects outwardly from both sides of the square, which makes it very easy to lay the square against a straight edge of a workpiece and draw lines at a right angle to the straight edge.

The carpenter square is a staple tool in any tradesman's quiver. Yet, all tools are subject to improvement, and the carpenter square has had relatively few and minor changes since it was introduced. There is a need to improve the carpenter square.

SUMMARY

According to an embodiment described herein, a carpenter tool includes a body having a first edge and a second edge, a bubble level carried in the body, the bubble level having a tubular sidewall terminating at opposed first and second closed ends. The tubular sidewall has a first section and a second section, wherein at least one of the first and second sections is parallel to at least one of the first and second edges. The first and second sections are oriented normally with respect to each other. The first and second sections are joined to each other in fluid communication and partially filled with a fluid and a bubble in the fluid, such that the bubble is enabled to move between the first and second sections freely.

According to an embodiment described herein, a carpenter tool includes a triangular body having a hypotenuse edge opposite a right corner, a first edge extending between the right corner and the hypotenuse edge, and a second edge extending between the right corner and the hypotenuse edge opposite the first edge. A fence is pivoted to the first edge for movement between first and second positions. In the first position, the fence is normal to the triangular body. In the second position, the fence is coplanar to the triangular body.

In embodiments, a carpenter tool has a triangular body which includes opposed first and second body faces, and the fence includes opposed first and second fence faces. In the first position, the first body face is normal to the first and second fence faces, and the second body face is normal to the first and second fence faces. In the second position, the first body face is coplanar to the first and second fence faces, and the second body face is coplanar to the first and second fence faces. The tool includes a first set of measurements along the second edge, the first set of measurements corresponding to a first zero location defined by the fence in the first position, and a second set of measurements along the second edge, the second set of measurements corresponding to a second zero location defined by the fence in the second position, wherein the second zero location is offset from the first zero location. A hinge assembly pivots the fence to the first edge. The hinge assembly includes a notch in one of the triangular body and the fence, and a tab projecting from the other of the triangular body and the fence, respectively, wherein the tab is mounted in the notch for swinging movement within the notch between first and second positions corresponding to the first and second positions of the fence. The tab moves between a neutral stance and an advanced stance. In the neutral stance, the tab disables movement of the fence between the first and second positions, and in the advanced stance, the tab enables movement of the fence between the first and second positions. The tab moves reciprocally between the neutral and advanced stances.

In an embodiment, a carpenter tool includes a triangular body having a hypotenuse edge opposite a right corner, a first edge extending between the right corner and the hypotenuse edge, and a second edge extending between the right corner and the hypotenuse edge opposite the first edge, a fence pivoted to the first edge for movement between first and second positions, and a first set of measurements along the second edge. The first set of measurements correspond to a first zero location defined by the fence in the first position, and a second set of measurements along the second edge correspond to a second zero location defined by the fence in the second position, wherein the second zero location is offset from the first zero location.

In embodiments of the tool, in the first position of the fence, the fence is normal to the triangular body, and in the second position of the fence, the fence is coplanar to the triangular body. The triangular body includes opposed first and second body faces, and the fence includes opposed first and second fence faces. In the first position of the fence, the first body face is normal to the first fence face, and the second body face is normal to the second fence face. In the second position of the fence, the first body face is coplanar to the first fence face, and the second body face is coplanar to the second fence face. A hinge assembly pivots the fence to the first edge. The hinge assembly includes a notch in one of the triangular body and the fence, and a tab projects from the other of the triangular body and the fence, respectively, wherein the tab is mounted in the notch for swinging movement within the notch between first and second positions corresponding to the first and second positions of the fence. The tab moves between a neutral stance and an advanced stance. In the neutral stance, the tab disables movement of the fence between the first and second positions, and in the advanced stance, the tab enables movement of the fence between the first and second positions. The tab moves reciprocally between the neutral and advanced stances.

In an embodiment, a carpenter tool includes a body having a first edge, a second edge, and a third edge, wherein the first, second, and third edges cooperate to define a perimeter edge of the body. A fence is pivoted to the first edge for movement between first and second positions. In the first position, the fence is normal to the body, and in the second position, the fence is coplanar to the body.

In embodiments, the body includes opposed first and second body faces, and the fence includes opposed first and second fence faces. In the first position of the fence, the first body face is normal to the first fence face. In the second position of the fence, the first body face is coplanar to the first fence face. A first set of measurements is along the second edge, and the first set of measurements correspond to a first zero location defined by the fence in the first position. A second set of measurements is along the second edge and correspond to a second zero location defined by the fence in the second position, wherein the second zero location is offset from the first zero location. A hinge assembly pivots the fence to the first edge. The hinge assembly includes a notch in one of the body and the fence, and a tab projecting from the other of the body and the fence, respectively, wherein the tab is mounted in the notch for movement within the notch between first and second positions when the fence moves between the first and second positions. The tab moves between a neutral stance and an advanced stance. In the neutral stance, the tab disables movement of the fence between the first and second positions, and in the advanced stance, the tab enables movement of the fence between the first and second positions.

BRIEF DESCRIPTION OF THE DRAWINGS

Referring to the drawings.

DETAILED DESCRIPTION

Figure 1A:
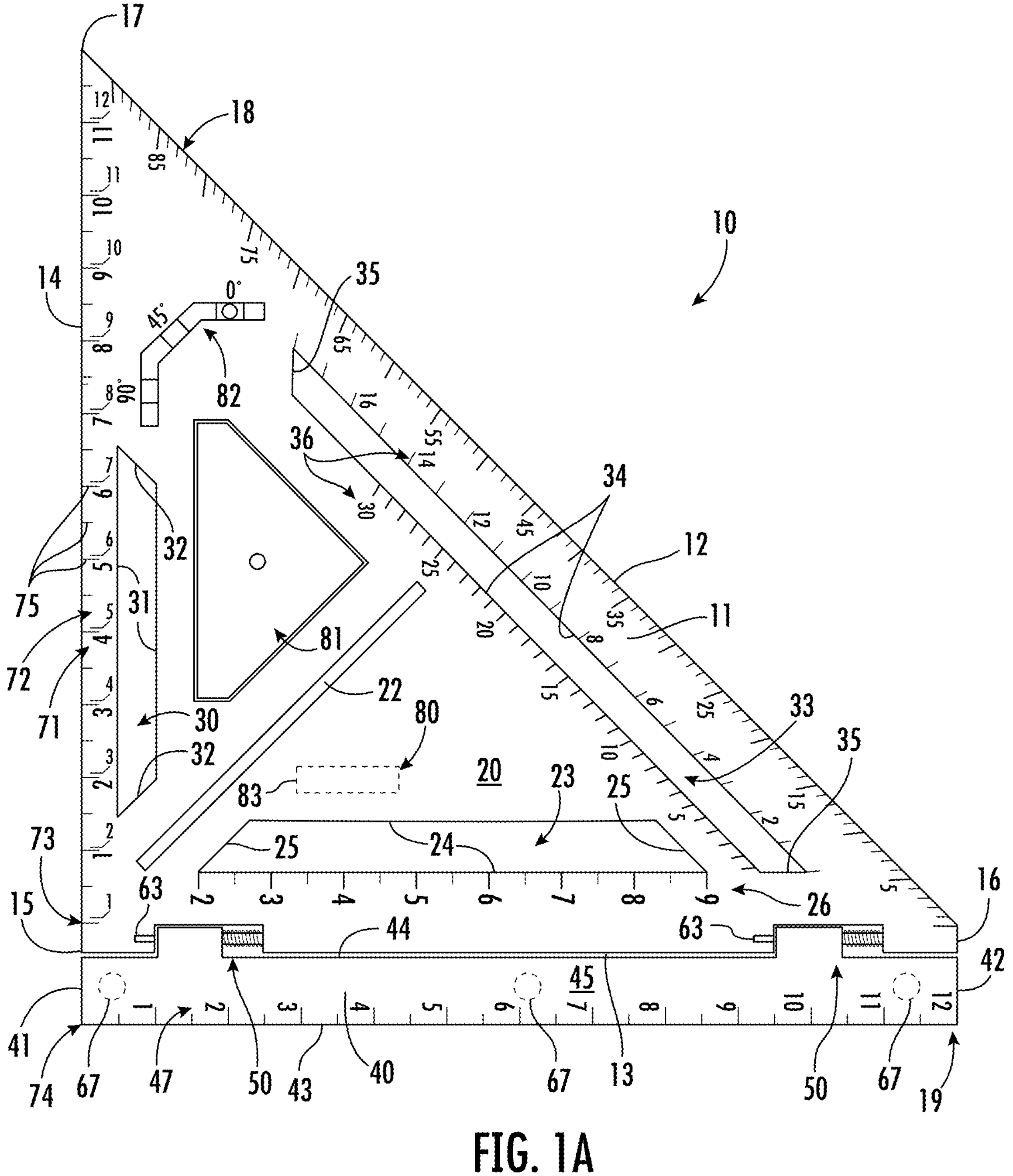
FIGS. 1A, 1B, and 1C are elevation and perspective views of an embodiment of an improved carpenter square having a fence mounted for swinging movement.

Reference now is made to the drawings, in which the same reference characters are used throughout the different figures to designate the same elements. Briefly, the embodiments presented herein are preferred exemplary embodiments and are not intended to limit the scope, applicability, or configuration of all possible embodiments, but rather to provide an enabling description for all possible embodiments within the scope and spirit of the specification. Description of these preferred embodiments is generally made with the use of verbs such as "is" and "are" rather than "may," "could," "includes," "comprises," and the like, because the description is made with reference to the drawings presented. One having ordinary skill in the art will understand that changes may be made in the structure, arrangement, number, and function of elements and features without departing from the scope and spirit of the specification. Further, the description may omit certain information which is readily known to one having ordinary skill in the art to prevent crowding the description with detail which is not necessary for enablement. Indeed, the diction used herein is meant to be readable and informational rather than to delineate and limit the specification; therefore, the scope and spirit of the specification should not be limited by the following description and its language choices.

Figure 1B:
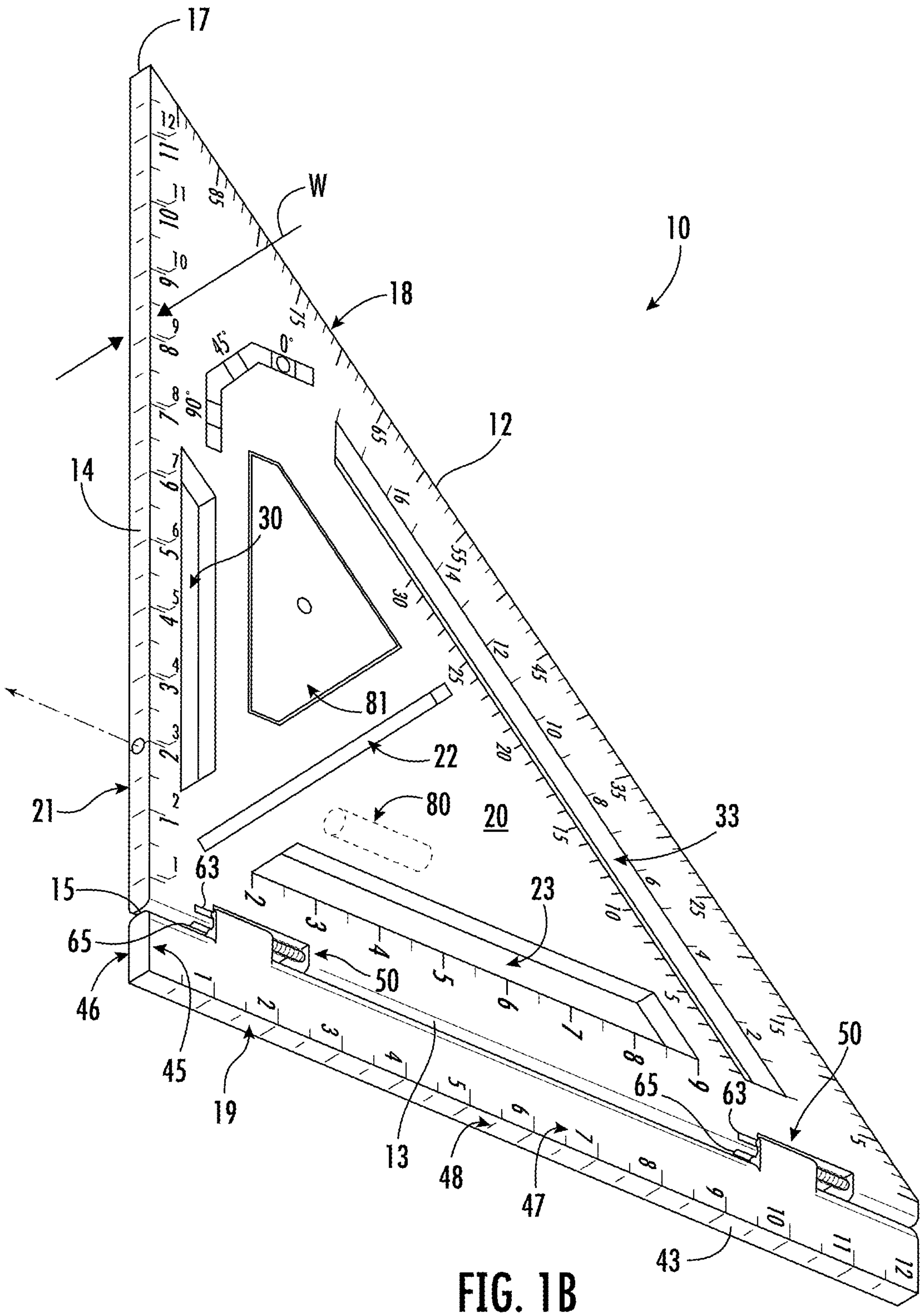
Figure 1C:
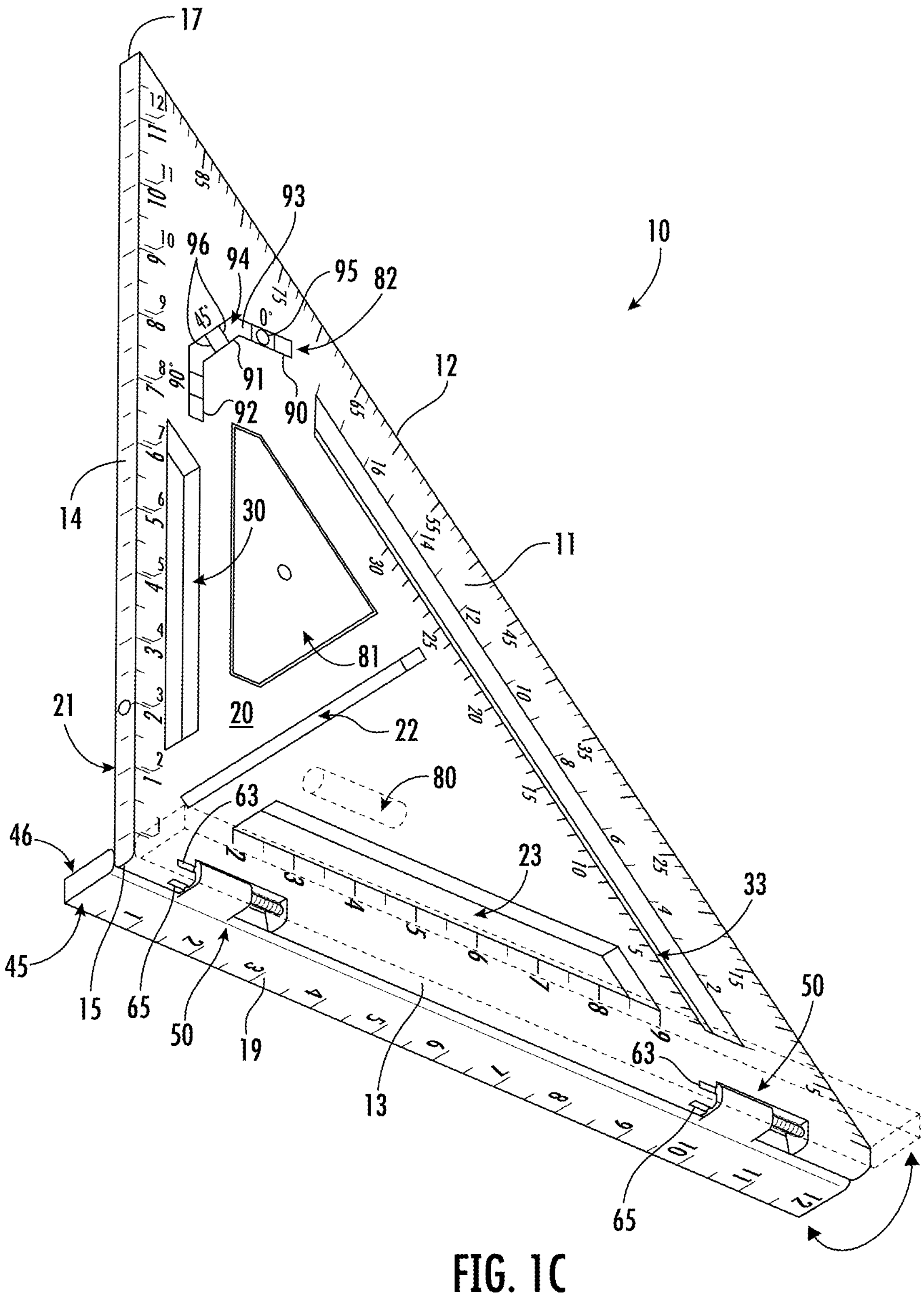

FIGS. 1A-1C illustrate a carpenter square 10. The square includes a body 11 having three edges. The square 10 has: 1) a hypotenuse edge 12 opposite a right corner 15; 2) a short first edge 13 extending between the right corner 15 and a first corner 16 formed by and between the short first edge 13 and the hypotenuse edge 12; and 3) a short second edge 14 extending between the right corner 15 and a second corner 17 formed by and between the short second edge 14 and the hypotenuse edge 12. These three edges cooperate to define a perimeter edge 18 of the body 11 of the square 10 itself.

Pivoted to the first edge 13 is a fence 19. The fence 19 is a roughly rectangular piece of material coextensive to the first edge 13. The fence 19 pivots between preferably three indexed positions. In a first position of the fence 19, shown in solid line in FIG. 1C, the fence 19 is normal to the body 11 in a first direction (into the paper, or away from the reader). In a second position of the fence 19, shown in broken line in FIG. 1C, the fence 19 is normal to the body 11 in a second direction, opposite the first direction (out of the paper, or toward the reader). In a third position, the fence 19 is coplanar to the body 11, as shown in solid line in both FIGS. 1A and 1B.

When the fence 19 is in the first or second positions, a carpenter can lay the fence 19 flat on a surface and against a straight edge and mark lines on the surface. The normal arrangement of the fence 19 to the body 11 of the square 10 makes quick alignment of the square 10 easy. If the carpenter desires to lay the body 11 of the square 10 entirely on the workpiece and at least partially inboard from the straight edge, however, he need only move the fence 19 to the third position, such that the fence 19 is aligned coplanar to the body 11 and the entirety of the square 10 can be laid flat on the workpiece.

The body 11 of the square 10 is generally triangular, because the perimeter edge 18 generally has three major sides or lengths. The first and second edges 13 and 14 meet at the right corner 15, and the second edge 14 and hypotenuse edge 12 meet at the acute second corner 17. The first edge 13 and hypotenuse edge 12 meet at the first corner 16, which is acute, but is blunted or truncated by a short fourth edge. As such, the perimeter edge 18 technically has four sides or four edges, but the very short side at the first corner 16 is so small that the three major sides of the edges 12, 13, and 14 dominate the appearance of the square 10 such that the body 11 generally is triangular. In this way, the square 10 somewhat peculiarly has a triangular body 11 defined by a perimeter edge 18 with four sides.

The body 11 is preferably constructed from a material or combination of materials with rugged, strong, durable, and hard material characteristics. Preferably, the body 11 is made from metal, hard wood, plastic, or like materials offering these characteristics.

The body 11 has a first face 20 and an opposed second face 21. The faces 20 and 21 are flat and parallel to each other, spaced apart by a width W of the body 11, as shown in FIG. 1B. The faces 20 and 21 are marked with a plurality of indications and measurements. Moreover, slots and slits are formed through the body 11 entirely from one face 20 through to the other face 21. For example, in the embodiment shown in FIGS. 1A-1C, a medial slit 22 extends diagonally through the body 11. The medial slit 22 is linear or straight. The medial slit 22 has a first end just inboard from the right corner 15, extends generally at a forty-five-degree angle with respect to both the first and second edges 13 and 14, and terminates at an opposed second end well inboard of the hypotenuse edge 12. In other embodiments, the medial slit 22 has other shapes, orientations, and arrangements, and the embodiment shown in FIGS. 1A-1C is not limiting. The medial slit 22 may be useful for making markings on the workpiece below the square 10, but is especially useful with a jig block for laying out cut patterns, as is described below.

Two slots, each wider than the medial slit 22, are formed inboard of the first and second edges 13 and 14. Referring primarily to FIG. 1A, a first slot 23 is parallel to and inboard of the first edge 13. The first slot 23 has opposed major sides 24 and opposed diagonal minor ends 25. The major sides 24 are both parallel to the first edge 13, and the major side 24 proximate to the first edge 13 is larger than the major side 24 distal to the first edge 13. The minor ends 25 are diagonal and directed inward at approximately forty-five degrees, such that the minor end 25 proximate the second edge 14 is canted away from the second edge 14 and the minor end 25 distal to the second edge 14 is canted toward the second edge 14. Thus, the first slot 23 has the appearance of an isosceles trapezoid. The first slot 23 is open such that a pencil can be passed through the first slot 23 to make markings on a workpiece underneath the first slot 23. Along the major side 24 which is proximate the first edge 13 of the square 10, the first face 20 is marked with measured indicators 26. In this embodiment, the measured indicators 26 are inch and half-inch markings, measured from the second edge 14. Since the first slot 23 is offset from the second edge 14, the first of the measured indicators is a two-inch marking. In other embodiments, the first slot 23, if existent, has other shapes, orientations, and arrangements.

A second slot 30 is parallel to and inboard of the second edge 14. The second slot 30 has opposed major sides 31 and opposed diagonal minor ends 32. The major sides 31 are both parallel to the second edge 14, and the major side 31 proximate to the second edge 14 is larger than the major side 31 distal to the second edge 14. The minor ends 32 are diagonal and directed inward at approximately forty-five degrees, such that the minor end 32 proximate the first edge 13 is canted away from the first edge 13 and the minor end 32 distal to the first edge 13 is canted toward the first edge 13. Thus, the second slot 30 has the appearance of an isosceles trapezoid. Like the first slot 23, the second slot 30 is open such that a pencil can be passed through it to make markings on a workpiece underneath. In other embodiments, the second slot 30, if existent, has other shapes, orientations, and arrangements.

Another slot, a hypotenuse slot 33, is formed inboard of the hypotenuse edge 12. The hypotenuse slot 33 is parallel to and inboard of the hypotenuse edge 12. The hypotenuse slot 33 has opposed major sides 34 and opposed diagonal minor ends 35. The major sides 34 are both parallel to the hypotenuse edge 12, and the major side 34 proximate to the hypotenuse edge 12 is larger than the major side 34 distal to the hypotenuse edge 12. The minor ends 35 are diagonal and directed inward at approximately forty-five degrees, such that the minor end 35 proximate the first edge 13 is parallel to the first edge 13 and the minor end 35 proximate to the second edge 14 is parallel to the second edge 14. Thus, the hypotenuse slot 33 has the appearance of an isosceles trapezoid. The hypotenuse slot 33 is also open such that a pencil can be passed through it to make markings on a workpiece underneath. Along both major sides 34, the first face 20 is marked with measured indicators 36. In other embodiments, the hypotenuse slot 33, if existent, has other shapes, orientations, and arrangements.

The fence 19 is hinged to the body 11 to move between the three indexed positions. Although in other embodiments, the fence 19 pivots between an alternate number of positions, the embodiment shown here pivots between three for ease and clarity of understanding. After reading this description, one having ordinary skill in the art will readily appreciate how the fence 19 moves among an alternate number of positions in such other embodiments.

The fence 19 has a body 40 which is generally rectangular prismatic and which extends between two opposed ends 41 and 42. The ends 41 and 42 are flat and parallel to each other, and both are parallel to the second edge 14. The body 40 of the fence 19 includes a fence edge 43 extending between the two ends 41 and 42. The fence edge 43 is straight and uninterrupted by notches, projections, divots, or other features which would prevent the fence edge 43 from defining a straight line. Opposite the fence edge 43, the body 40 includes an inner edge 44 directed toward the first edge 13 of the body 11 of the square 10. Like the first edge 13, the inner edge 44 is interrupted by hinge assemblies which couple the fence 19 to the body 11 of the square 10. Both the first edge 13 and the inner edge 44 are slightly rounded with fillets or chamfers so that the fence 19 smoothly pivots with respect to the body 11 without interruption or catching.

The body 40 of the fence 19 has a first face 45 and an opposed second face 46. The faces 45 and 46 are flat and parallel to each other, spaced apart by the same width W that defines the width of the body 11 of the square 10. When the fence 19 is arranged in its third position, the first face 45 of the fence 19 is registered with and coplanar to the first face 20 of the body 11, and the second face 46 is registered with and coplanar to the second face 20 of the body 11. The first and second faces 45 and 46 are both marked with measured indicators 47 along the fence edge 43. The measured indicators 47 on the first and second faces 45 and 46 are the same, starting at the first end 41 and increasing in number toward the opposed end 42. The fence edge 43 also carries measured indicators 48 which are registered with the measured indicators 47. However, while the measured indicators 47 preferably include tick or hash marks as well as numbers, the measured indicators 48 preferably only include hash marks due to the limited space available on the fence edge 43. The carpenter can easily sight the numbers on the adjacent first or second face 45 or 46 to identify the measurement.

The fence 19 mounts to the body 11 of the square 10 at preferably two hinge assemblies 50 including structural features and elements on both the fence 19 and the body 11. Referring now to the enlarged views of FIGS. 2A-2D, the hinge assembly 50 proximate the second edge 14 is shown. The two hinge assemblies 50 are identical in structure and differ only in location, and as such, the reader will understand that the description of this hinge assembly 50 applies equally to the description of the other hinge assembly 50. In other embodiments, there may be fewer or more hinge assemblies 50. FIGS. 2A-2D illustrate the opposite side of the square 10 from that shown in FIGS. 1A-1C, namely, FIGS. 2A-2D show the second face 21 instead of the first face 20.

The first edge 13 has rounded chamfers or fillets 51 at both the first and second faces 20 and 21. The fillets 51 allow the fence 19 to pivot when it moves among positions. Inboard of the second edge 14, a notch 52 interrupts the first edge 13. The notch 52 is blind and extends into the body 11 of the square 10, terminating at an inner wall, which extends between two sides 53 and 54 of the notch 52. The notch 52 defines a receiving space complemental to a tab 55 on the fence 19 which fits into the notch 52.

The tab 55 is an integral, unitary, monolithic projection of the body 40 at the inner edge 44 of the fence 19. The tab 55 has two opposed ends 56 and 57 normal to the inner edge 44 and an inner edge 58 extending between the ends 56 and 57. Like the inner edge 44 of the fence 19 itself, the inner edge 58 is rounded. The distance between the ends 56 and 57 is approximately half to two-thirds of the distance between the sides 53 and 54 of the notch 52, and so the tab 55 fits easily within the notch 52.

Figure 2A:
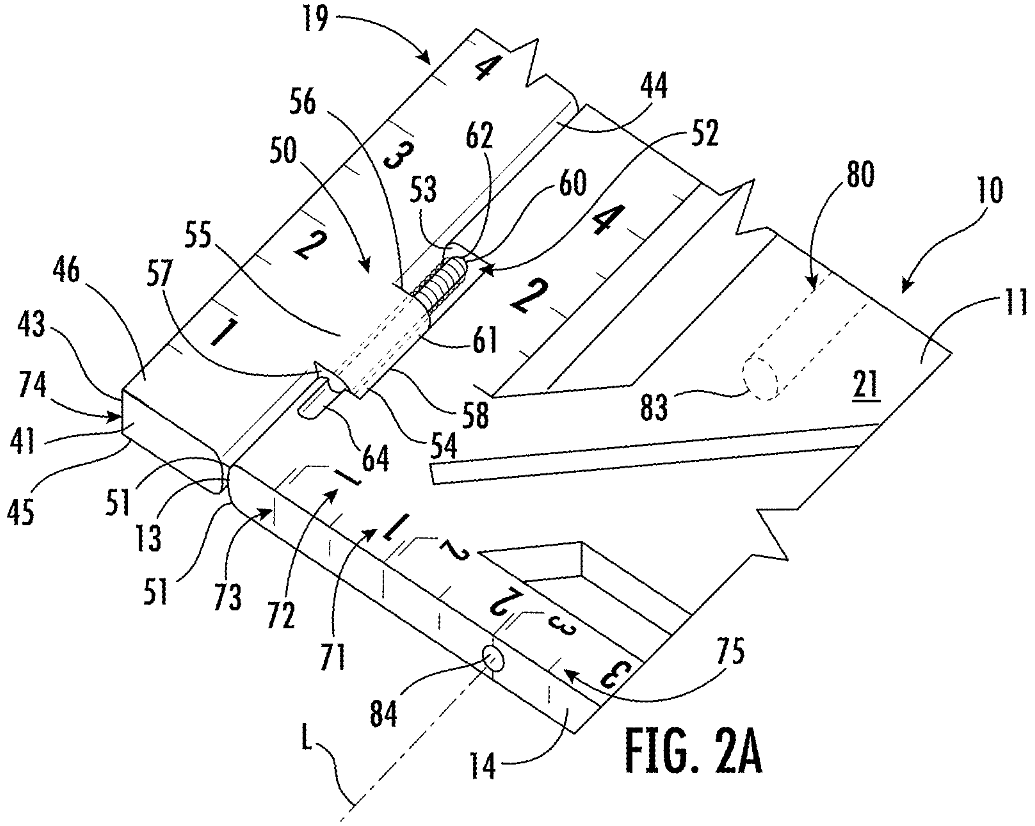
FIGS. 2A-2D are enlarged perspective views of the fence of the improved carpenter square of FIG. 1A, showing the fence moving between positions.

The tab 55 is mounted on a pin or axle 60. Preferably, a bore 61 extends entirely through the tab 55 between its ends 56 and 57. The axle 60 is mounted between the sides 53 and 54 of the notch 52 and is closely received in the bore 61, such that the tab 55, and the fence 19 connected to it, are mounted for pivotal, swinging movement about an axis defined by the axle 60. A compression spring 62 is fit over the axle 60 and compressed between the end 56 of the tab 55 and the side 53 of the notch 52. The compression spring 62 biases the tab 55 toward the other side 54 of the notch 52, defined as a neutral stance. In the neutral stance, the tab 55 disables movement of the fence 19 among its three positions. In the neutral stance, the end 57 of the tab 55 is in contact against the side 54 of the notch 52, as shown in FIG. 2A. In the neutral stance, the fence 19 is maintained in a coextensive alignment with the body 11 of the square, as shown in FIG. 1A; the end 41 is registered with the second edge 14, and the end 42 is registered with the first corner 16.

Figure 2B:
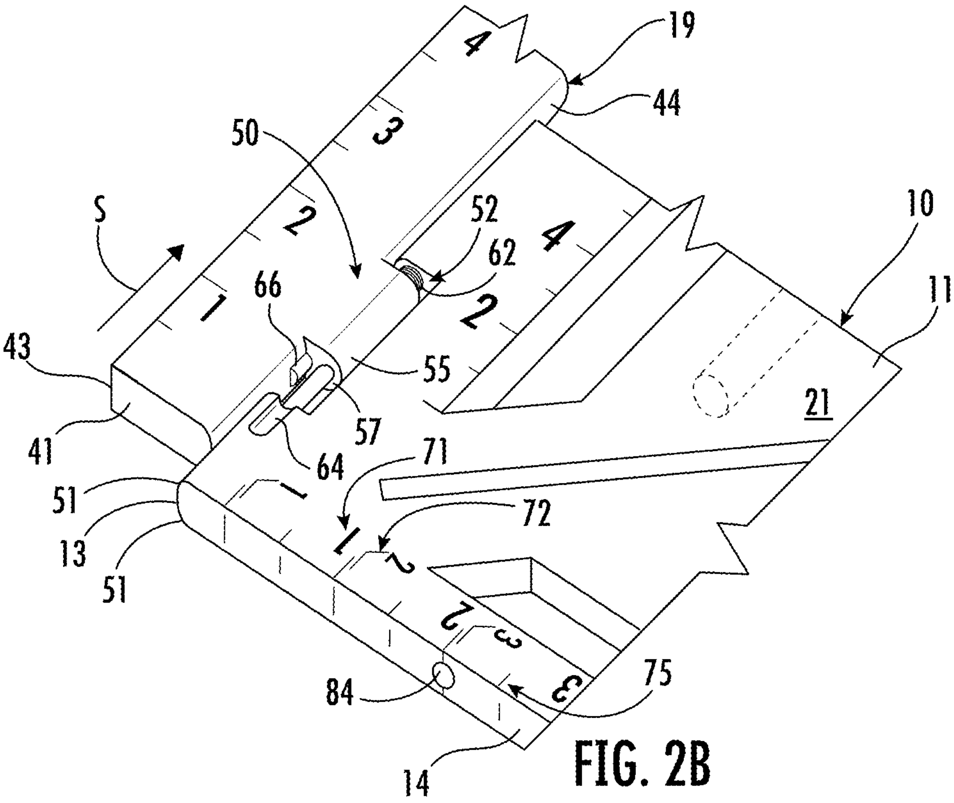
Figure 2C:
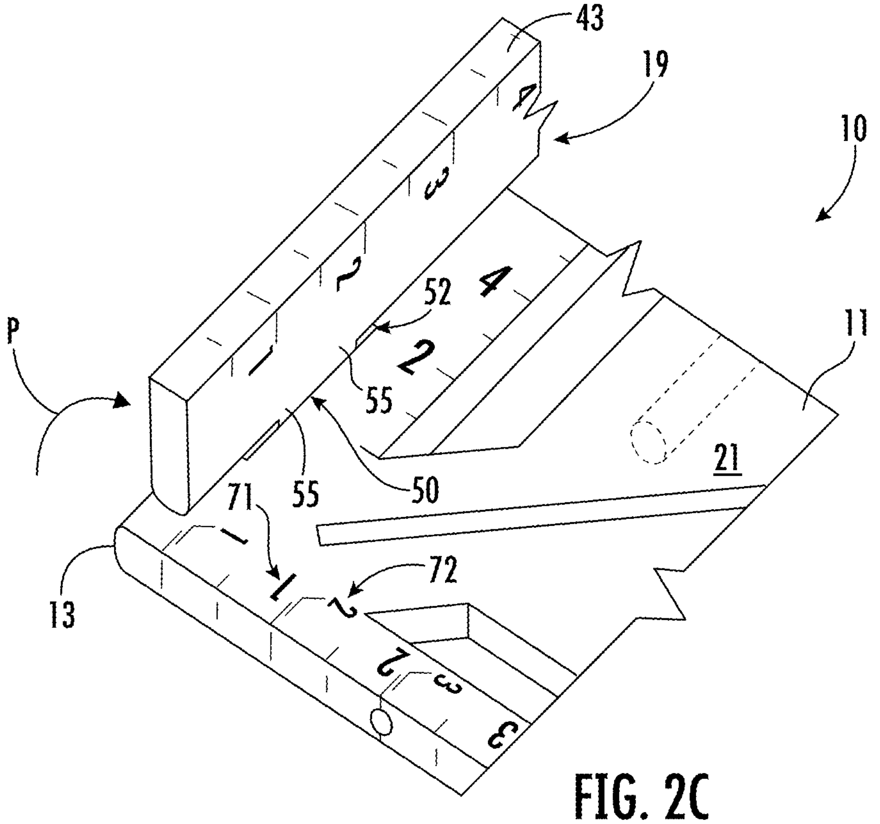

While the neutral stance disables movement of the fence 19 among its three positions, the tab 55 is moveable out of this neutral stance into an advanced stance, shown in FIGS. 2B and 2C. In the advanced stance, the tab 55 enables movement of the fence 19 among its three positions. To move the fence 19 and tab 55 out of the neutral stance and into the advanced stance, the carpenter simply grasps the body of the fence 19 and slides it upward, along the first edge 13 of the square 10, along the arrowed line S in FIG. 2B. Sliding the fence 19 in this manner compresses the spring 62, and so the carpenter must use force to move the fence 19 to the advanced stance.

An engagement assembly prevents accidental movement of the tab 55 out of the third position. When the tab 55 is in the neutral stance, the fence 19 is prevented, or disabled, from being moved into the first or second positions. Only when the tab 55 is in the advanced stance is movement enabled such that the fence 19 can be moved to the first or second positions. A groove 64 depends slightly into the second face 21 of the body 11. The groove 64 is formed into the body 11 in communication with the notch 52, extending from the notch 52 across the second face 21 of the body 11 toward the second edge 14. An identical groove 63 (FIGS. 1A and 1B) extends into the first face 20 on the other side of the body 11, and another groove 65 (FIG. 1B) is formed into the first edge 13 itself. Each of the grooves 63-65 are roughly semi-cylindrical cavities.

A tongue 66 complemental to the groove 64 is carried on the fence 19. The tongue 66 is a semi-cylindrical protrusion formed on the inner edge 44 of the fence 19. The tongue 66 has a longitudinal axis which is parallel to the first edge 13 of the fence 19. The tongue 66 has a proximal end, which is formed integrally and monolithically to the end 57 of the tab 55, and the tongue 66 extends along the inner edge 44 from the end 57 to a distal end of the tongue 66, presenting a semi-cylindrical convex surface outward between the proximal and distal ends. The tongue 66 is sized and shaped to be received snugly within each of the grooves 63-65 formed in the body 11 of the square 10.

As the tab 55 moves among the first, second, and third positions of the fence 19, the tongue 66 moves into and out of the grooves 63-65 to temporarily lock the fence 19 in the first, second, and third positions. When the fence 19 is in the first position, the groove 64 receives the tongue 66, and interaction of the tongue 66 with the groove 64 prevents pivotal movement of the fence 19 with respect to the body 11. When the fence 19 is in the second position, the groove 63 receives the tongue 66, and interaction of the tongue 66 with the groove 63 prevents pivotal movement of the fence 19 with respect to the body 11. And when the fence 19 is in the third position, the groove 65 receives the tongue 66, and interaction of the tongue 66 with the groove 65 prevents pivotal movement of the fence 19 with respect to the body 11.

When the fence 19 is in each of the first, second, and third positions, if the carpenter attempts to pivot the fence 19 to another position, the tongue 66 contacts the side of the respective groove 63-65 and is prevented from pivotal movement. Thus, each time the tongue 66 is received within one of the grooves 63-65, the fence 19 cannot be moved unless the tab 55 is first moved out of the neutral stance. As such, in this embodiment, the first, second, and third positions of the fence 19 are defined, discrete, and indexed positions. In this embodiment, the fence 19 can only be placed and temporarily locked into one of these three indexed positions. Other embodiments have a fewer or greater number of positions, indexed or otherwise. The fence

19 is temporarily locked because inadvertent or accidental movement out of the position is effectively prevented, yet a carpenter can easily and purposefully move the fence 19 out of position by overcoming the spring force of the compression spring 62 and sliding the fence 19 upward into the advanced stance of the tab 55. As such, the tongue 66 and the grooves 63-65 define an engagement assembly or spring detent assembly for locking and releasing the fence 19.

Figure 2D:
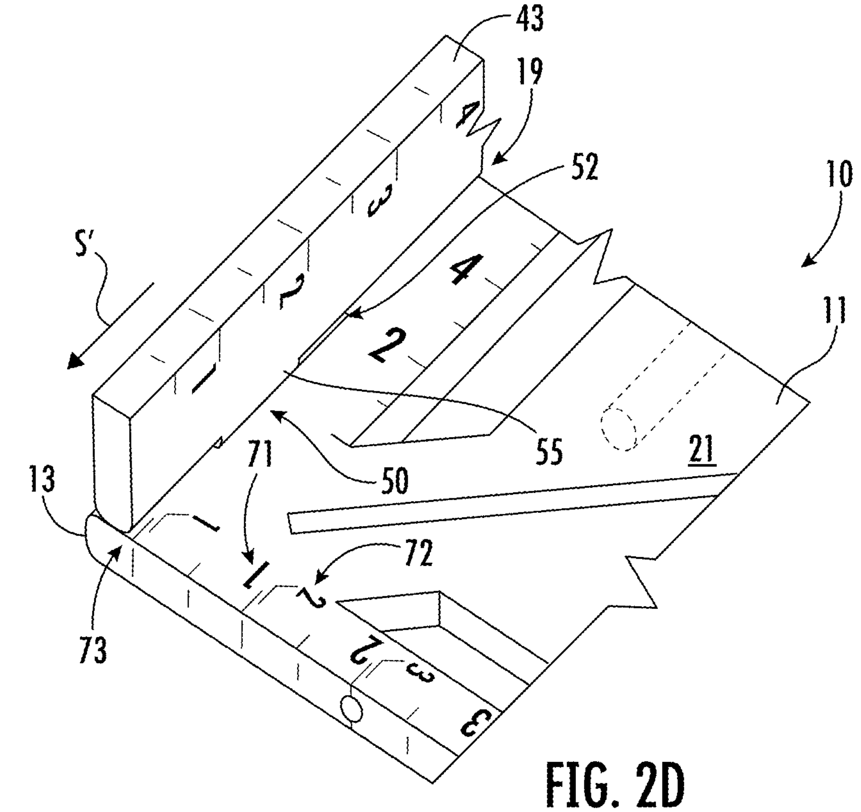

When the carpenter desires to move the fence 19 into another position, such as from the third position to the first position, as shown in FIGS. 2A-2D, he first slides the tab 55 out of the neutral stance and into the advanced stance, as shown from FIG. 2A to FIG. 2B. This causes the tongue 66 to slide longitudinally out of the groove 65. The spring 62 exerts a bias on the tab 55 back to the neutral stance, and so the carpenter must hold the fence 19 to prevent it from returning to the neutral stance. While still grasping the fence 19 in the advanced stance, the carpenter pivots the fence 19 to the side by moving it along the arcuate arrowed line P of FIG. 2C. When moved into the position shown in FIG. 2C, the tongue 66 is registered with but longitudinally offset from the groove 64. The carpenter can then release the fence 19 and allow the spring 62 to bias the fence 19 back to the neutral stance, along the arrowed line S' as shown in FIG. 2D. When the fence 19 moves back to the neutral stance, the tongue 66 is received by and engages with the groove 64 on the second face 21. The fence 19 is now temporarily locked into the first position.

The fence 19 is preferably made from the same material as the body 11 of the square 10. Referring briefly to FIG. 1A, in some embodiments, the fence 19 includes magnetic elements, examples of which are shown in broken line with the reference character 67. The magnetic elements 67 shown in FIG. 1A are circular, disc-shaped magnets and are encased within the body 40 of the fence 19. In other embodiments, the magnetic elements 67 may be offset within the body 40 or flush to one of the first or second faces 45 and 46. The embodiment shown here has three magnetic elements 67 spaced apart along the length of the fence 19. The magnetic elements 67 are useful for aligning and holding the square during metalwork. Some embodiments of fence 19 have fewer magnetic elements 67 than shown here, some have more, and some have no magnetic elements 67 at all.

Referring again to FIGS. 2A-2D, the square 10 has a dual measurement system. Measurements can be made from the fence 19 along the second edge 14 when then fence 19 is in any of the first, second, or third positions. The second edge 14 has two sets of measurements indicators, or two sets of measurements. A first set 71 of measurement indicators is marked along the second edge 14. This first set 71 is identifiable in FIG. 1A because the measurement numbers (1, 2, 3, etc.) are oriented with their tops to the bottom-left in the drawing. The first set 71 has a zero location 73 from which the rest of the indicators in the first set 71 are measured and to which the first set 71 corresponds. This zero location 73 corresponds to the location of the first face 45 or the second face 46 of the fence 19, when the fence 19 is pivoted to the second position or the first position, respectively. When the fence 19 is so pivoted, the face of the fence 19 which is directed toward the body 11 of the square 10 defines the plane from which measurements are made, because that face defines an inside corner which is placed against an edge of a workpiece. As such, when the fence 19 is in either the first or second position, the first set 71 of measurement indicators are useful for measuring.

When the fence 19 is in the third position, however, the zero location 73 is no longer relevant. A second set 72 of measurements indicators is marked along the second edge 14 and is useful in this situation. The second set 72 has a zero location 74 from which the rest of the indicators in the second set 72 are measured and to which the second set 72 corresponds. This zero location 74 corresponds to the fence edge 43 of the fence 19 when pivoted to its third position. When the fence 19 is so arranged, the square 10 can be laid flat against a flat workpiece and the fence edge 43 defines the plane from which measurements are made, because the fence edge 43 would be placed along a line, edge, or like marker.

The first and second sets 71 and 72 of measurement indicators share the same hash marks 75. The hash marks 75 thus can be read with either the first or the second sets 71 and 72 of measurement indicators, depending on the arrangement of the fence 19. However, the numbered markings for the first and second sets 71 and 72 are different. The second zero location 74 is offset from the first zero location 73, and so the numbered markings for the second set 72 of measurement indicators is offset from the first set 72 of measurements indicators.

The body 11 of the square 10 carries at least three other structures which are useful. Referring to FIG. 1A, near the middle of the body 11, the body 11 carries a laser 80 and a jig block 81, and near the second corner 17, the body carries a bubble level 82. The bubble level 82 is preferably a feature of the carpenter square 10, but is not necessarily a feature of it. Moreover, other embodiments of the bubble level may be used, as described later. Moreover, this bubble level 82 and those embodiments described later may also be incorporated into other types of levels, such as a torpedo level, carpenter's or box level, post level, and others.

Referring to FIG. 1A and also to FIG. 2A, the laser 80 is preferably carried within the body 11 of the square and directs a laser beam out of the square 10 parallel to the first edge 13. The laser 80 includes a laser transmitter, shown in broken line within the body 11. It has an emitter end 83 directed toward the second edge 14. The laser 80 transmitter is carried in a hold within the body 11 of the square 10, and a bore extends entirely from that hold to the second edge 14. The bore is not shown in the figures, to preserve the clarity of the drawings, but the open termination of the bore is shown on the second edge 14 as an opening 84, as best shown in FIG. 2A. The laser 80 emits a laser beam (identified in dash-dash line with the reference character L) through the bore and out the opening 84. The laser 80 is oriented, and the bore is registered with that orientation, such that the laser beam L is parallel to the first edge 13 and thus also to the fence 19. This allows a carpenter to set or hang the square 10 on its fence 19 or one of the first or second faces 45 and 46 atop a workpiece and direct the laser beam L parallel to that workpiece. Further, the laser 80 is preferably registered with one of the unit markings of the first and second sets 71 and 72 of measurement indicators, to allow for easier offset measurement calculations when sighting with the laser 80.

Referring now to FIG. 1C primarily, one embodiment of the bubble level 82 is shown. The bubble level 82 shown is a single hollow tube having preferably three sections: a horizontal section 90, a diagonal section 91, and a vertical section 92. The sections 90, 91, and 92 are joined in communication with each other to define the tube as a single unitary tubular element. However, each section is oriented distinctly with respect to the others to allow the carpenter to find level in different ways.

The tube of the bubble level 82 has a closed sidewall 93. The sidewall 93 is preferably tubular and transparent. In some embodiments, the sidewall 93 is cylindrical, while in others it is rectangular prismatic, and in other embodiments it has other shapes. The sidewall 93 is carried in a hold 94 which is open to both the first face 20 and the second face 21 so that the bubble level 82 can be viewed from both sides of the square 10. The tube is filled with a fluid, such as water, alcohol, or glycol, and that fluid is preferably colored to provide contrast with a bubble 95 in the fluid. The sidewall 93 is closed at both ends so that the fluid does not leak.

The horizontal section 90 is aligned parallel to the first edge 13 and normal to the second edge 14. It extends from a closed end of the tube to the diagonal section 91. The tube has a discrete and angular transition from the horizontal section 90 to the diagonal section 91. The diagonal section 91 is normal to the hypotenuse edge 12 and is angled at forty-five degrees with respect to both the first and second edges 13 and 14. The diagonal section 91 extends from the horizontal section 90 to the vertical section 92. The tube has a discrete and angular transition from the diagonal section 91 to the vertical section 92. The vertical section 92 is parallel to the second edge 14 and normal to the first edge 13. Because the diagonal section 91 is in fluid communication with both of the horizontal and vertical sections 90 and 92, the bubble 95 can move among each section 90, 91, and 92 easily as the carpenter handles the square 10.

Each section 90, 91, and 92 has a pair of level lines 96. The level lines 96 are marked in the center of each section, spaced apart at a distance just greater than the diameter of the bubble 95. When the first edge 13 of the square 10 is placed against an object and the bubble 95 is between the lines 96 without touching the lines 96, the bubble level 82 indicates that the surface of the object has a particular measurement. If the bubble 95 touches one of the lines, then the surface of the object is off that particular measurement, such as by 2% or another value. If the bubble 95 is further outside the lines, then the surface of the object is further off that particular measurement.

In use, the carpenter places the first edge 13 or the fence edge 43 against the surface of an object. Depending on the object's orientation, one of the sections 90, 91, and 92 will likely be of interest. If, for example, the surface is near horizontal, such as on the top of a beam, then the carpenter will refer to the horizontal section 90 of the bubble level 82. The bubble 95 will float to the horizontal section 90 and settle somewhere in or near the lines 96 in the horizontal section 90. This will tell the carpenter how close to level the beam is. If, on the other hand, the carpenter wants to check for plumb on a post supporting the beam, he will place the first edge 13 (or the fence edge 43) against the side of the post with the second edge 14 up and then refer to the vertical section 92 of the bubble level 82. Re-arranging the square 10 in this way causes the bubble 95 to move into the vertical section 92 and settle somewhere in or near the lines 96 in the vertical section 92. The carpenter now knows how close to plumb the post is in that direction. Finally, if the carpenter wants to check a brace extending more or less diagonally from the post to the beam, he will place the first edge 13 (or the fence edge 43) against the upper or lower face of the brace and refer to the diagonal section 91 of the bubble level 82. Re-arranging the square 10 in this way causes the bubble 95 to move into the diagonal section 91 and settle somewhere in or near the lines 96 in the diagonal section 91. The carpenter now knows how close to forty-five the diagonal actually is between the post and the beam. This single bubble level 82 allows three different measurements.

Figure 3A:
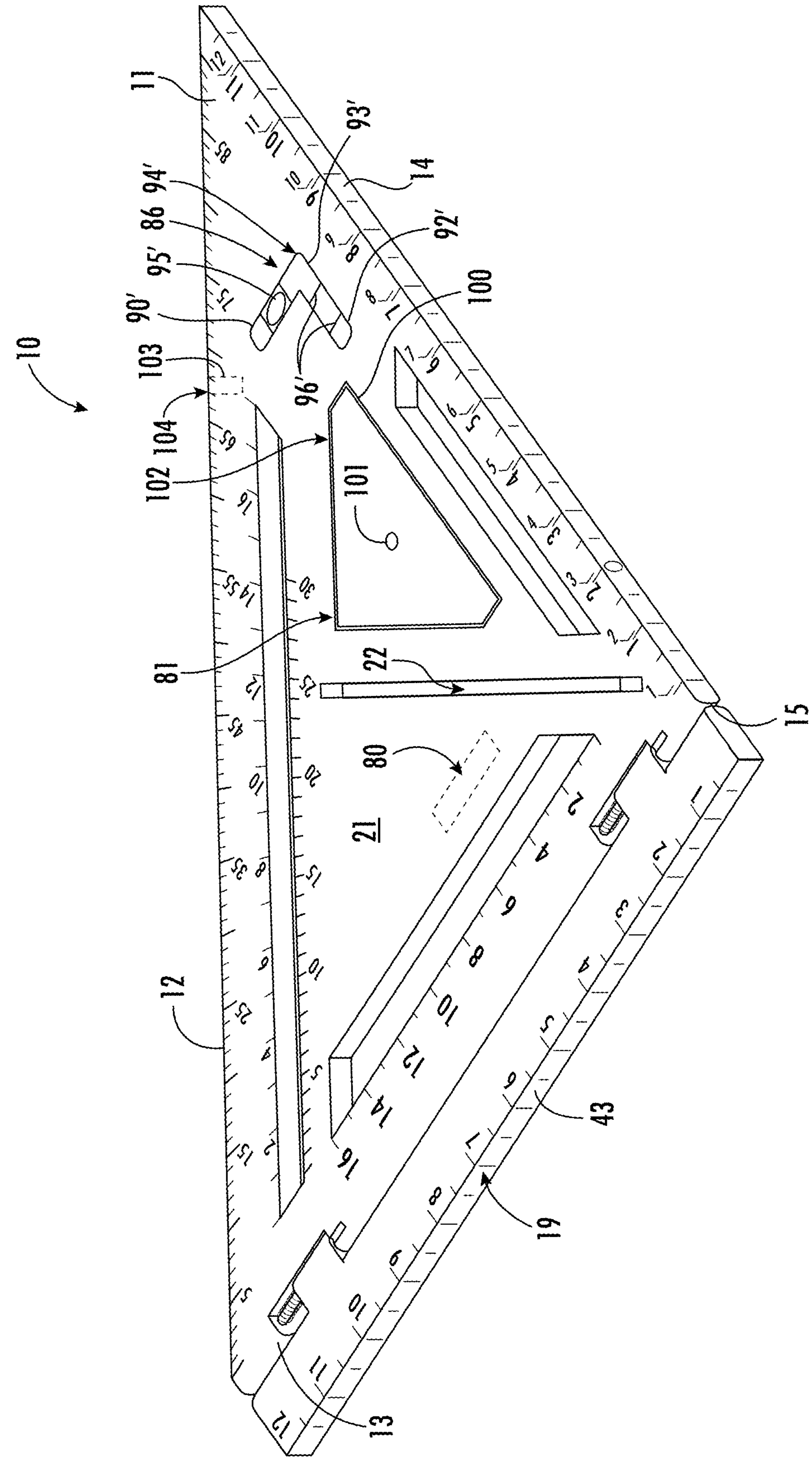
FIGS. 3A-3C are perspective and plan views of an embodiment of an improved carpenter square having a jig block for laying out a cut pattern on a workpiece.
Figure 3B:
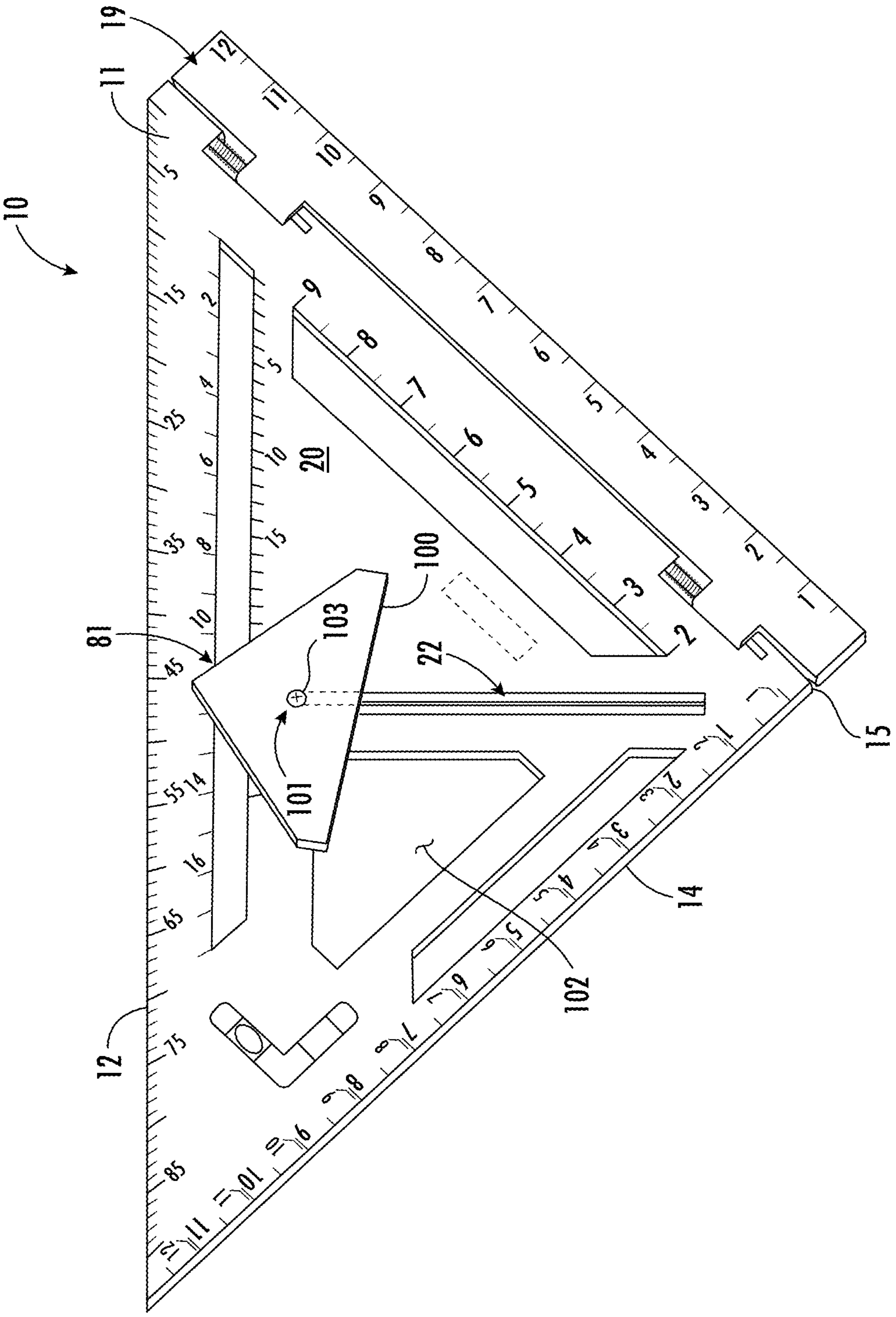
Figure 3C:
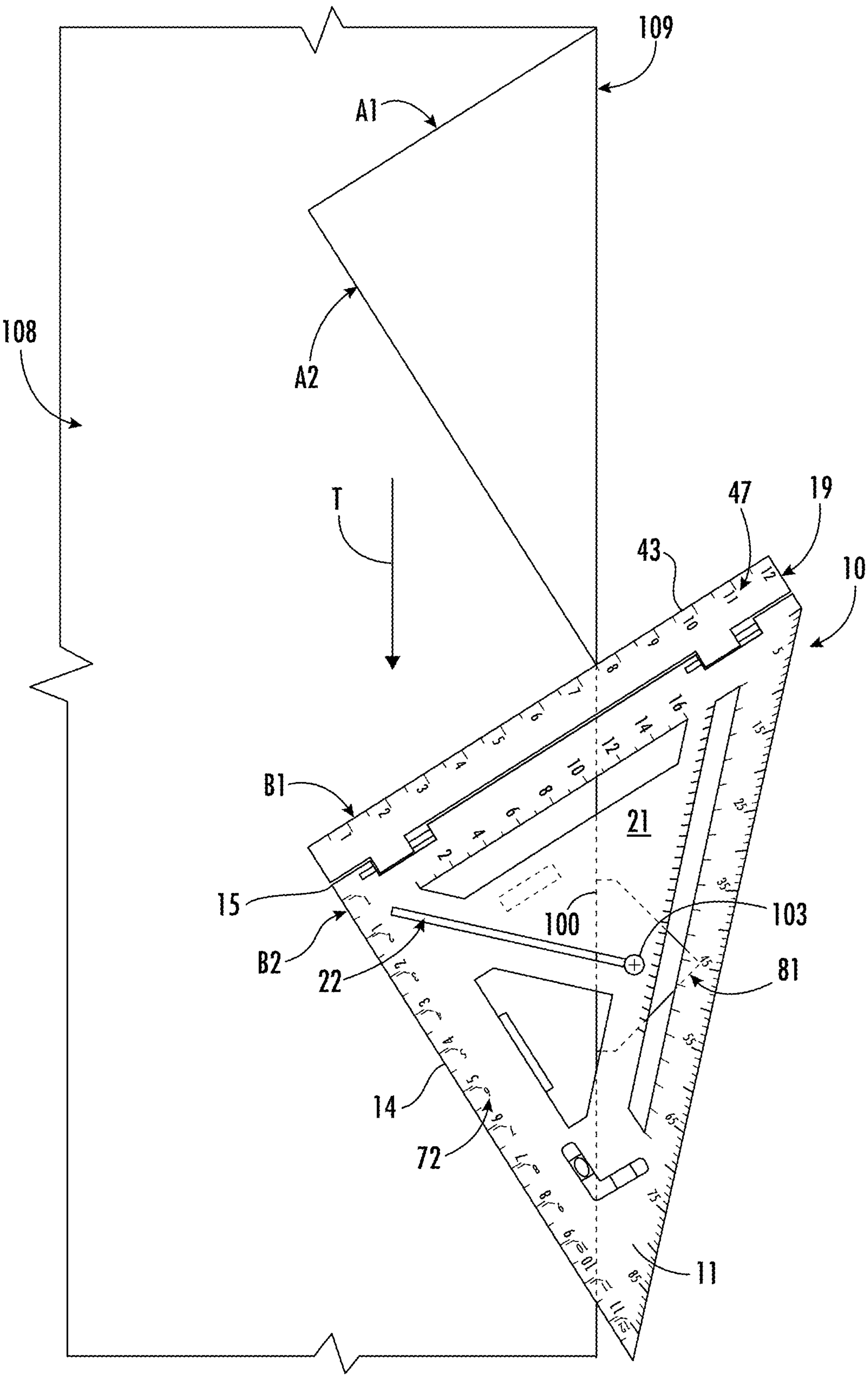

An alternate bubble level is shown in the embodiment of the square 10 depicted in FIGS. 3A-3C. The bubble level 86 is similar to the bubble level 82 and shares many of the same structural elements and features. As such, the description of the bubble level 86 adopts the same reference characters used just above to describe the bubble level 82, but marks them with a prime symbol ("'") to distinguish them from those of the bubble level 82. The bubble level 86 is a single hollow tube having preferably two sections: a horizontal section 90' and a vertical section 92' joined in communication with each other to define the tube as a single unitary tube. The two sections are oriented distinctly with respect to each other to allow the carpenter to find level in different ways.

The tube of the bubble level 86 has a closed sidewall 93'. The sidewall 93' is preferably transparent. In some embodiments, the sidewall 93' is cylindrical, while in others it is rectangular prismatic, and in other embodiments it has other shapes. The sidewall 93' is carried in a hold 94' which is open to both the first face 20 and the second face 21 so that the bubble level 86 can be viewed from both sides of the square 10. The tube is filled with a fluid, such as water, alcohol, or glycol, and that fluid is preferably colored to provide contrast with a bubble 95' in the fluid. The sidewall 93' is closed at both ends so that the fluid does not leak.

The horizontal section 90' is aligned parallel to the first edge 13 and normal to the second edge 14. It extends from a closed end of the tube to the a right corner formed with the vertical section 92'. The tube has a discrete and angular transition from the horizontal section 90 to that vertical section 92'. The vertical section 92' is parallel to the second edge 14 and normal to the first edge 13. The bubble 95' can move between the sections 90' and 92' easily as the carpenter handles the square 10.

Referring still to FIGS. 3A-3C, this specification describes the use and operation of the jig block 81. The jig block 81 converts the square 10 into a jig which quickly and easily lays out a pattern of lines for marking cuts along an edge of a workpiece, such as for making the patterned cuts of a stair stringer from a 2×12 piece of lumber. The jig block 81 is a thin piece of material, preferably made from the same material as the body 11 of the square 10, which has a long edge 100 and a through-hole 101. The jig block 81 is held in place in the body 11 until needed, at which time the carpenter removes the jig block 81, secures it to the medial slit 22, and uses the entire square to lay out a pattern of cut lines.

The jig block 81 is carried in a hold 102 in the body 11 of the square 10. The hold 102 is an empty space sized and shaped to snugly receive and hold the jig block 81. In embodiments, the hold 102 has inner edges which are tiered so that the jig block 81 can be removed only through one side of the hold 102 and one side of the square 10. In other words, in those embodiments, the size of the hold on one side of the square 10 is slightly smaller than the size of the hold on the other side of the square 10 (and slightly smaller than the jig block 81 itself), such that the jig block 81 cannot be removed through the smaller side but rather only through the larger side.

The jig block 81 has a long edge 100. The long edge 100 is straight and uninterrupted by notches, projections, divots, or other discontinuities. The embodiment of the jig block 81 shown in these drawings has four other edges, arranged to form a shape roughly similar to a baseball home plate. Other shapes are suitable, so long as the jig block 81 has a long edge 100. The jig block 81 itself is thin and no thicker than the thickness of the body 11 of the square 10 so that the jig block 81 can be stored in the square and not impede the use of the square 10 when the jig block 81 is so stored.

In use, the jig block 81 is removed from the hold 102. In some embodiments, the jig block 81 is magnetic and is magnetically secured in the hold 102. In other embodiments, a small turn screw disposed at the edge of the hold 102 selectively locks and releases the jig block 81. In other embodiments, the jig block 81 is simply snugly fit and held in the hold 102. Regardless of how the jig block 81 is held, it is removed from the hold 102. The jig block 81 is taken up by hand and placed against one of the first and second faces 20 and 21. In FIG. 3B, as an example only, the jig block 81 is placed against the first face 20. The jig block 81 is oriented such that its long edge 100 is generally directed toward the right corner 15 and its through-hole 101 is registered with the medial slit 22. The carpenter takes a set screw 103 and passes it through the through-hole 101 and the medial slit 22. In some embodiments, the set screw 103 may screw directly into the medial slit 22 but, more preferably, a nut is placed over the free end of the set screw 103 and is tightened thereon, thereby binding the jig block 81 against the body 11 of the square 10. In embodiments, the set screw 103 is stored in or on the square 10. For example, FIG. 3A shows the set screw 103 in broken line secured in a small threaded bore 104 extending into the hypotenuse edge 12, which is less frequently used as a marking edge. In other embodiments, the set screw 103 may be stored in a bore on the jig block 81 itself.

Once the jig block 81 is attached to the face 20 of the square 10, the square 10 is taken up by hand, inverted, and placed over a workpiece 108 such as a piece of lumber, as shown in FIG. 3C. The workpiece 108 has an outer edge 109 along which cuts are to be made. To place the entire face 20 of the square on top of the workpiece 108, the carpenter must move the fence 19 to its third position, flat and coplanar with respect to the body 11 of the square 10.

In FIG. 3C, the jig block 81 is underneath the square 10 and so is shown substantially in broken line. The carpenter manipulates the square 10 so that the long edge 100 is placed in direct and continuous contact with the outer edge 109 of the workpiece 108. This causes the right corner 15 and much of the body 11 of the square 10 to become disposed over the workpiece 108.

The carpenter then adjusts the jig block 81 to ensure the square 10 marks out a desired pattern. The carpenter will have a predetermined pattern to cut. For example, if he is cutting a stringer, he will need to know the rise and run, such as 7.5 inches and 11 inches. With the long edge 100 of the jig block 81 against the workpiece 108, the carpenter loosens the set screw 103 slightly so that the square 10 can be moved with respect to the jig block 81. The carpenter moves the square 10 to achieve the desired rise and run. This may require sliding the square 10 so that the jig block 81 moves up or down along the medial slit 22. It may also require rotating the body 11 of the square 10 while the jig block 81 is maintained against the outer edge 109.

When the carpenter has aligned the square 10 on the workpiece such that the outer edge 109 crosses the desired rise and run measurements, he tightens the set screw 103. Note that the carpenter uses the measured indicators 47 along the fence 19 and the second set 72 of measured indicators along the second edge, because the fence 19 is in its third position and the carpenter must use of the offset second set 72.

With the square 10 properly dialed, the carpenter can now quickly lay out cut lines. He makes his first set of lines A1 and A2 as shown at the top of FIG. 3C. Lines A1 and A2 prescribe two cuts made at a right angle with the desired rise and run measurements. The carpenter then translates the square down the workpiece 108 along arrowed line T to a second position. The second position, shown in FIG. 3C as occupied by the square begins at the termination of line A2, where line A2 meets the outer edge 109. The carpenter then marks lines B1 and B2 along the fence edge 43 and the second edge 14, respectively. He then continues to translate the square 10 and mark successive lines, quickly laying out the needed cut pattern.

Figure 4:
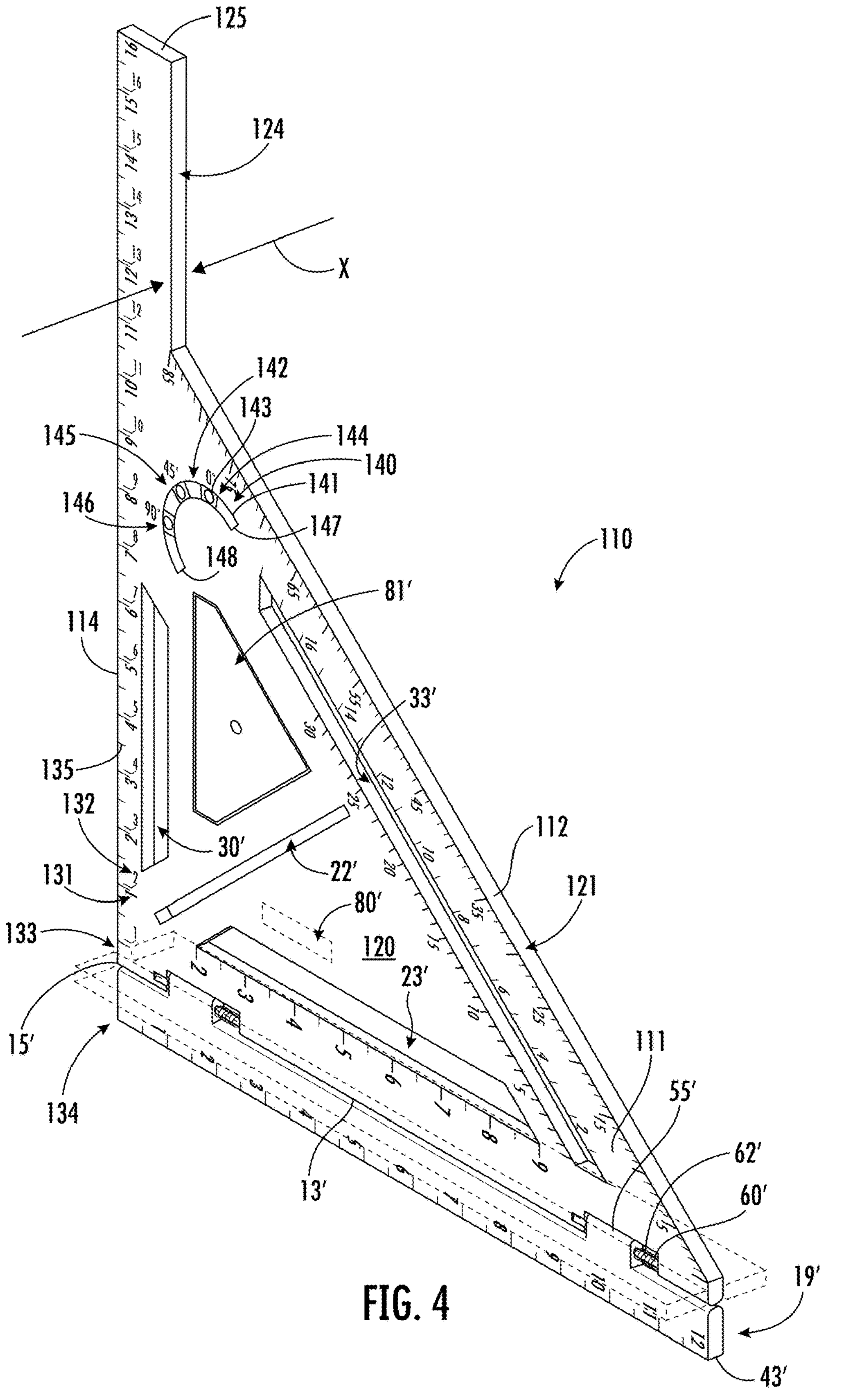
FIG. 4 is a perspective view of an embodiment of an improved carpenter square having a fence mounted for swinging movement.

FIG. 4 illustrates another embodiment of a carpenter square 110. The carpenter square 110 is similar in many ways to the square 10 and shares many of the same structural elements and features as the square 10. As such, the square 110 adopts the same reference characters to describe the same features, but marks them with a prime ("'") symbol to distinguish the structural elements and features of the square 110 from the square 10. For example, while the square 10 has a fence 19, the square 110 has a fence 19'. The fences 19 and 19' are identical in every respect, but because the fence 19' is part of the square 110, its reference character is marked with the prime symbol. Because structures such as these have already been described with respect to the square 10, this specification generally does not describe them further with respect to the square 110. Other structures which have not already been introduced or are different bear unique reference characters.

The square 110 includes a body 111 which is generally triangular in shape with a long leg contiguously extending from one side. The square 110 has: 1) a hypotenuse edge 112 opposite a right corner 15'; 2) a short first edge 13'; and 3) a long second edge 114. The fence 19' is pivoted to the first edge 13' and, like the fence 19, pivots among three positions. In FIG. 4, the first and second positions of the fence 19' are shown in broken line, normal to the body 11, and the third position is illustrated in solid line. The fence 19' is pivoted to the body 111 with the engagement assemblies of the tabs 55', axles 60', springs 62', tongues 66', and grooves 63'-65'. The tongues 66' and grooves 63'-65' are not marked in the drawings but the reader will understand their location, structure, and function from the description above of the identical tongues 66 and grooves 63-65.

The body 111 of the square 110 and the fence 19' are both preferably constructed from a material or combination of materials with rugged, strong, durable, and hard material characteristics. Preferably, the body 11 is made from metal, hard wood, plastic, or like materials offering these characteristics. The body 11 has a first face 120 and an opposed second face 121, which is marked and opposite the first face 120 but not shown in FIG. 4. The faces 120 and 121 are flat and parallel to each other, spaced apart by a width X of the body 111, as shown in FIG. 4. The faces 120 and 121 are marked with a plurality of indications and measurements.

Moreover, slots and slits are formed through the body 111 entirely from the first face 120 through to the other second face 121. The body 111 includes the medial slit 22', the first slot 23', the second slot 30', and the hypotenuse slot 33'. These slots are useful for making markings through the square 110 and for attaching the jig block 81' to the square 110 when the carpenter desires to lay out a cut pattern.

Unlike the square 10, the square 110 has an extension, or a leg 124, projecting from one corner. The leg 124 is a roughly rectangular piece of material which is integrally and monolithically formed to the body 111 as part of the body 111. The second edge 114 is long, extending continuously along the main portion of the body 111 as well as the leg 124. The leg 124 extends from the main portion of the body 111 to a blunt terminal edge 125. The terminal edge 125 is linear, straight, and parallel to the first edge 13'. In other embodiments, the terminal edge 125 has other shapes.

The leg 124 defines a contiguous extension of the second edge 114, as it commonly shares and extends the second edge 114. That second edge 114 has two sets of measurements indicators. A first set 131 of measurement indicators is marked along the second edge 114. This first set 131 is identifiable in FIG. 4 because the measurement numbers (1, 2, 3, etc.) are oriented with their tops to the left in the drawing. The first set 131 has a zero location 133 from which the rest of the indicators in the first set 131 are measured and to which the first set 131 corresponds. This zero location 133 corresponds to the location of the first face 45' or the second face 46' of the fence 19', when the fence 19' is pivoted to the second position or the first position, respectively. When the fence 19' is so pivoted, the face of the fence 19' which is directed toward the body 111 of the square 110 defines the plane from which measurements are made, because that face is placed against an edge of a workpiece. As such, when the fence 19' is in either the first or second position, the first set 131 of measurement indicators are useful for measuring.

When the fence 19' is in the third position, however, the zero location 133 is no longer relevant. A second set 132 of measurements indicators is marked along the second edge 114 and is useful in this situation. The second set 132 has a zero location 134 from which the rest of the indicators in the second set 132 are measured and to which the second set 132 corresponds. This zero location 134 corresponds to the fence edge 43' of the fence 19' when pivoted to its third position. When the fence 19' is arranged, the square 110 can be laid flat against a flat workpiece and the fence edge 43' defines the plane from which measurements are made, because the fence edge 43' would be placed along a line, edge, or like marker.

The first and second sets 131 and 132 of measurement indicators share the same hash marks 135. The hash marks 135 thus can be read with either the first or the second sets 131 and 132 of measurement indicators, depending on the arrangement of the fence 19'. However, the numbered markings for the first and second sets 131 and 132 are different. The second zero location 134 is offset from the first zero location 133, and so the numbered markings for the second set 132 of measurement indicators is offset from the first set 132 of measurements indicators.

Unlike the second edge 14 of the square 10, which preferably extends roughly twelve inches, the leg 124 extends the second edge 114 to preferably sixteen inches. In other embodiments, the length may be longer or shorter. The reader will understand that none of the lengths described herein are critical, and that the scope of disclosure for each embodiment covers different lengths, both short and long. For example, the square 110 may only be a few inches long or may be two feet or more in length.

Like the square 10, the square 110 preferably carries a laser 80', a jig block 81', and a bubble level 140. The bubble level 140 is different from the bubble level 82, however. The bubble level 140 is one embodiment of a bubble level. The bubble level 140 is a hollow tube having a continuous arcuate shape. The arc extends preferably one-hundred eighty degrees, though in other embodiments it may be shorter or longer. In this embodiment, the arc extends from one end 147, proximate to the hypotenuse edge, up and around toward the leg 124, and then back to down to an opposed end 148, proximate to the second edge 114. Different portions of this arc allow the carpenter to find level in different ways.

The tube of the bubble level 140 has a closed sidewall 141. The sidewall 141 is preferably transparent. In some embodiments, the sidewall 141 is cylindrical, while in others it is rectangular prismatic, and in other embodiments it has other shapes. The sidewall 141 is carried in a hold 142 which is open to both the first face 120 and the second face 121 so that the bubble level 140 can be viewed from both sides of the square 110. The tube is filled with a fluid, such as water, alcohol, or glycol, and that fluid is preferably colored to provide contrast with a float 143 in the fluid. The float 143 is preferably a bubble in the fluid, but in other embodiments the float is a small, transparent, and rigid sphere or capsule. The tube is closed at both ends 147 and 148 so that the fluid does not leak. The sidewall 141 curves arcuately from one closed end 147 to the other closed end 148.

The embodiment shown in FIG. 4 includes three pairs of level lines. A first set 144 of level lines is marked proximate to the end 147 of the bubble level 140 which is proximate the hypotenuse edge 112. The first set 144 of level lines are marked through the tube in a radial direction and are spaced apart at a distance just greater than the diameter of the float 143. A second set 145 of level lines is marked halfway between the ends of the bubble level 140. The second set 145 of level lines are marked through the tube in a radial direction and are spaced apart at a distance just greater than the diameter of the float 143. A third set 146 of level lines is marked proximate to the end of the bubble level 140 which is proximate the second edge 114. The third set 146 of level lines are marked through the tube in a radial direction and are spaced apart at a distance just greater than the diameter of the float 143.

The bubble level 140 shown in this embodiment of the square 110 is just one embodiment. Other carpenter squares according to the scope of this disclosure may include other bubble levels described herein, such as the bubble level 82 or the bubble levels described later. Likewise, while the embodiment shown in FIG. 4 includes a jig block 81', other embodiments do not include the jig block 81', and while the FIG. 4 embodiment includes a laser 80', other embodiments do not. The scope of this disclosure and the embodiments described includes all permutations of the various structural elements and features of all embodiments disclosed herein.

The first, second, and third sets 144, 145, and 146 of level lines are useful for measuring different inclinations of object surfaces. In use, the carpenter places the first edge 13' or the fence edge 43' against the surface of an object. If that surface is near horizontal, such as on the top of a beam, then the carpenter will refer to the first set 144 of level lines. The float 143 will float to the top of the bubble level 140 and settle somewhere in or near that set 144 of level lines. This tells the carpenter how close to level the beam is. If the float 143 touches one of the lines, then the surface of the object is off that particular measurement, such as by 2% or another value. If the float 143 is further outside the lines, then the surface of the object is further off that particular measurement.

If, on the other hand, the carpenter wants to check for plumb on a post supporting the beam, he will place the first edge 13' (or the fence edge 43') against the side of the post with the second edge 114 up and then refer to the side of the bubble level 140. Re-arranging the square 110 in this way causes the float 143 to settle somewhere in or near the third set 146 of lines. The carpenter now knows how close to plumb the post is in that direction.

Finally, if the carpenter wants to check a brace extending more or less diagonally from the post to the beam, he will place the first edge 13' (or the fence edge 43') against the upper or lower face of the brace and refer to the second set 145 of level lines of the bubble level 140. Re-arranging the square 110 in this way causes the float 143 to settle somewhere in or near that second set 145 of lines. The carpenter now knows how close to forty-five the diagonal actually is between the post and the beam. This single bubble level 140 allows three different measurements.

Figure 5:
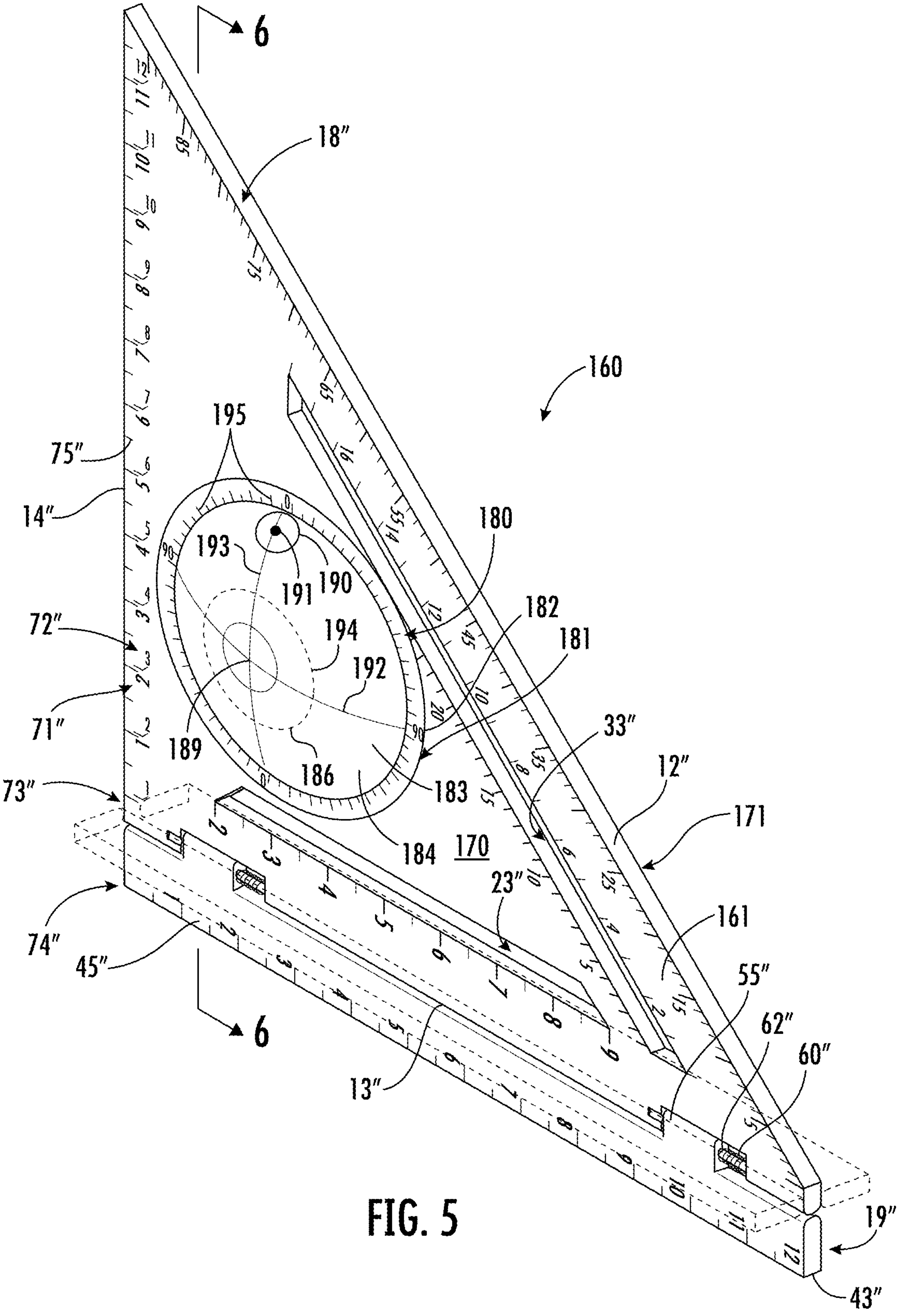
FIG. 5 is a perspective view of an embodiment of an improved carpenter square having a fence mounted for swinging movement.
Figure 6:
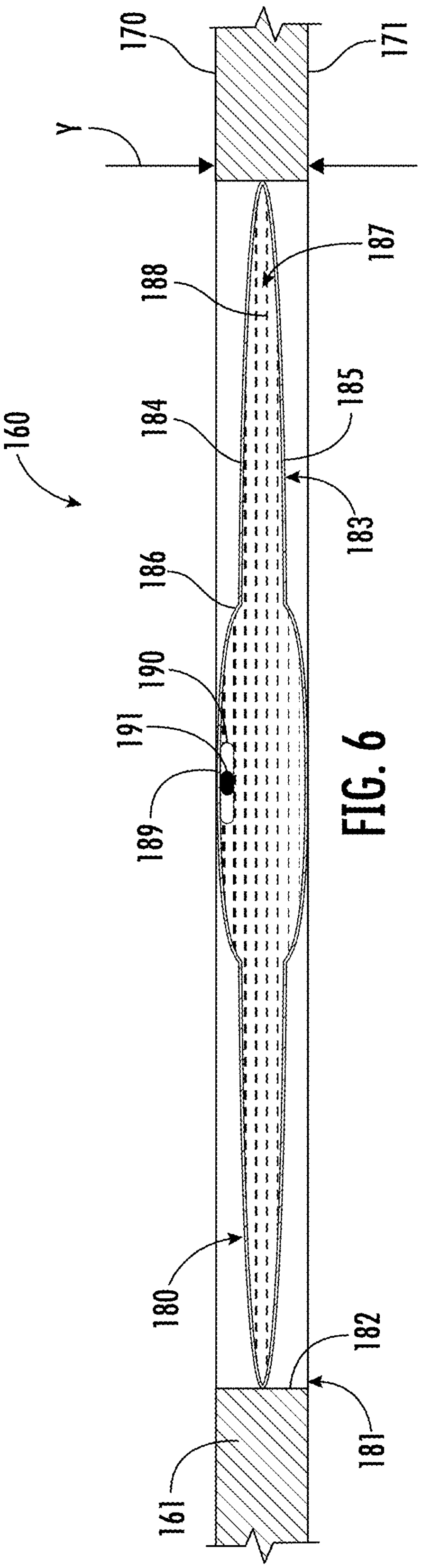
FIG. 6 is a section view taken along the line 6-6 in FIG. 5.

FIGS. 5 and 6 illustrate another embodiment of a carpenter square 160. The carpenter square 160 is similar in many ways to the square 10 and shares many of the same structural elements and features as the square 10. As such, the square 160 adopts the same reference characters to describe the same features, but marks them with a double prime ("″") symbol to distinguish the structural elements and features of the square 160 from the square 10. For example, while the square 10 has a fence 19, the square 160 has a fence 19". The fences 19 and 19" are identical in every respect, but because fence 19" is part of the square 160, its reference character is further designated with the prime symbol. Because structures such as these have already been described with respect to the square 10, this specification generally does not describe them further with respect to the square 160.

The square 160 is particularly useful for the metalworker or metal craftsman. The square 160 includes a body 161 which is generally triangular in shape and has three major edges. The square 160 has: 1) a hypotenuse edge 12" opposite a right corner 15"; 2) a short first edge 13"; and 3) a short second edge 14". These three edges cooperate to define a perimeter edge 18" of the body 161 of the square 160 itself. Within the perimeter edge 18", carried in the body 161, is an embodiment of a bubble level 180 which the metalworker can use to determine a measurement within a range of angles.

The roughly rectangular fence 19" is pivoted to the first edge 13" and, like the fence 19, pivots among the three positions. In FIG. 5, the first and second positions of the fence 19" are shown in broken line, normal to the body 161, and the third position is illustrated in solid line. The fence 19" is pivoted to the body 161 with the engagement assemblies of the tabs 55", axles 60", springs 62", and tongues 66" and grooves 63"-65" (not shown in FIG. 5).

Both the body 161 of the square 160 and the fence 19" are preferably constructed from a material or combination of materials with rugged, strong, durable, and hard material characteristics. Preferably, the body 161 is made from metal, hard wood, plastic, or like materials offering these characteristics. The body 161 has a first face 170 and an opposed second face 171, as shown in FIG. 6. The faces first and second faces 170 and 171 are flat and parallel to each other, spaced apart by a width Y of the body 161, as shown in FIG. 6. FIG. 6 is a section view taken along the line 6-6 in FIG. 5.

The first and second faces 170 and 171 are marked with a plurality of indications and measurements. Moreover, slots and slits are formed through the body 161 entirely from the first face 170 through to the other second face 171. The body 161 includes the first slot 23" and the hypotenuse slot 33". These slots are useful for making markings through the square 160.

The second edge 14" has two sets of measurements indicators. A first set 71" of measurement indicators is marked along the second edge 14". This first set 71" is identifiable in FIG. 5 because each of the measurement numbers (1, 2, 3, etc.) is oriented with its top to the left in the drawing. The first set 71" has a zero location 73" from which the rest of the indicators in the first set 71" are measured and to which the first set 71" corresponds. This zero location 73" corresponds to the right corner 15" and to the location of the first face 45" or the second face 46" (not shown) of the fence 19", when the fence 19" is pivoted to the second position or the first position, respectively. When the fence 19" is so pivoted, the face of the fence 19" which is directed toward the body 161 of the square 160 defines the plane from which measurements are made, because that face is placed against an edge of a workpiece. As such, when the fence 19" is in either the first or second position, the first set 71" of measurement indicators are useful for measuring.

When the fence 19" is in the third position, however, the zero location 73" is no longer relevant. A second set 72" of measurements indicators is marked along the second edge 14" and is useful in this situation. The second set 72" has a zero location 74" from which the rest of the indicators in the second set 72" are measured and to which the second set 72" corresponds. This zero location 74" corresponds to the fence edge 43" of the fence 19" when pivoted to its third position. When the fence 19" is so arranged, the square 160 can be laid flat against a flat workpiece and the fence edge 43" defines the plane from which measurements are made, because the fence edge 43" would be placed along a line, edge, or like marker.

The first and second sets 71" and 72" of measurement indicators share the same hash marks 75". The hash marks 75" thus can be read with either the first or the second sets 71" and 72" of measurement indicators, depending on the arrangement of the fence 19". However, the numbered markings for the first and second sets 71" and 72" are different. The second zero location 74" is offset from the first zero location 73", and so the numbered markings for the second set 72" of measurement indicators is offset from the first set 72" of measurements indicators.

In this embodiment of the square 160, the three edges 12", 13", and 14" define the body 161 as having a triangular formation. However, the scope of the embodiment of square 160 is not so limited. For example, in other embodiments, the square 160 includes a leg similar to the leg 124 of the square 110.

Like the square 10, the square 160 preferably carries a bubble level, but the bubble level 180 shown in FIGS. 5 and 6 for the square 160 is different from the bubble level 82 of the square 10. The bubble level 180 is one embodiment of a bubble level. Referring now to both FIG. 5 and FIG. 6, the bubble level 180 defines a flying saucer-shaped reservoir filled with a fluid and a single float or bubble for finding measurements.

The bubble level 180 has a central hub and an annulus encircling the hub, and the float floats freely between the hub and the annulus depending on the orientation of the square 160. The bubble level 180 is set into a hold 181 in the body 161 of the square 160. The hold 181 is a generally cylindrical bore formed through the body 161 from the first face 170 through to the second face 171, defining an inner wall 182. The bubble level 180 is fit snugly into the hold 181, but in some embodiments, the bubble level 180 is secured in the hold 181 not just with a snug fit but with adhesive or some other fastener.

The bubble level 180 is formed from a thin sidewall 183 which is preferably symmetric about a central plane parallel to the first and second faces 170 and 171. The sidewall 183 has a first wall 184 and a second wall 185, which are preferably symmetric to each other. The first and second walls 184 and 185 meet at the inner wall 182 and bound and define a reservoir having a disc shape. Extending radially inward from the inner wall 182, the first and second walls 184 and 185 expand outwardly away from each other, until an inflection point 186. The inflection point 186 is a generally circular boundary between the annulus (outside the inflection point 186) and the hub (inside the inflection point 186). Within the inflection point, the first and second walls 184 and 185 each define a truncated or severed sphere, having only a rounded portion which is less than a semi-sphere. Together, the first and seconds walls 184 and 185 cooperate to define a roughly egg-shaped space at the hub, within the inflection point 186. In other embodiments, this hub has other shapes.

Within the inflection point 186, the first and second walls 184 and 185 both rise to a top 189 which is flush with or just inboard of the first and second faces 170 and 171, respectively. As such, the bubble level 180 is bound within the body 161 by the first and second faces 170 and 171. In other embodiments, the hold 181 and/or the bubble level 180 extend beyond these faces 170 and 171, but scratching damage to the bubble level 180 may be possible in such other embodiments.

The walls 184 and 185 are preferably transparent, such that the metalworker can look through the bubble level 180 from either side of the square 160 and view an interior 187 of the bubble level 180. The interior 187 is substantially filled with a fluid 188, but for a float 190. The float 190 is a small, rigid, and preferably transparent sphere with a small marking 191 such as a dot. The marking 191 is centrally located within the float 190, such that the float 190 has spherical symmetry with respect to the marking 191. The float 190 is preferably otherwise empty. It has a density which is lower than the surrounding fluid 188, and the float 190 rises to the relative top of the fluid 188 depending on the orientation of the square 160. In other embodiments of the bubble level 180, the float 190 may instead be a simple bubble in the fluid 188.

The bubble level 180 includes various indications. The bubble level 180 has a bullseye formed by a horizontal line 192 and a vertical line 193 at a right angle to the horizontal line, each extending entirely across the diameter of the sidewall 183 and through the top 189 of the sidewall 183, on both sides. The horizontal line 192 is parallel to the first edge 13", and the vertical line 193 is parallel to the second edge 14". A circular line 194 is centered at the intersection of the horizontal and vertical lines 192 and 193. When the square 160 is laid flat (as in FIG. 6), such that its second face 171 is against a horizontal surface, the float 190 rises to the top 189 and settles somewhere within or near the circular line 194. This tells the metalworker how close to level the horizontal surface actually is. If the float 190 touches part of the circular line 194, then then the horizontal surface is off level, such as by 2% or another value. If the float 190 is further outside the circular line 194, then the horizontal surface is further off.

The bubble level 180 also allows the metalworker to check a surface for any angle. Radial hash marks 195 are scribed on the annulus of the sidewall 183 just inboard of the inner wall 182 of the hold 181. The hash marks 195 are angular measurements, with a zero angle corresponding to the hash mark 195 at the end of the vertical line 193 which is proximate the second corner 17". In FIG. 5, the float 190 has risen to this zero angle, indicating that the first edge 13" is level. If the first edge 13" is laid on a surface that is, for example, angled at seventeen degrees, the float 190 will rise to the hash mark 195 corresponding to seventeen degrees (or to a space between hash marks corresponding to sixteen and eighteen degrees, or to some other space between hash marks flanking seventeen degrees).

In the embodiment shown in FIGS. 5 and 6, the bubble level 180 occupies a large portion of the middle of the body 161 of the square 160. Because of the size of the bubble level 180, the square does not include a medial slit 22, a second slot 30, a laser 80, or a jig block 81. In other embodiments, however, the bubble level 180 is smaller or larger, as needed for the particular implementation and work to be done with the square 160. And in such other embodiments the square 160 includes a medial slit 22, a second slot 30, a laser 80, a jig block 81, or some combination of those elements. Indeed, other carpenter squares according to the scope of this disclosure may include other bubble levels described herein. The scope of this disclosure and the embodiments described includes all permutations of the various structural elements and features of all embodiments disclosed herein.

Figure 7:
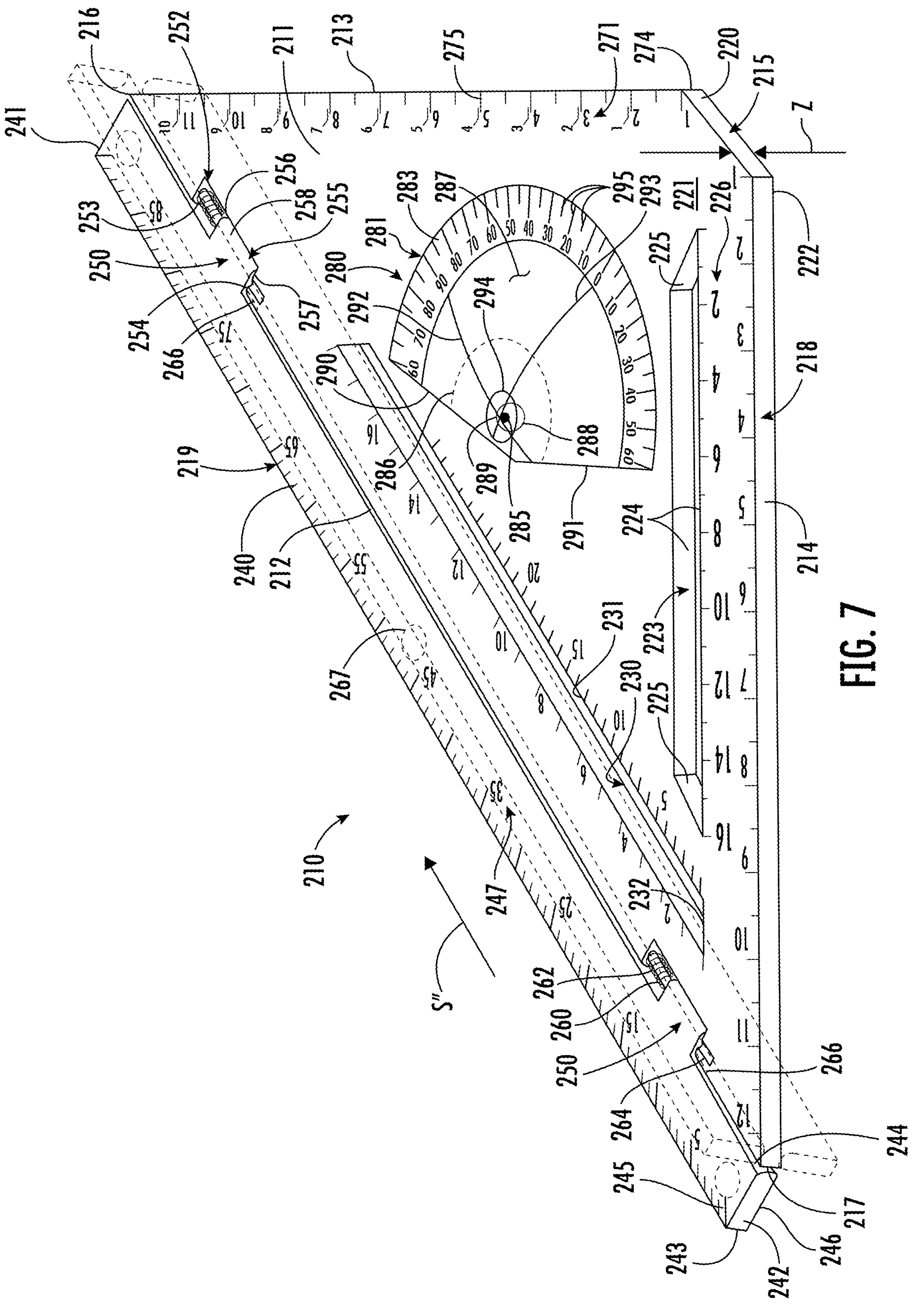
FIG. 7 is a perspective view of an embodiment of an improved carpenter square having a fence mounted for swinging movement.

FIG. 7 illustrates a carpenter square 210. The square includes a body 211 having three edges. The square 210 has: 1) a hypotenuse edge 212 opposite a welder's corner 215; 2) a short first edge 213 extending between the welder's corner 215 and a first corner 216 formed by and between the short first edge 213 and the hypotenuse edge 212; and 3) a short second edge 214 extending between the welder's corner 215 and a second corner 217 formed by and between the short second edge 214 and the hypotenuse edge 212. These three edges cooperate to define a perimeter edge 218 of the body 211 of the square 210 itself.

Pivoted to the hypotenuse edge 212 is a fence 219. The fence 219 is a roughly rectangular piece of material coextensive to the hypotenuse edge 212. The fence 219 pivots between preferably three indexed positions. In a first position of the fence 219, shown in broken line in FIG. 7, the fence 219 is normal to the body 211 in a first direction (upward along the paper, or toward the top of the page). In a second position of the fence 219, also shown in broken line in FIG. 7, the fence 219 is normal to the body 211 in a second direction, opposite the first direction (down along the paper, or toward bottom of the page). In a third position, shown in solid line in FIG. 7, the fence 219 is coplanar to the body 211.

Like the fence 19 of the square 10, when the fence 219 is in the first or second positions, a carpenter can lay the fence 219 against a straight edge and mark lines. The normal arrangement of the fence 219 to the body 211 of the square 210 makes quick alignment of the square 210 easy. If the carpenter desires to lay the body 211 of the square 210 entirely on the workpiece and at least partially inboard from the straight edge, however, he need only move the fence 219 to the third position, such that the fence 219 is aligned coplanar to the body 211 and the entirety of the square 210 can be laid flat on the workpiece.

The body 211 of the square 210 is generally triangular, because the perimeter edge 218 generally has three major sides or lengths. The first and second edges 13 and 14 meet at the welder's corner 215, the first edge 213 and the hypotenuse edge 212 meet at the acute first corner 216, and the second edge 214 and hypotenuse edge 212 meet at the acute second corner 217.

The first and second edges 213 and 214 are normal to each other and nearly meet at the welder's corner 215. The welder's corner 215 is a notch or open corner, formed by a diagonal edge between the first edge 213 and the second edge 214. The welder's corner 215 defines an open space just offboard the body 211 of the square 210 which can receive a weld between two metal pieces. In other words, a metalworker can place the square 210 against two metal pieces that are arranged normal to each other, and if the welder's corner 215 is placed over the weld between the two pieces of metal, the square 210 sits flush against the two pieces of metal. This allows the metal worker to use the square 210 in situations where other carpenter's squares would be blocked from a close fit by the weld. The person having ordinary skill in the art will recognize that the welder's corner still defines a right corner, since the first and second edges 213 and 214 are normal to each other. The diagonal edge 220 is part of the perimeter edge 218, but is very short, and is so small that the three major sides of the edges 212, 213, and 214 dominate the appearance of the square 210 such that the body 211 generally is triangular.

The body 211 is preferably constructed from a material or combination of materials with rugged, strong, durable, and hard material characteristics. Preferably, the body 211 is made from metal, hard wood, plastic, or like materials offering these characteristics.

The body 211 has a first face 221 and an opposed second face 222 (not visible in FIG. 7). The first and second faces 221 and 222 are flat and parallel to each other, spaced apart by a width Z of the body 211. The first and second faces 221 and 222 are marked with a plurality of indications and measurements. Moreover, slots and slits are formed through the body 211 entirely from the first face 221 through to the other second face 222. For example, in the embodiment shown in FIG. 7, two slots are formed inboard of the first and second edges 213 and 214.

A first slot 223 is parallel to and inboard of the second edge 214. The first slot 223 has opposed major sides 224 and opposed diagonal minor ends 225. The major sides 224 are both parallel to the second edge 214, and the major side 224 proximate to the second edge 214 is larger than the major side 224 distal to the second edge 214. The minor ends 225 are diagonal and directed inward at approximately forty-five degrees, such that the minor end 225 proximate the first edge 213 is canted away from the first edge 213 and the minor end 225 distal to the first edge 213 is canted toward the first edge 213. Thus, the first slot 223 has the appearance of an isosceles trapezoid. The first slot 223 is open such that a pencil can be passed through it to make markings on a workpiece underneath, especially as the square 210 is slid along the workpiece. Along the major side 224 which is proximate the second edge 214 of the square 210, the first face 221 is marked with measured indicators 226. Here, the measured indicators 226 are inch and half-inch markings, measured from the second edge 214. Since the first slot 223 is offset from the first edge 213, the first of the measured indicators is a one-inch marking, because the end of the first slot 23 which is proximate to the first edge 213 is one inch from the first edge 213. In other embodiments, the first slot 223, if existent, has other shapes, orientations, and arrangements.

Another slot, a hypotenuse slot 230, is formed inboard of the hypotenuse edge 212. The hypotenuse slot 230 is parallel to and inboard of the hypotenuse edge 212. The hypotenuse slot 230 has opposed major sides 231 and opposed diagonal minor ends 232. The major sides 231 are both parallel to the hypotenuse edge 212, and the major side 231 proximate to the hypotenuse edge 212 is larger than the major side 231 distal to the hypotenuse edge 212. The minor ends 232 are diagonal and directed inward at approximately forty-five degrees, such that the minor end 232 proximate the first edge 213 is parallel to the first edge 213 and the minor end 232 proximate to the second edge 214 is parallel to the second edge 214. Thus, the hypotenuse slot 230 has the appearance of an isosceles trapezoid. The hypotenuse slot 230 is also open such that a pencil can be passed through it to make markings on a workpiece underneath. Along both major sides 231, the first face 221 is marked with measured indicators 233. In other embodiments, the hypotenuse slot 230, if existent, has other shapes, orientations, and arrangements.

The fence 219 is hinged to the body 211 to move between the three indexed positions, similar to the fence 19. Although in other embodiments, the fence 219 pivots between an alternate number of positions, the embodiment shown here pivots between three for ease and clarity of understanding. After reading this description, one having ordinary skill in the art will readily appreciate how the fence 219 moves among an alternate number of positions in such other embodiments.

The fence 219 has a body 240 which is generally rectangular prismatic, and which extends between two opposed ends 241 and 242. The ends 241 and 242 are flat and parallel to each other, and both are oriented at forty-five degrees to each of the first and second edges 213 and 214. The body 240 of the fence 219 includes a narrow fence edge 243 extending between the two ends 241 and 242. The fence edge 243 is straight and uninterrupted by notches, projections, divots, or other features which would prevent the fence edge 243 from defining a straight line. Opposite the fence edge 243, the body 240 includes an inner edge 244 directed toward the first edge 213 of the body 211 of the square 210. Like the first edge 213, the inner edge 244 is interrupted by hinge assemblies which couple the fence 219 to the body 211 of the square 210. Both the first edge 213 and the inner edge 244 are slightly rounded so that the fence 219 smoothly pivots with respect to the body 211 without interruption or catching.

The body 240 of the fence 219 has a first face and a second face 245 and 246. The faces 245 and 246 are flat and parallel to each other, spaced apart by the same width Z that defines the width of the body 211 of the square 210. When the fence 219 is arranged in its third position, the first face 245 of the fence 219 is registered with and coplanar to the first face 221 of the body 211, and the second face 246 is registered with and coplanar to the second face 221 of the body 211. The first and second faces 245 and 246 are both marked with measured indicators 247 along the fence edge 243. The measured indicators 247 on the first and second faces 245 and 246 are the same, starting at the second end 242 and increasing in number toward the opposed end 241. The fence edge 243 also carries measured indicators which are registered with the measured indicators 247. However, while the measured indicators 247 preferably include tick or hash marks as well as numbers, the measured indicators on the fence edge 243 preferably only include hash marks due to the limited space available on the fence edge 243, similar to those on the fence edge 43 of the square 10. The carpenter can easily sight the numbers on the adjacent first or second face 245 or 246 to identify the measurement.

The fence 219 mounts to the body 211 of the square 210 at preferably two hinge assemblies 250 including structural features and elements on both the fence 219 and the body 211. In fact, the fence 219 mounts to the body 211 of the square 210 in the same way that the fence 19 of the square 10 mounts to the body 11, except that the fences 19 and 219 mount to respectively different edges—the first edge 13 and the hypotenuse edge 212. The two hinge assemblies 250 are identical in structure and differ only in location, and as such, the reader will understand that the description of this hinge assembly 250 applies equally to the description of the other hinge assembly 250. The reference characters are marked onto either of the hinge assemblies 250 to prevent cluttering of the drawing. In other embodiments, there may be fewer or more hinge assemblies 250.

Inboard of the hypotenuse edge 214, a notch 252 interrupts the first edge 213. The notch 252 is blind and extends into the body 211 of the square 210, terminating at an inner wall, which extends between two sides 253 and 254 of the notch 252. The notch 252 defines a receiving space complemental to a tab 255 on the fence 219 which fits into the notch 252.

The tab 255 is an integral, unitary, monolithic projection of the body 240 inner edge 244 of the fence 219. The tab 255 has two opposed ends 256 and 257 normal to the inner edge 244 and an inner edge 258 extending between the ends 256 and 257. Like the inner edge 244 of the fence 219 itself, the inner edge 258 is rounded. The distance between the ends 256 and 257 is approximately half to two-thirds of the distance between the sides 253 and 254 of the notch 252, and so the tab 255 fits easily within the notch 252.

The tab 255 is mounted on a pin or axle 260. Preferably, a bore 61 extends entirely through the tab 255 between its ends 256 and 257. The axle 260 is mounted between the sides 253 and 254 of the notch 252 and is closely received in the bore 261, such that the tab 255, and the fence 219 connected to it, are mounted for pivotal, swinging movement about an axis defined by the axle 260. A compression spring 262 is fit over the axle 260 and compressed between the end 256 of the tab 255 and the side 253 of the notch 252. The compression spring 262 biases the tab 255 toward the other side 254 of the notch 252, defined as a neutral stance. In the neutral stance, the end 257 of the tab 255 is in contact against the side 254 of the notch 252. In the neutral stance, the fence 219 is maintained in a coextensive alignment with the body 211 of the square, as shown in FIG. 7; the end 241 is registered with the first corner 216, and the end 242 is registered with the second corner 217.

The tab 255 is moveable out of this neutral stance into an advanced stance. The advanced stance is not shown, but the user, having read the description of the movement of the tab 55 of the square 10 with respect to FIGS. 2A-2D, will understand the discussion below is analogous. To move the tab 255 out of the neutral stance and into the advanced stance, the carpenter simply grasps the body of the fence 219 and slides it upward, along the hypotenuse edge 213 of the square 210, along the arrowed line S" in FIG. 7. Sliding the fence 219 in this manner compresses the spring 262 between the end 256 and the side 253, and so the carpenter must use force to move the fence 219 to the advanced stance.

An engagement assembly prevents accidental movement of the tab 255 out of the third position. When the tab 255 is in the neutral stance while in the third position, the engagement assembly prevents the fence 219 from moving into the first or second positions. Only when the tab 255 is in the advanced stance can the fence 219 be moved to the first or second positions. As seen in FIG. 7, a groove 264 depends slightly into the second face 222 of the body 211. The groove 264 is in communication with the notch 252, extending from the notch 252 across the second face 222 of the body 211 toward the second edge 214. An identical groove extends into the first face 221 on the other side of the body 211, and another identical groove is formed into the first edge 213 itself. The grooves are individually and collectively identified with the reference character 264, and the reader will understand their structure, location, and function from the description of like grooves 63-65. Each of the grooves 264 are roughly semi-cylindrical cavities.

A tongue 266 complemental to the grooves 264 is carried on the fence 219, and is shown in FIG. 7 in broken, hidden line. The tongue 266 is a semi-cylindrical protrusion formed along the inner edge 244 of the fence 219. The tongue 266 has a longitudinal axis which is parallel to the first edge 213 of the fence 219. The tongue 266 has a proximal end, which is formed integrally and monolithically to the end 257 of the tab 255, and the tongue 266 extends along the first edge to a distal end, presenting a semi-cylindrical convex surface outward between the proximal and distal ends. The tongue 266 is sized and shaped to be received within each of the grooves 264 formed in the body 211 of the square 210. The tongue 266 and the grooves 264 are identical to the tongue 66 and grooves 63-65 shown in FIGS. 2A-2D, but for location on the square 210, and the drawings of FIGS. 2A-2D should inform one having ordinary skill in the art, together with this description, of the structure and location of the tongue 266 and grooves 264.

As the tab 255 moves among the first, second, and third positions of the fence 219, the tongue 266 moves into and out of the grooves 264 to temporarily lock the fence 219 in the first, second, and third positions. When the fence 219 is in the first position, the groove 264 in the first face 221 receives the tongue 266, and interaction of the tongue 266 with that groove 264 prevents pivotal movement of the fence 219 with respect to the body 211. When the fence 219 is in the second position, the groove on the second face 222 receives the tongue 266, and interaction of the tongue 266 with that groove 264 prevents pivotal movement of the fence 219 with respect to the body 211. And when the fence 219 is in the third position, the groove 264 on the hypotenuse edge 212 receives the tongue 266, and interaction of the tongue 266 with that groove 264 prevents pivotal movement of the fence 219 with respect to the body 211.

When the fence 219 is in each of the first, second, and third positions, if the carpenter attempts to pivot the fence 219 to another position, the tongue 266 contacts the side of the respective groove and is prevented from pivotal movement. Thus, each time the tongue 266 is received within one of the grooves 264, the fence 219 cannot be moved unless the tab 255 is first moved out of the neutral stance. As such, in this embodiment, the first, second, and third positions of the fence 219 are defined, discrete, and indexed positions. In this embodiment, the fence 219 can only be placed and temporarily locked into one of these positions. Other embodiments have a fewer or greater number of positions, indexed or otherwise. The fence 219 is temporarily locked because inadvertent or accidental movement out of the position is effectively prevented, yet a carpenter can easily and purposefully move the fence 219 out of position by sliding the fence 219 upward into the advanced stance of the tab 255. As such, the tongue 266 and the grooves 264 define an engagement assembly or spring detent assembly for locking and releasing the fence 219.

When the carpenter desires to move the fence 219 into another position, such as from the third position to the first position, he first slides the tab 255 out of the neutral stance and into the advanced stance. This causes the tongue 266 to slide longitudinally out of the groove 264 in the hypotenuse edge 212. The spring 262 exerts a bias on the tab 255 back toward the neutral stance, and so the carpenter must hold the fence 219 to prevent it from returning to the neutral stance. While still grasping the fence 219 in the advanced stance, the carpenter pivots the fence 219 to the side. When so pivoted, the tongue 266 is registered with but longitudinally offset from the groove 264. The carpenter can then release the fence 219 and allow the spring 262 to bias the fence 219 back to the neutral stance, in an opposite direction from the arrowed line S". When the fence 219 moves back to the neutral stance, the tongue 266 is received by and engages with the groove 264 on the first face 221. The fence 219 is now temporarily locked into the first position.

The fence 219 is preferably made from the same material as the body 211 of the square 210. In some embodiments, the fence 219 includes magnetic elements 267, examples of which are shown in broken line in three locations in the fence 219. The magnetic elements 267 shown in FIG. 7 are circular, disc-shaped magnets and are encased within the body 240 of the fence 219. In other embodiments, the magnetic elements 267 may be offset within the body 240 or flush to one of the first or second faces 245 and 246. The embodiment shown here has three magnetic elements 267 spaced apart along the length of the fence 219. The magnetic elements 267 are useful for aligning and holding the square during metalwork. Some embodiments of fence 219 have fewer magnetic elements 267 than shown here, some have more, and some have no magnetic elements 267 at all.

The square 210 has a dual measurement system. Two different measurements can be made along the first edge 213. The first edge 213 has two sets of measurements indicators. A first set 271 of measurement indicators is marked along the first edge 213. This first set 271 is identifiable in FIG. 7 because the measurement numbers (1, 2, 3, etc.) are oriented with their tops to the left in the drawing. The first set 271 has a zero location from which the rest of the indicators in the first set 271 are measured and to which the first set 271 corresponds. This zero location corresponds to the intersection of lines registered with the first and second edges 213 and 214 in the welder's corner 215.

Alternatively, a second set 272 of measurements indicators is marked along the first edge 213. The second set 272 has a zero location 274 from which the rest of the indicators in the second set 272 are measured and to which the second set 272 corresponds. This zero location 274 corresponds to the intersection of the first edge 213 and the diagonal edge 220.

The first and second sets 271 and 272 of measurement indicators share the same hash marks 275. The hash marks 275 thus can be read with either the first or the second sets 271 and 272 of measurement indicators, depending on the arrangement of the fence 219. However, the numbered markings for the first and second sets 271 and 272 are different. The second zero location 274 is offset from the first zero location, and so the numbered markings for the second set 272 of measurement indicators is offset from the first set 272 of measurements indicators.

Like the square 10 and the square 160, the square 210 preferably carries a bubble level 280, but the bubble level 280 is different from the bubble levels 82 and 180. The bubble level 280 is one embodiment of a bubble level, though it shares many similarities to the bubble level 180.

The bubble level 280 has a central hub like the bubble level 180, but has a semi-annulus encircling the hub instead of a fully circular annulus. A float floats freely between the hub and the semi-annulus depending on the orientation of the square 210. The bubble level 280 is set into a hold 281 in the body 211 of the square 210. The hold 281 is a bore formed through the body 211 from the first face 221 through to the second face 221. The bubble level 280 is fit snugly into the hold 281, but in some embodiments, the bubble level 280 is secured in the hold 281 not just with a snug fit but with adhesive or some other fastener.

The bubble level 280 is formed from a thin sidewall 283 which is preferably symmetric about a central axis parallel to the first and second faces 221 and 222. The sidewall 283 has an upper wall (shown in FIG. 7, but similar to the first wall 184 of the bubble level 180) and a lower wall (under the upper wall, similar to the second wall 185 of the bubble level 180), which are preferably symmetric to each other. The upper and lower walls meet at the inner wall of the hold 281. Extending radially inward from the inner wall, the upper and lower walls expand outwardly away from each other, until an inflection point 286. The inflection point 286 is a generally circular boundary between the annulus (outside the inflection point 286) and the hub (inside the inflection point 286). Within the inflection point 286, the upper and lower walls each define a truncated or severed sphere, having only a rounded portion which is less than a semi-sphere. Together, the upper and lower walls cooperate to define a roughly egg-shaped space at the hub, within the inflection point 286. In other embodiments, this hub has other shapes.

Within the inflection point 186, the first and second walls 184 and 185 both rise to a top 289 which is flush with or just inboard of the first and second faces 221 and 222, respectively. As such, the bubble level 280 is bound within the body 211 by the first and second faces 221 and 222. In other embodiments, the hub or top 289 may extend beyond these first and second faces 221 and 222, but scratching damage to the bubble level 280 may be possible in such other embodiments.

The sidewall 283 is preferably transparent, such that the metalworker can look through the bubble level 280 from either side of the square 210 and view an interior 287 of the bubble level 280. The interior 287 is substantially filled with a fluid, but for a float 288. The float 288 is a small, transparent, and rigid sphere or capsule with a small marking 285 such as a dot. The marking 285 is centrally located within the float 288, such that the float 288 has spherical symmetry with respect to the marking 285. The float 288 is preferably otherwise empty. It has a density which is lower than the surrounding fluid, and the float 288 rises to the relative top of the fluid depending on the orientation of the square 210. In other embodiments of the bubble level 280, the float 288 may instead be a simple bubble in the fluid.

Unlike the bubble level 180, the bubble level 280 is severed and incomplete. Instead of the sidewall 283 extending completely around in a continuous full circle, two interrupting edges 290 and 291 sever the annulus, each extending inward from the perimeter of the bubble level 280 to meet at a corner which is offset from the center of the bubble level 280. This corner is preferably directed generally toward the welder's corner 215. The edges 290 and 291 preferably do not run through the top 289.

The bubble level 280 includes various indications. The bubble level 280 has a bullseye formed by a horizontal line 292 and a vertical line 293 at a right angle to the horizontal line, each extending entirely across the diameter of the sidewall 183 and through the top 289 of the sidewall 183, on both sides. The horizontal line 292 is parallel to the hypotenuse edge 212, and the vertical line 293 is normal to the hypotenuse edge 212. A circular line 294 is centered at the intersection of the horizontal and vertical lines 292 and 293. When the square 210 is laid flat, such that its second face 221 is against a horizontal surface, the float 288 rises to the top 289 and settles somewhere within or near the circular line 294. This tells the metalworker how close to level the horizontal surface actually is. If the float 288 touches part of the circular line 294, then then the horizontal surface is off level, such as by 2% or another value. If the float 288 is further outside the circular line 294, then the horizontal surface is further off.

The bubble level 280 also allows the metalworker to check a surface for any angle. Radial hash marks 295 are scribed on the annulus of the sidewall 283 just inboard of the inner wall of the hold 281. The hash marks 295 are angular measurements, with a zero angle corresponding to the hash mark 295 at the end of the vertical line 293 which is proximate the second corner 217. If the first edge 213 is laid on a surface that is, for example, angled at seventeen degrees, the float 288 will rise to the hash mark 295 corresponding to seventeen degrees (or to a space between hash marks 295 corresponding to sixteen and eighteen degrees, or to some other space between hash marks 295 flanking seventeen degrees).

In the embodiment shown here, the bubble level 280 occupies a large portion of the middle of the body 211 of the square 210. Because of the size of the bubble level 280, the square 210 preferably does not include a medial slit 22, a second slot 30, a laser 80, or a jig block 81. In other embodiments, however, the bubble level 280 is smaller or larger, as needed for the particular implementation and work to be done with the square 210. And in such other embodiments, the square 210 includes a medial slit 22, a second slot 30, a laser 80, a jig block 81, or some combination of those elements. The scope of this disclosure and the embodiments described includes all permutations of the various structural elements and features of all embodiments disclosed herein.

FIGS. 8-10B illustrate a carpenter level 310. The carpenter's level 310 is exemplary of any of several elongate levels, such as a box level, mason's level, torpedo level, post level, and other like levels. The carpenter level 310 here is long, such as four feet in length, but in other embodiments is only a few inches long or eight feet long.

The carpenter level 310 includes a frame 311 carrying a round bubble level 312 and two square bubble levels 313. The carpenter level 310 is useful for finding level, plumb, and all angles of measurement.

The frame 311 is elongate, extending between two opposed ends 320 and 321 which are preferably blunt and parallel to each other. The frame 311 has long top and bottom edges 322 and 323, and long front and back faces 324 and 325. The back face 325 is shown in FIG. 9B but not in FIG. 8. The top and bottom edges 322 and 323 are normal to the ends 320 and 321 and to the faces 324 and 325. The ends 320 and 321, the top and bottom edges 322 and 323, and the front and back faces 324 and 325 cooperate to give the frame 311 a generally box-like or rectangular prismatic appearance.

The frame 311 includes three holds: a first or left hold 331, and a second or right hold 332, and a third or intermediate hold 333. The holds 331, 332, and 333 are voids in the frame 311 which receive and hold the bubble levels 312 and 313. The hold 331 is proximate to the end 320 and is referred to as a left hold 331 only for convenience and without the scope of the disclosure. The hold 332 is proximate to the other end 321 and is referred to as a right hold 332 only for convenience and without limiting the scope of the disclosure. The hold 333 is located in an intermediate position between the ends 320 and 321, preferably but not necessarily halfway between the ends 320 and 321. It is referred to as an intermediate hold 333 only for convenience and without limiting the scope of the disclosure.

Figure 9A:
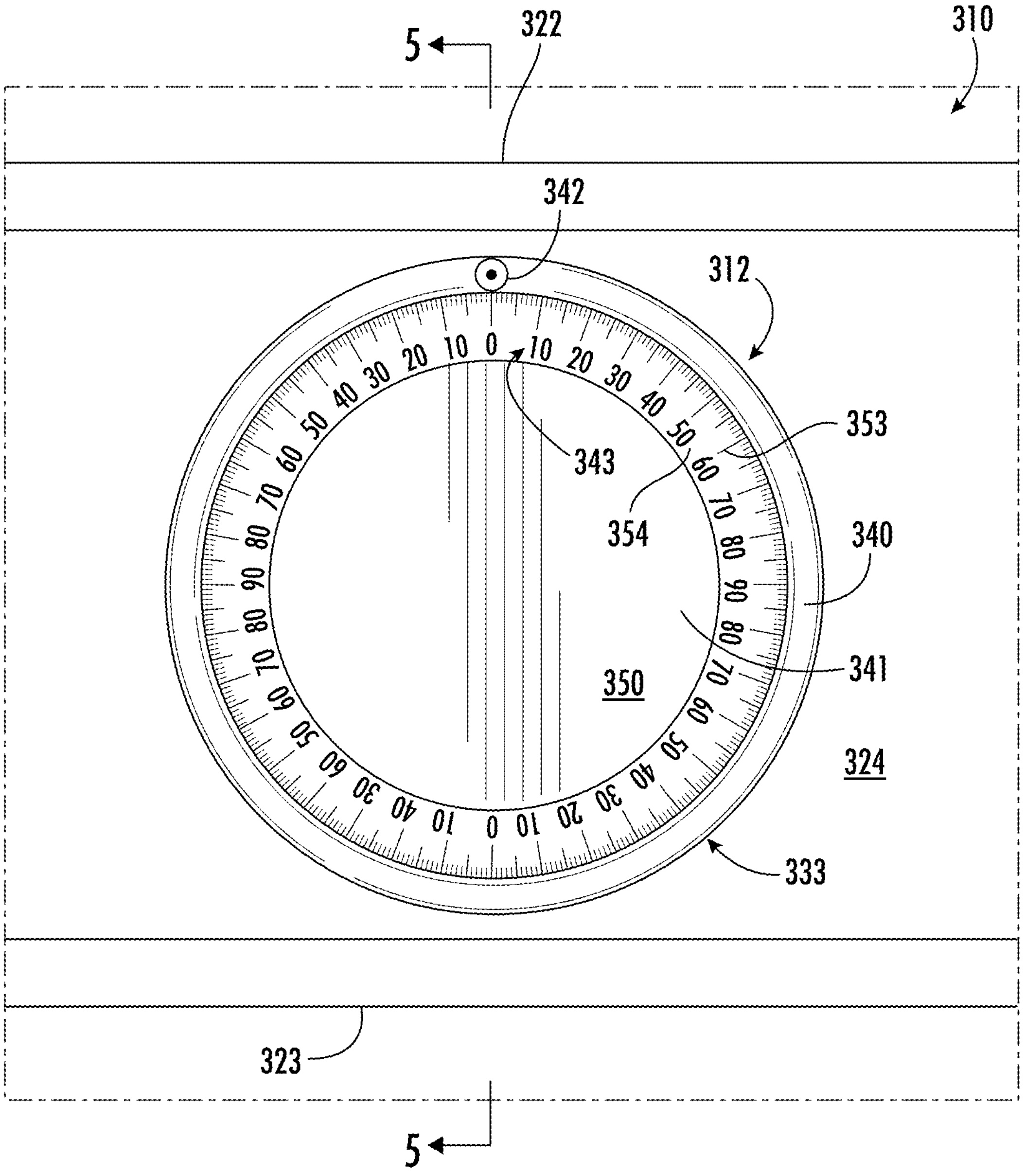
FIG. 9A is an enlarged view of the round bubble level of FIG. 8.

FIG. 9A is an enlarged view of the round bubble level 312 set into the intermediate hold 333. The bubble level 312 is circular in shape and includes an annular perimeter tube and a plurality of hash marks to indicate a relative angular displacement of the box level 310.

Referring to both FIG. 9A and FIG. 9B, the bubble level 312 includes a tube 340 surrounding a middle 341. A float 342 moves around the tube 340 to the top-most location, and markings 343 on the middle 341 allow the carpenter to identify the angular displacement of the box level 310.

The tube 340 has a thin sidewall 344 which is preferably symmetric about a central axis extending normal through the box level 310. The sidewall 344 is preferably transparent and preferably circular in cross-section, as shown in FIG. 9B. In other embodiments, the sidewall 344 has other shapes and configurations. The outer diameter of the sidewall 344 is equal to or less than the thickness of the frame 311 between the front and back faces 324 and 325, such that the sidewall 344 is unlikely to be scratched by surface contact on the front and back faces 324 and 325.

The sidewall 344 bounds and defines an annular interior 345 of the bubble level 312. The interior 345 is substantially filled with a fluid 346 but for the float 342. The float 342 is a small, rigid, and preferably transparent sphere with a small marking 347 such as a dot. The marking 347 is centrally located within the float 342, such that the float 342 has spherical symmetry with respect to the marking 347. The float 342 is otherwise preferably empty. It has a density which is lower than the surrounding fluid 346, and the float 342 rises to the relative or local top of the fluid 346 depending on the orientation of the box level 310. In other embodiments of the bubble level 312, the float 342 may instead be a simple bubble in the fluid 346.

The tube 340 surrounds the middle 341. The middle is a disc-shaped solid frame element, seated within the tube 340. Like the frame 311 of the level 310, it has opposed front and back faces 350 and 351. The front and back faces 350 and 351 are preferably coplanar to the corresponding front and back and faces 324 and 325 of the frame 311, such that the middle 341 has the same thickness as the frame 311. In other embodiments, the middle 341 is thinner than the frame 311, and the front and back faces 350 and 351 are closer together than pictured here in FIG. 9B.

The middle 341 has a perimeter 352 which is in contact with an inner side of the tube 340. Along the perimeter, but on the front and back faces 350 and 351, the middle 341 is marked with the markings 343. The markings 343 include radial hash marks 353 scribed into or onto the front and back faces 350 and 351 just inboard of the perimeter 352. The hash marks 353 are angular measurements, with a zero angle corresponding to the two opposed hash marks 353 proximate the top and bottom edges 322 and 323. Some of the hash marks 353 are marked with numerical references 354 so that the carpenter can quickly and easily identify the angle.

Figure 8:
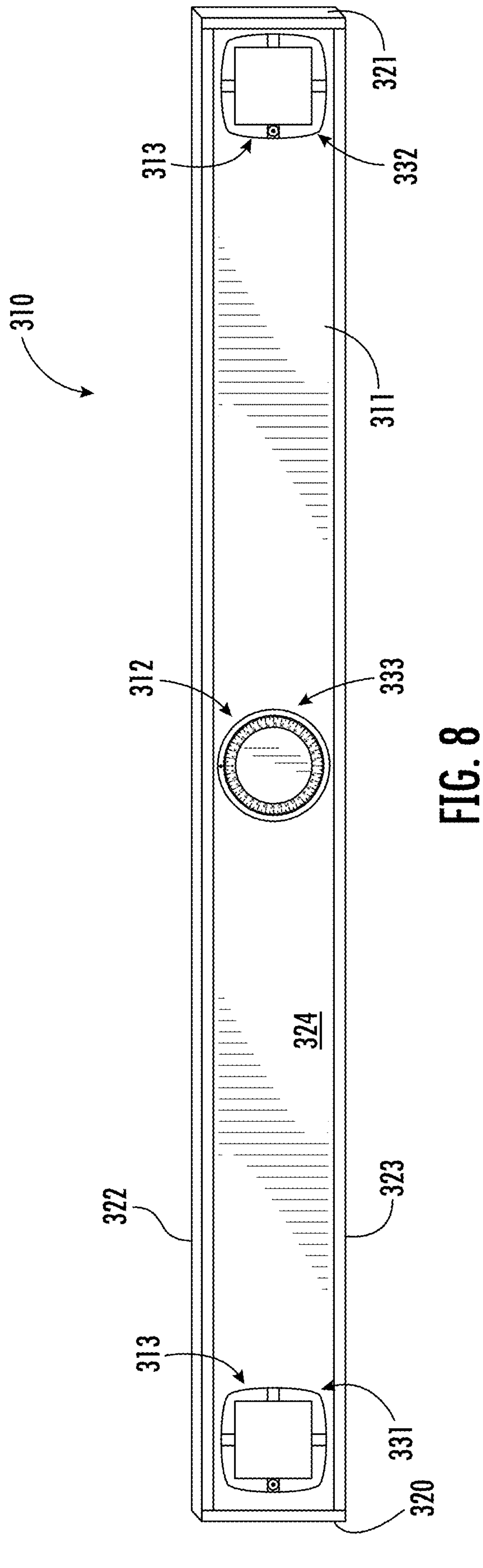
FIG. 8 is a perspective view of an improved carpenter level having round and square bubble levels.
Figure 9B:
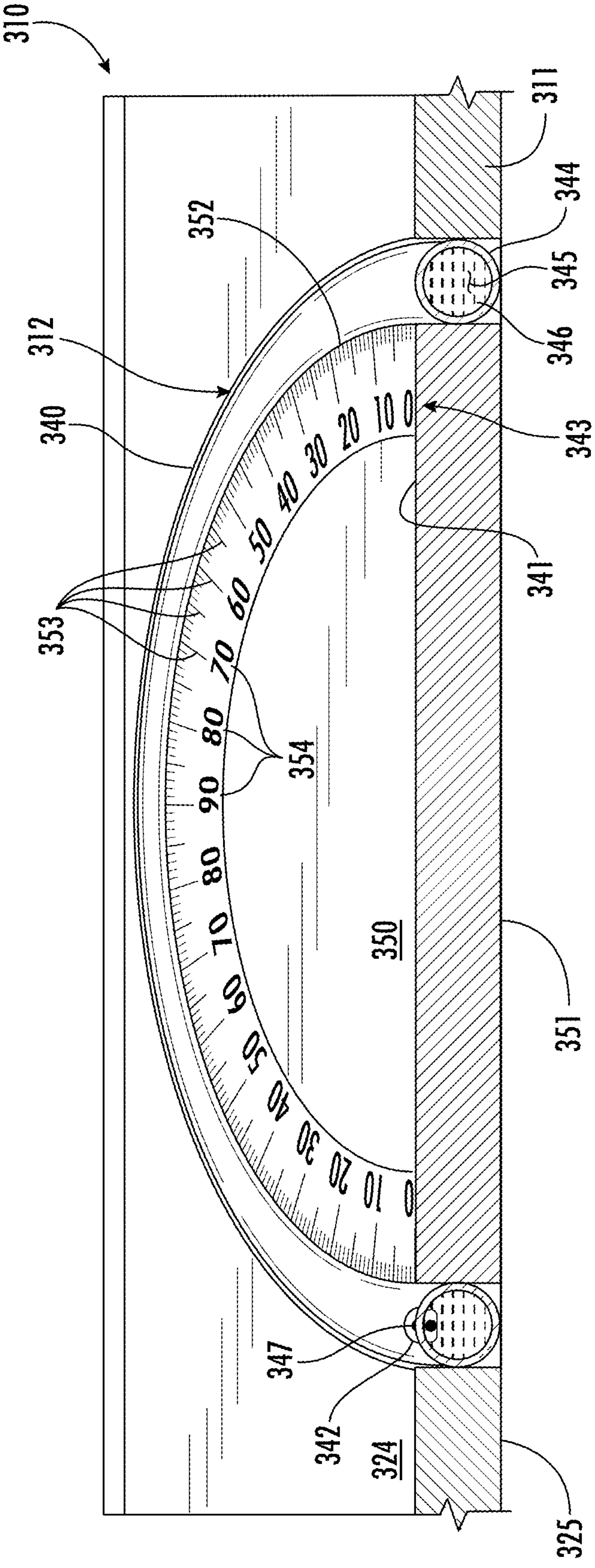
FIG. 9B is a section view of the round bubble level taken along the line 9-9 from FIG. 9A.

In the embodiment shown in FIG. 8, the bubble level 312 occupies an intermediate location in the box level 310. In other embodiments, it can be located in other parts of the box level 310. Or, it can be switched with the square levels 313.

Figure 10A:
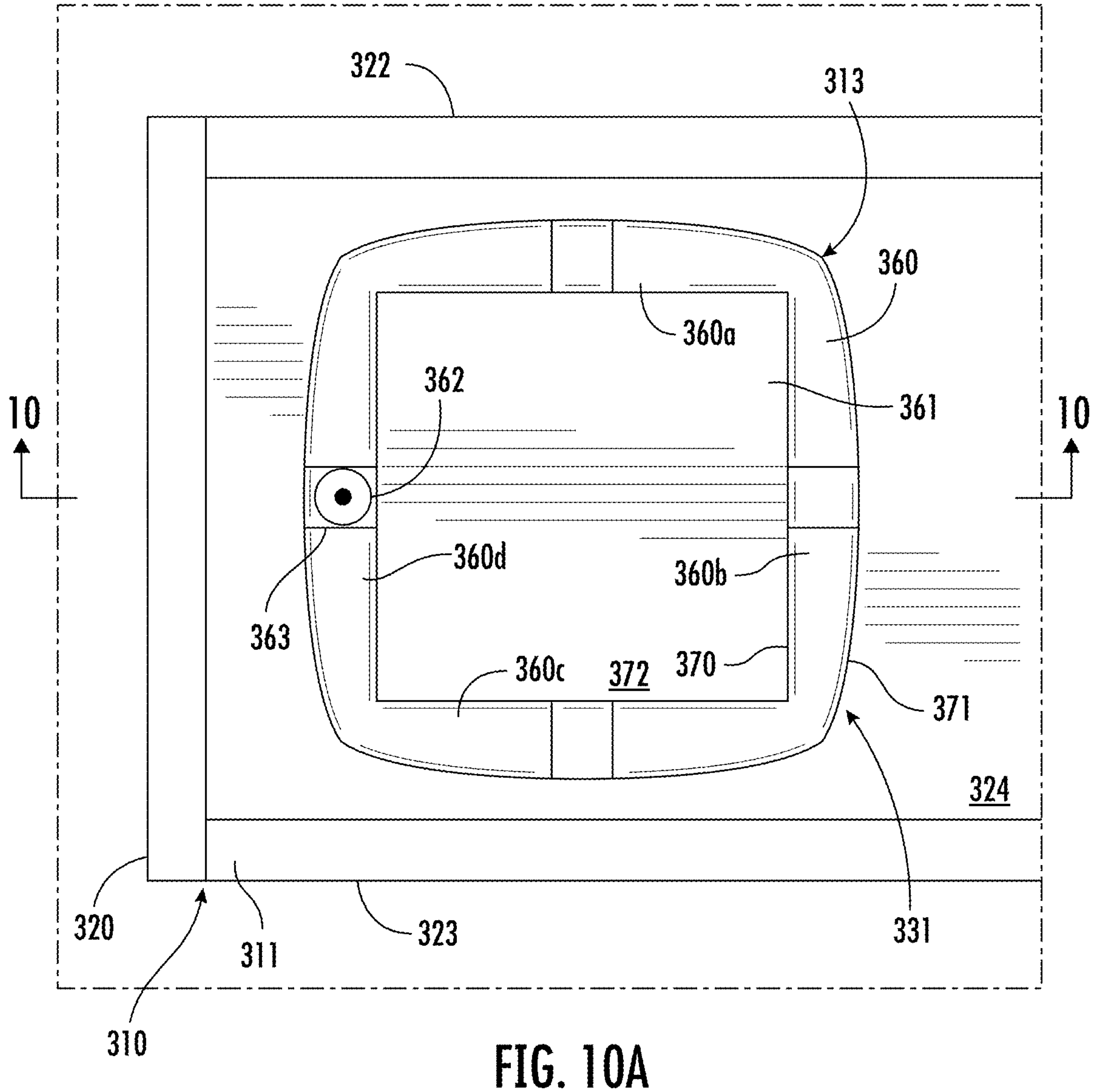
FIG. 10A is an enlarged view of the square bubble level of FIG. 8.

FIG. 10A is an enlarged view of the square bubble level 313 set into the first hold 331, proximate the end 320. The square bubble level 313 in the second hold 332 is identical to the bubble level 313 in the first hold 331 in every respect but location. As such, description here will be made only with respect to the bubble level 313 in the first hold 331, with the understanding that it applies equally to the bubble level 313 in the second hold 332. The bubble level 313 is very roughly square in shape and includes an annular perimeter tube and a plurality of hash marks to indicate a relative angular displacement of the box level 310.

Figure 10B:
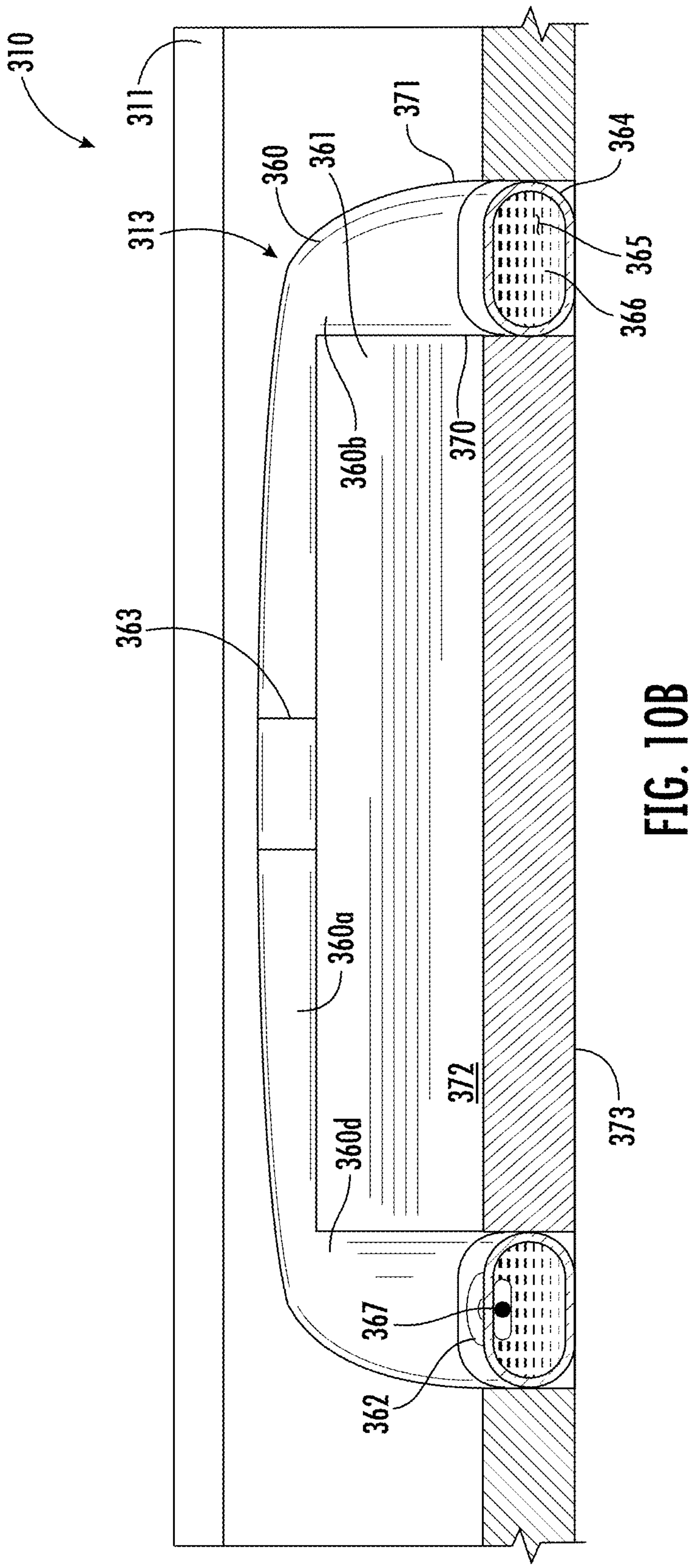
FIG. 10B is a section view of the square bubble level taken along the line 10-10 from FIG. 10A.

Referring to both FIG. 10A and FIG. 10B, the bubble level 313 includes a tube 360 surrounding a middle 361. A float 362 moves around the tube 360 to the top-most location, and markings 363 on the tube 360 allow the carpenter to identify the angular displacement of the box level 310. The tube 360 is generally square in shape and has four sections 360*a*, 360*b*, 360*c*, and 360*d*.

The tube 360 has a thin sidewall 364 which is preferably transparent and preferably oval in cross-section, as shown in FIG. 10B. In other embodiments, the sidewall 364 has other shapes and configurations. The sidewall 364 has a dimension which is equal to or less than the thickness of the frame 311 between the front and back faces 324 and 325, such that the sidewall 364 is unlikely to be scratched by surface contact on the front and back faces 324 and 325.

The sidewall 364 bounds and defines a roughly square interior 365 of the bubble level 313. The interior 365 is substantially filled with a fluid 366 but for the float 362. The float 362 is a small, rigid, and preferably transparent sphere or disk with a small marking 367 such as a dot. The marking 367 is centrally located within the float 362, such that the float 362 has symmetry with respect to the marking 367. The float 362 is otherwise preferably empty. It has a density which is lower than the surrounding fluid 366, and the float 362 rises to the relative or local top of the fluid 366 depending on the orientation of the box level 310. In other embodiments of the bubble level 313, the float 362 may instead be a simple bubble in the fluid 366.

The tube 360 surrounds the middle 361. The tube 360 has a continuous inner edge 370 bounding the middle 361 and an opposed continuous outer edge 371. The continuous inner edge 370 is square: it includes four linear edges of the same length each parallel to one other linear edge and perpendicular to two other linear edges. This defines the middle 361 as a square-shaped element. However, the continuous outer edge 371 is only roughly square. The outer edge 371 is slightly convex outward between the four corners of the outer edge 371. Although the float 362 appears large in FIG. 10A, the corners are large enough that the float 362 can move between the four sections 360*a*-360*d* of the tube 360 without impedance. FIG. 10B shows a preferred size of the float 362 more clearly, without magnification of the transparent sidewall 364.

The float 362 moves freely throughout the bubble level 313 in response to movement of the box level 310. Each of the four sections 360*a*-360*d* of the square bubble level 313 has two spaced-apart markings 363 which are level lines. The sections 360*a* and 360*c* are parallel to the top and bottom edges 322 and 323, the sections 360*b* and 360*d* are parallel to the ends 320 and 321. In each section 360*a*-360*d*, the outer edge 371 is furthest from the inner edge 370 between the markings 363, such that the markings 363 represent a local top of each section 360*a*-360*d*. The markings 363 are spaced apart from each other at a distance just greater than the outer dimension of the float 362. When the top or bottom edge 322 or 323 is placed against an object and the float 362 is between the markings 363 in the section 360*c* or 360*a*, respectively, the bubble level 313 indicates that the surface of the object has particular measurement, such as level. If the float 362 touches one of the markings 363, however, then the surface of the object is off that measurement, such as aby 2% or another value. And if the float 362 is further outside the markings 363, then the surface of the object is even further off that measurement.

The middle 361 is a solid square frame element, seated within the tube 360. Like the frame 311 of the level 310, it has opposed front and back faces 372 and 373. The front and back faces 372 and 373 are preferably coplanar to the corresponding front and back and faces 324 and 325 of the frame 311, such that the middle 361 has the same thickness as the frame 311. In other embodiments, the middle 361 is thinner than the frame 311, and the front and back faces 372 and 373 are closer together than pictured here in FIG. 10B.

In the embodiment shown in FIG. 8, the bubble levels 313 occupy locations proximate the ends 320 and 321 in the box level 310. In other embodiments, either or both of the levels 313 can be located in other parts of the box level 310. Or, it can be switched with the round level 312. Further, it should be understood that the bubble levels 312 and 313 could be incorporated into the carpenter squares 10, 110, 160, and 210 described above, either by replacing or adding the level features in those squares, and such incorporation is considered to be within the scope of this disclosure. Moreover, the levels and other features, such as the laser or jig, described with respect to the carpenters square 10, 110, 160, and 210 could be incorporated into the box level 310 (or other similar levels, such as a box level, mason's level, torpedo level, post level, and other like levels) without departing from the scope of this disclosure. The scope of this disclosure and the embodiments described includes all permutations of the various structural elements and features of all embodiments disclosed herein.

Embodiment of FIGS. 11A-12G

FIGS. 11A-12G illustrate another embodiment of a carpenter square 410 (hereinafter, the "square 410"). The square 410 is similar to the above embodiments, including the square 10. As such, many of the reference characters used with other embodiments are also used here to identify the same or similar structural elements or features. For instance, the square 410 includes a body 11 having three edges. The square 410 has: 1) a hypotenuse edge 12 opposite a right corner 15; 2) a short first edge 13 extending between the right corner 15 and a first corner 16 formed by and between the short first edge 13 and the hypotenuse edge 12; and 3) a short second edge 14 extending between the right corner 15 and a second corner 17 formed by and between the short second edge 14 and the hypotenuse edge 12. These three edges cooperate to define a perimeter edge 18 of the body 11 of the square 410 itself. Not all structural elements and features of the square 410 are described, as the reader is well familiar with those structural elements and features from the rest of this description.

Pivoted to the first edge 13 is a fence 411. The fence 411 is a roughly rectangular piece of material coextensive to the first edge 13. The fence 411 pivots between preferably three indexed positions similar to those of the fence 19: a first position in which the fence 411 is normal to the body 11 in a first direction; a second position in which the fence 411 is normal to the body 11 in a second direction, opposite the first direction; and a third position in which the fence 411 is coplanar to the body 11. These positions correspond to the first, second, and third positions of the square 10 as shown in FIG. 1C.

When the fence 411 is in either of the first or second positions, a carpenter can lay most of the square 410 flat on a surface with the fence 411 against a straight edge and can mark lines on the surface. The normal arrangement of the fence 411 to the body 11 of the square 410 makes quick alignment of the square 410 easy. If the carpenter desires to lay the square 410 entirely on the workpiece and inboard from the straight edge, however, he need only move the fence 411 to the third position, such that the fence 411 is aligned coplanar to the body 11 and the entirety of the square 410 can be laid flat on the workpiece.

The body 11 of the square 410 is generally triangular, because the perimeter edge 18 generally has three major sides or lengths. The first and second edges 13 and 14 meet at the right corner 15, and the second edge 14 and hypotenuse edge 12 meet at the acute second corner 17. The first edge 13 and the hypotenuse edge 12 meet at the first corner 16, which is acute, but is blunted or truncated by a short fourth edge. As such, the perimeter edge 18 technically has four sides or four edges, but the very short side at the first corner 16 is so small that the three major sides of the edges 12, 13, and 14 dominate the appearance of the square 410 such that the body 11 generally is triangular. In this way, the square 410 somewhat peculiarly has a triangular body 11 defined by a perimeter edge 18 with four sides.

The body 11 is preferably constructed from a material or combination of materials with rugged, strong, durable, and hard material characteristics. Preferably, the body 11 is made from metal, hard wood, plastic, or like materials offering these characteristics.

The body 11 has a first face 420 and an opposed second face 421. The faces 420 and 421 are flat and parallel to each other, spaced apart by a width of the body 11. The faces are marked with a plurality of indications and measurements. Moreover, slots and slits are formed through the body 11 entirely from the first face 420 through to the second face 421. As shown in previous embodiments, the slots and slits may have various arrangements and embodiments, and the slots and slits of those other embodiments are incorporated here and should be considered as included variations of the embodiment of the square 410 shown here.

Figure 11A:
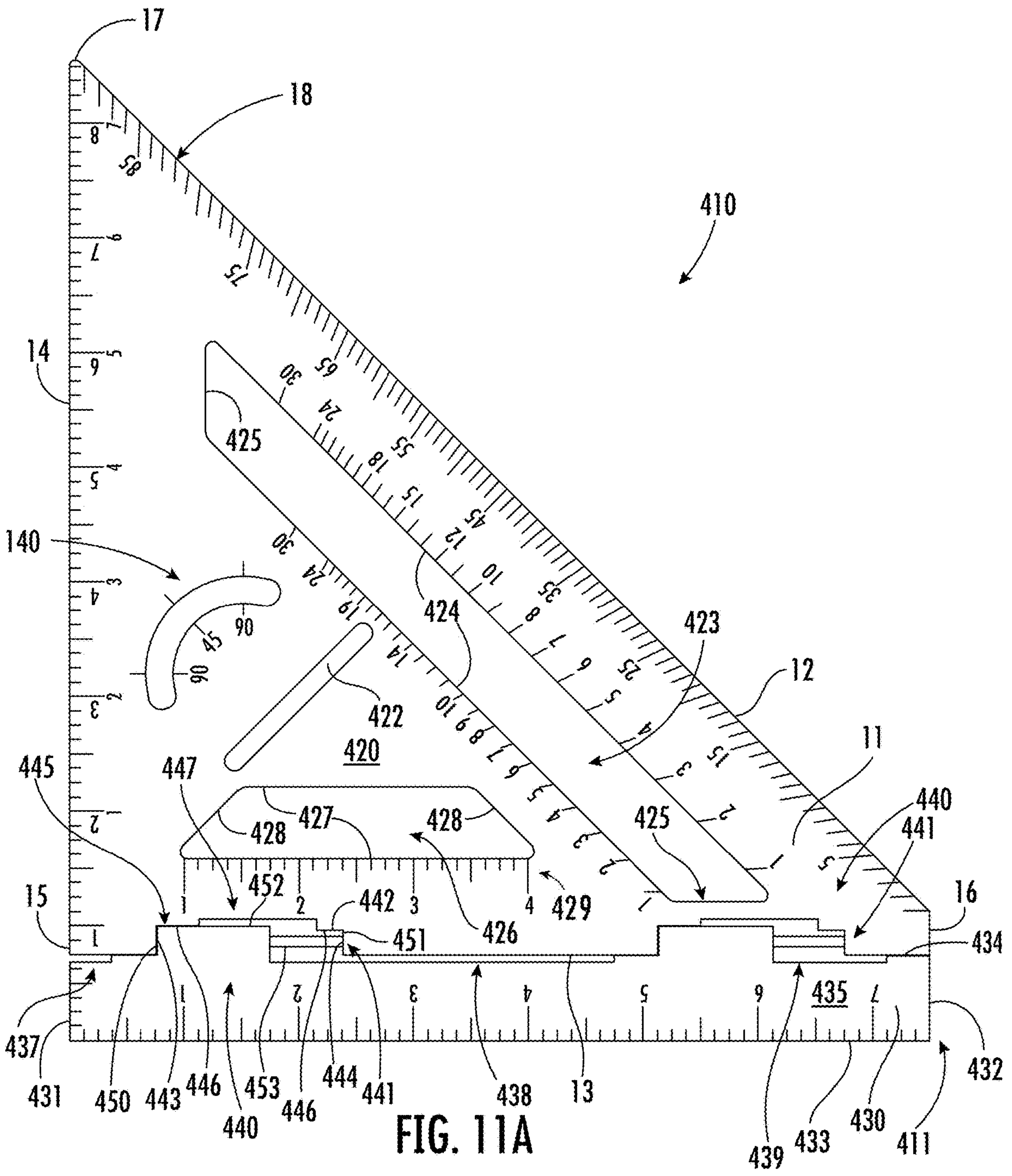
FIGS. 11A and 11B are elevation and perspective views of an embodiment of an improved carpenter square having a fence mounted for swinging movement.
Figure 11B:
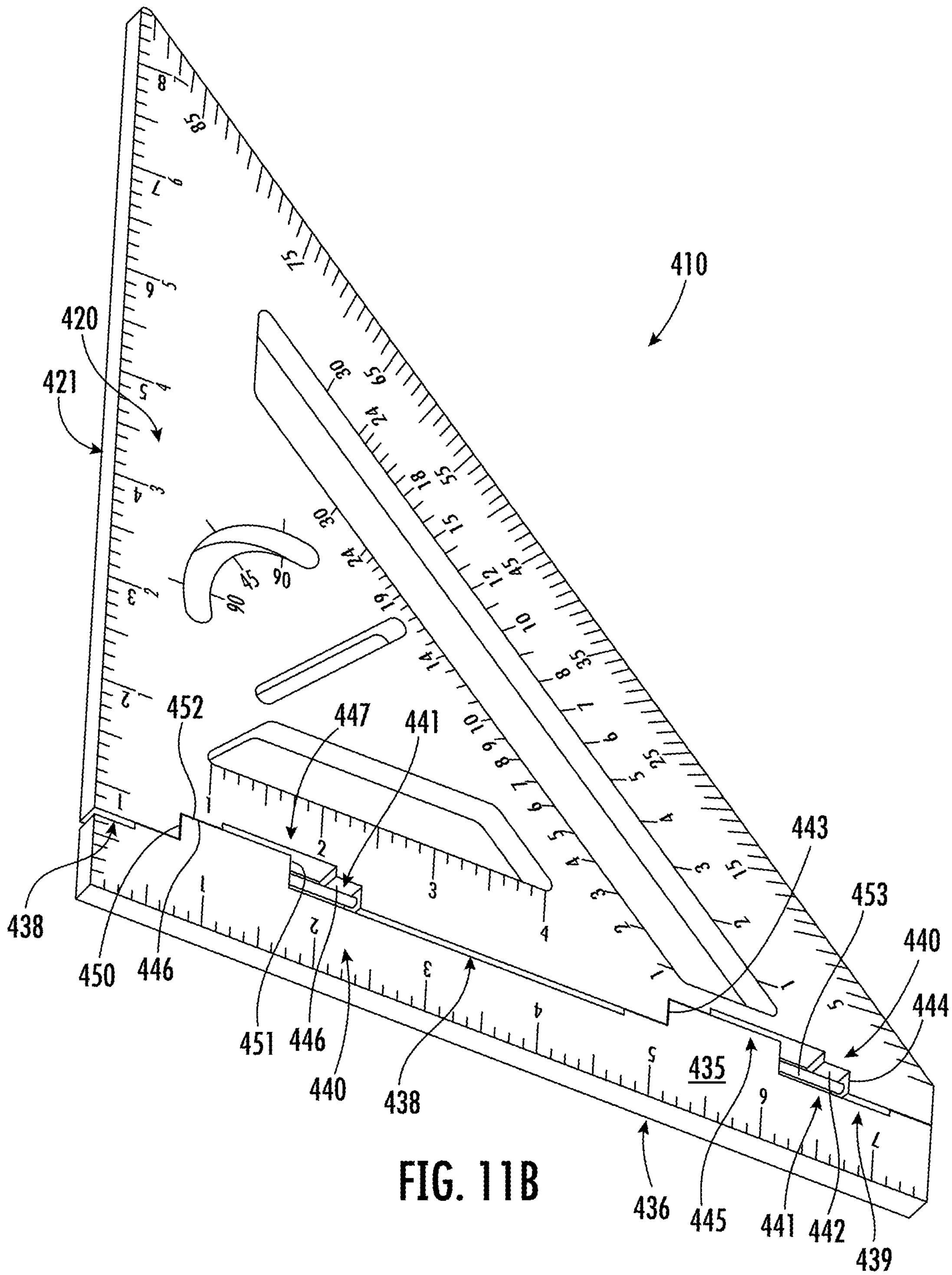

For example, in the embodiment shown here, a medial slit 422 extends diagonally through the body 11. The medial slit 422 is linear or straight. The medial slit 422 extends generally at a forty-five-degree angle with respect to both the first and second edges 13 and 14, roughly intermediate those two edges 13 and 14. In other embodiments, the medial slit 422 has other shapes, orientations, and arrangements, and the embodiment shown in FIGS. 11A-11B is not limiting. The medial slit 422 may be useful for making markings on the workpiece below the square 410 but may be useful with a jig block 81 for laying out cut patterns, as described with respect to the square 10 embodiment.

A hypotenuse slot 423, is formed parallel to and inboard of the hypotenuse edge 12. The hypotenuse slot 423 has opposed major sides 424 and opposed diagonal minor ends 425. The major sides 424 are both parallel to the hypotenuse edge 12, and the major side 424 proximate to the hypotenuse edge 12 is larger than the major side 424 distal to the hypotenuse edge 12. The minor ends 425 are diagonal and directed inward at approximately forty-five degrees, such that the minor end 425 proximate the first edge 13 is parallel to the first edge 13 and the minor end 425 proximate to the second edge 14 is parallel to the second edge 14. Thus, the hypotenuse slot 423 has the appearance of an isosceles trapezoid. The hypotenuse slot 423 is open from the first face 420 through to the second face 421 such that a pencil can be passed through it to make markings on a workpiece underneath. Along both major sides 34, the first face 20 is marked with measured indicators. In other embodiments, the hypotenuse slot 423, if existent, has other shapes, orientations, and arrangements.

In this embodiment, the square 410 has another slot 426. The slot 426 is parallel to and inboard of the first edge 13. The slot 426 has opposed major sides 427 and opposed diagonal minor ends 428. The major sides 427 are both parallel to the first edge 13, and the major side 427 proximate to the first edge 13 is larger than the major side 427 distal to the first edge 13. The minor ends 428 are diagonal and directed inward at approximately forty-five degrees, such that the minor end 428 proximate the second edge 14 is canted away from the second edge 14 and the minor end 428 distal to the second edge 14 is canted toward the second edge 14. Thus, the slot 426 has the appearance of an isosceles trapezoid. In some embodiments, the slot 426, if existent, has other shapes, orientations, and arrangements.

The slot 426 is open from the first face 420 through to the second face 421, such that a pencil can be passed through the slot 426 to make markings on a workpiece underneath the slot 426. Along the major side 427 which is proximate the first edge 13 of the square 10, the first face 20 is marked with measured indicators. In this embodiment, the measured indicators 429 are shown in imperial system measurements of inches and divisions thereof, as measured from the second edge 14. Since the slot 426 is offset from the second edge 14, the first of the measured indicators 429 is a two-inch marking. In other embodiments, the measured indicators 429 are shown in metric system measurements. Indeed, all markings on the square 410 (or other squares in this disclosure) may be shown in imperial, metric, or any other system of measurement.

The fence 411 is hinged to the body 11 to move or swing between the three indexed positions. Although in other embodiments, the fence 411 pivots between an alternate number of positions, the embodiment shown here pivots between three for ease and clarity of understanding. For example, the fence 411 can move between one, two, three, four, five, or more positions. After reading this description, one having ordinary skill in the art will readily appreciate how the fence 411 moves among an alternate number of positions in such other embodiments.

Still referring to FIGS. 11A and 11B, but also FIGS. 12A-12G, the fence 411 has a body 430 which is generally rectangular prismatic and which extends between two opposed ends 431 and 432. The ends 431 and 432 are flat and parallel to each other, and both are parallel to the second edge 14. The body 430 of the fence 411 includes a fence edge 433 extending between the two ends 431 and 432 and directed away from the body 11 of the square 410. The fence edge 433 is straight and uninterrupted by notches, projections, divots, or other features which would prevent the fence edge 433 from defining a straight line. Opposite the fence edge 433, the body 430 of the fence 411 includes an inner edge 434 directed toward the first edge 13 of the body 11 of the square 410. Like the first edge 13, the inner edge 434 is interrupted by hinge assemblies which pivotally couple the fence 411 to the body 11 of the square 410 at the first edge 13 thereof.

The inner edge 434 has three depressions: a first depression 437, a second depression 438, and a third depression 439. Each of the depressions 437, 438, and 439 is a slight recess formed into the body 430 of the fence 411, recessed away from the inner edge 434 thereof.

The body 430 of the fence 411 has a first face 435 and an opposed second face 436. The first and second faces 435 and 436 are flat and parallel to each other, spaced apart by the same width that defines the width of the body 11 of the square 410. When the fence 411 is arranged in its third position, the first face 420 of the fence 411 is registered with and coplanar to the first face 420 of the body 11, and the second face 421 is registered with and coplanar to the second face 421 of the body 11. The first and second faces 435 and 436 of the fence 411 are both marked with measured indicators along the fence edge 433. The measured indicators on the first and second faces are the same, starting at the first end 431 and increasing in number toward the opposed end 432. As with other embodiments, the first and second faces carry two offset measurements along the second edge 14; repeated discussion of those two sets of measurements is not necessary, their description being incorporated by reference herein.

The fence 411 mounts to the body 11 of the square 410 at preferably two hinge assemblies 440 which include structural features and elements on both the fence 411 and the body 11 such as, but not limited to, a notch in the body, a recess in the notch, a pin in the notch, a tab on the fence, and the depressions 437, 438, and 439 in the fence 411, as well as various flat faces and edges of both the fence 411 and the body 11 themselves. The hinge assemblies 440 are identical in structure and differ only in location, and as such, the reader will understand that the description of one hinge assembly 440 applies equally to the description of the other hinge assembly 440. In other embodiments, there may be fewer or more hinge assemblies 440.

The first edge 13 has a flat surface and is squared, forming sharp, rectangular corners with both the first and second faces of the body 11. Inboard of the second edge 14 on the side of the square 10, a notch 441 interrupts the first edge 13. The notch 441 is blind and rectangular prismatic. It extends into the body 11 of the square 410, terminating at an inner wall 442, which extends between two opposed sides 443 and 444 of the notch 441. The notch 441 defines a rectangular prismatic receiving space which is larger than a tab 445 on the fence 411 which fits into the notch 441. Sharp squared corners define all edges of the notch 441 and the tab 445. The notch 441 presents two spaced-apart inner faces 446 toward the fence 411. The inner faces 446 are flat, and are squared with respect to the first and second faces of the body 11. The inner faces 446 may also be referred to as notch faces.

The inner faces 446 are spaced apart by a recess 447 which extends further into the body 11 of the square 410 from the first edge 13 than does the notch 441. The recess 447 is located generally intermediately with respect to the sides 443 and 444 of the notch 441, and the recess 447 spaces the two flat inner faces 446 apart from each other. The recess 447 thus defines a depression into the body 11 with respect to the inner faces 446. The recess 447 corresponds in width to the tab 445; the distance between the inner faces 446 corresponds to the distance between the ends of the tab 445.

The tab 445 is an integral, unitary, monolithic rectangular prismatic projection of the body 430 of the fence 411 at the inner edge 434 of the fence 411. The tab 445 has two opposed ends 450 which project toward the body 11 of the square 410, normal to the inner edge 434 and to an inner edge 452 extending between the ends. Like the inner edge 434 of the fence 411 itself, the inner edge 452 of the tab 445 is flat and is squared with respect to the first and second faces 435 and 436 of the fence 411. The first and second faces 435 and 436 of the fence 411 extend and cover the tab 445 and so are considered to be first and second faces of the tab 445, and the inner edge 452 is considered a third face, all of which are flat.

The distance between the ends 450 and 451 of the tab 445 is approximately half to two-thirds of the distance between the sides 443 and 444 of the notch 441, and so the tab 445 laterally fits easily within the notch 441. The distance between the ends 450 and 451 of the tab 445 corresponds to the width of the recess 447 such that the tab 445 can just fit within the recess 447.

The tab 445 is mounted on a pin or axle 453. Preferably, a bore extends entirely through the tab 445 between its ends 450 and 451. The axle 453 is mounted between the sides 443 and 444 of the notch 441 and is closely received in the bore, such that the tab 445, and the fence 411 connected to it, are fit over the axle 453 and mounted both reciprocal movement along the axle 453 and for pivotal, swinging movement about an axis defined by the axle 453. In some embodiments, a compression spring is fit over the axle 453 and compressed between one of the ends 450, 451 of the tab 445 and the corresponding side 443, 444 of the notch 441. In such embodiments, the compression spring biases the tab 445 toward the other side of the notch 441. In other embodiments, as shown in these figures, there is no compression spring over the axle 453.

FIGS. 11A and 11B show a neutral stance of the fence 411. In the neutral stance, the tab 445 disables movement of the fence 411 among its three positions. In the neutral stance, the inner edge 452 of the tab 445 is in confrontation and abutting contact against the inner face 446 of the notch 441.

The first, second, and third depressions 437, 438, and 439 are each mis-registered, or out of registration with the first edge 13, meaning that they at most only partially overlie or oppose the first edge 13. The second depression 438 overlies a portion of the first edge 13 but also a portion of one of the notches 441. The third depression 439 overlies a portion of the first edge 13 but also a portion of the other of the notches 441.

In the neutral stance, the fence 411 is maintained in a coextensive alignment with the body 11 of the square 410; the end 431 of the fence 411 is registered with the second edge 14 of the square 410, and the end 432 is registered with the first corner 16. The flat inner edge 452 and the flat inner face 446 are in confrontation in direct abutting contact, preventing movement of the fence 411 relative to the body 11 of the square 410.

Figure 12A:
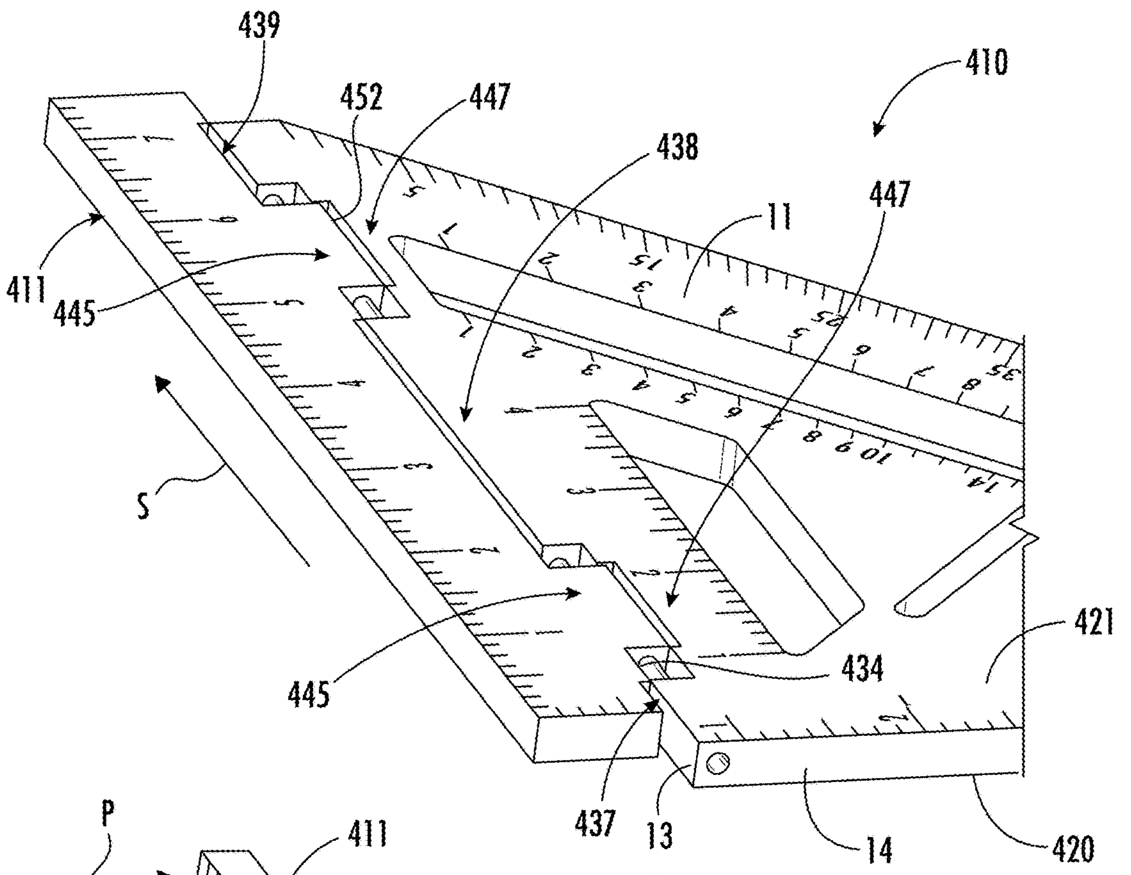
FIGS. 12A-12G are enlarged perspective views of the fence of the improved carpenter square of FIG. 11A, showing the fence moving between positions and stances.
Figure 12B:
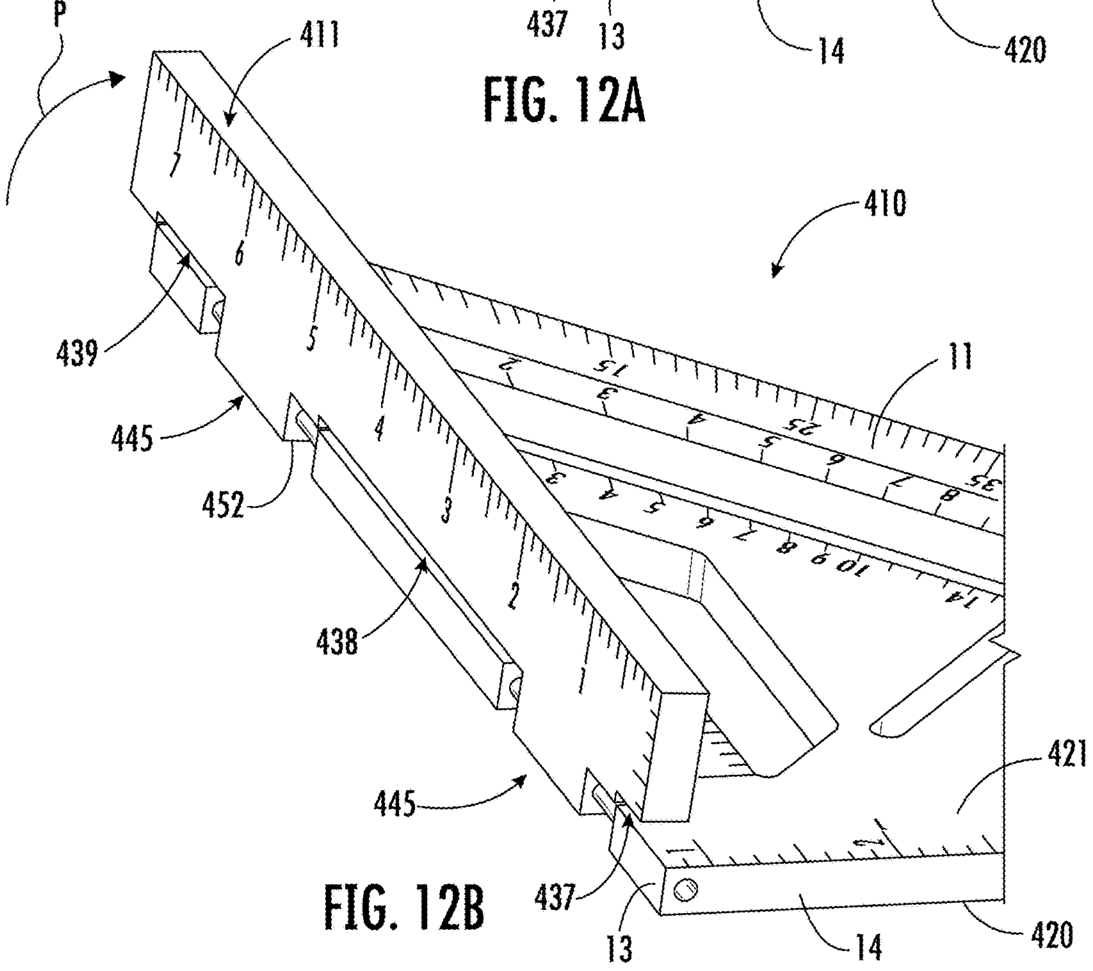

While the neutral stance disables movement of the fence 411 among its three positions, the fence 411 is nonetheless moveable out of this neutral stance into an advanced stance, as shown in FIGS. 12A and 12B. In the advanced stance, the fence 411 enables movement of the fence 411 among its three positions. To move the fence 411 and tab 445 out of the neutral stance and into the advanced stance, the carpenter simply grasps the body of the fence 411 and slides it upward with respect to the body 11 of the square 410, along the first edge 13 of the square 410, along the arrowed line S in FIGS. 12A and 12E. The tab is so mounted and moves reciprocally between the neural and advanced stances along the axle 453 and the arrowed line S. In embodiments in which a spring is fit over the axle 453, the carpenter must use sufficient force to overcome the spring force and move the fence 411 to the advanced stance.

By moving the fence 411 along the line S into the advanced stance, the carpenter registers or laterally aligns the tab 445 with the recess 447 in the notch 441. Moreover, the first depression 437 in the fence 411 is registered opposite the first edge 13 proximate the second edge 14, the second depression 438 is registered opposite the first edge 13 between the notches 441, and the third depression 439 is registered opposite the first edge 13 proximate the first corner 16. When so registered, the fence 411 is enabled for pivotal movement with respect to the body 11, as shown in FIGS. 12B and 12F along the arcuate arrowed line P. When the fence 411 is pivoted, the tab 445 enters and pivots through the recess 447, which extends sufficiently far into the body 11 such that the tab 445 can pivot entirely through it without interference. Moreover, the first edge 13 of the body 11 of the square 410 enters, moves, and pivots through the first, second, and third depressions 437, 438, and 439, which each extend sufficiently far into the body 430 of the fence 411 such that the first edge 13 can pivot entirely though them without interference. In the advanced stance of the fence 411, registration and the correspondence of the tab 445 and recess 447 enables pivotal movement of the fence 411 among the first, second, and third positions.

Figure 12C:
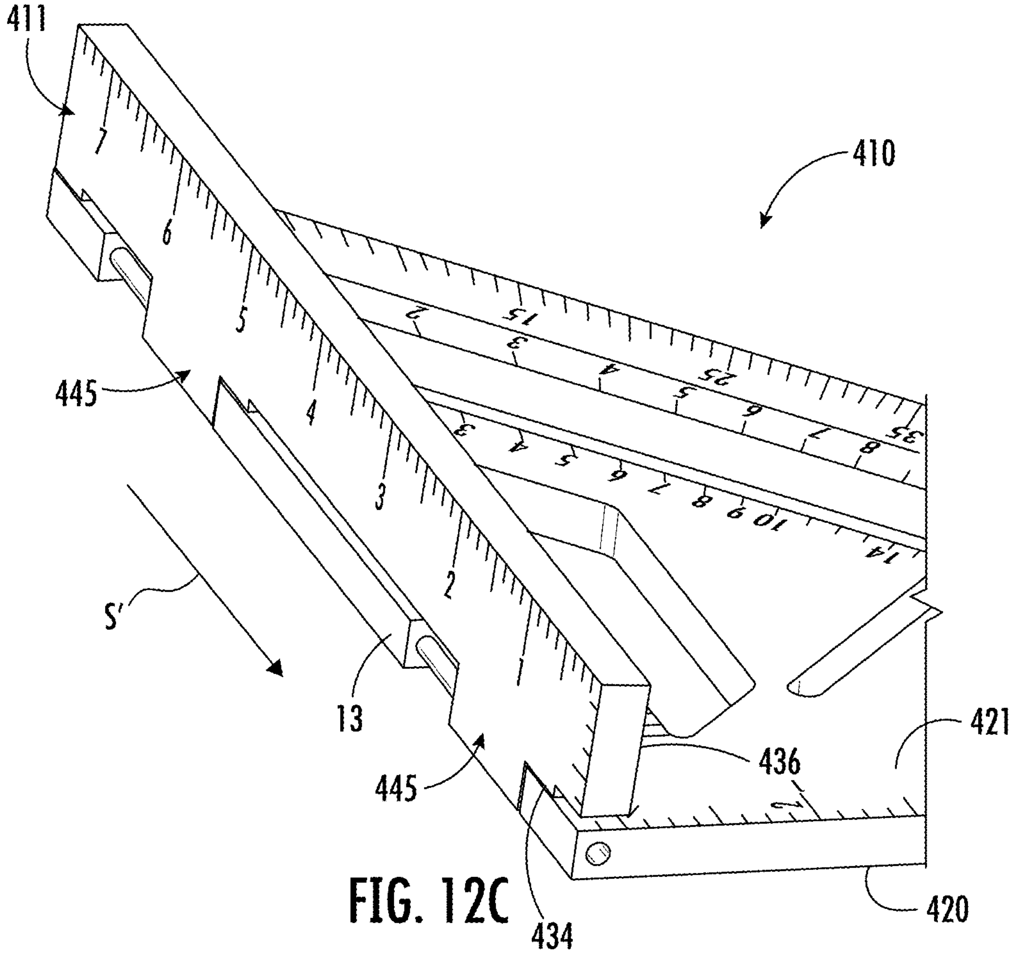
Figure 12D:
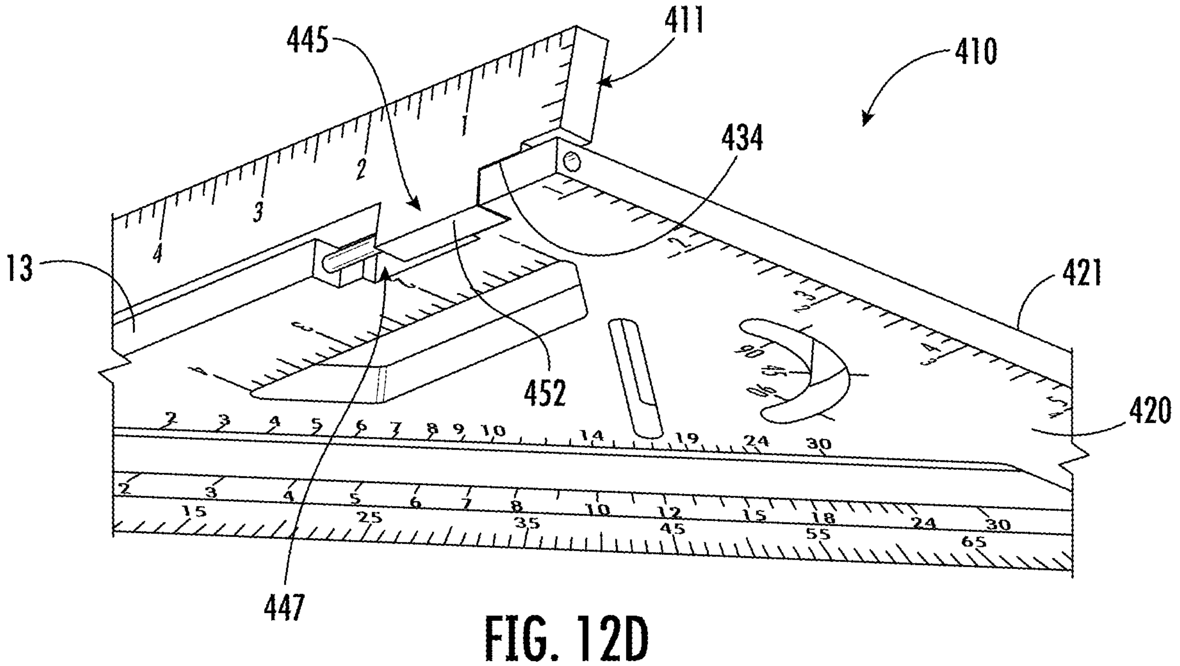
Figure 12E:
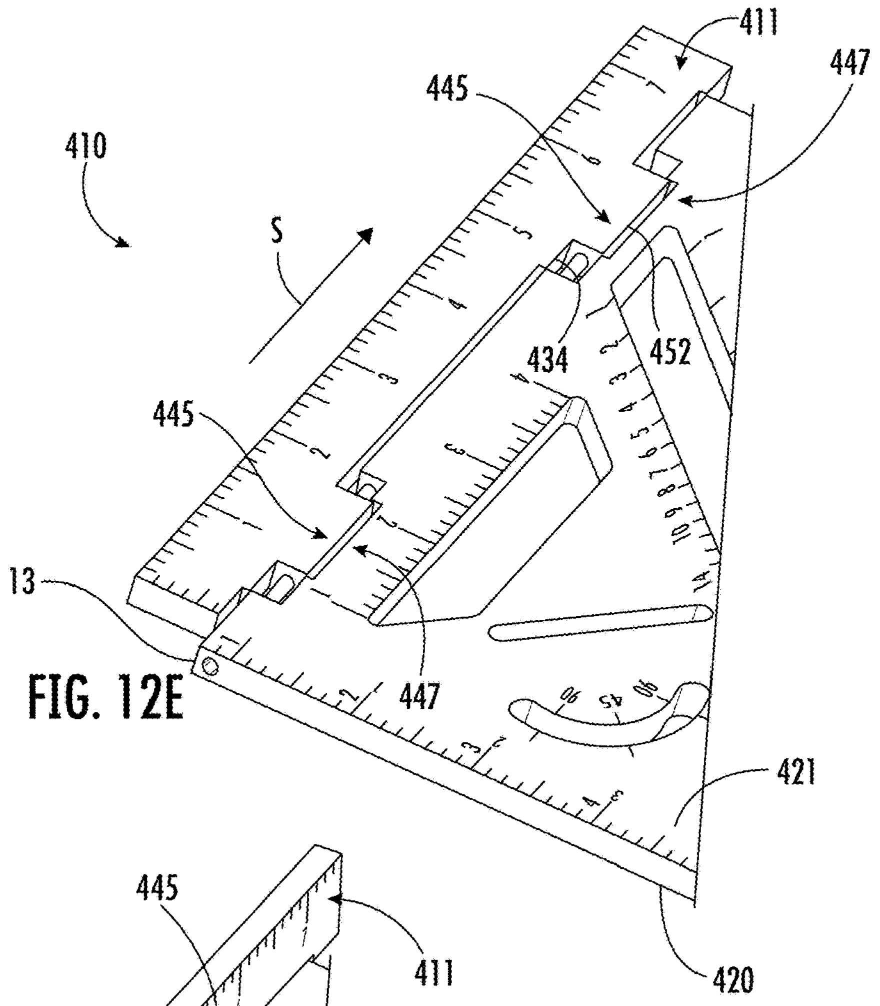
Figure 12F:
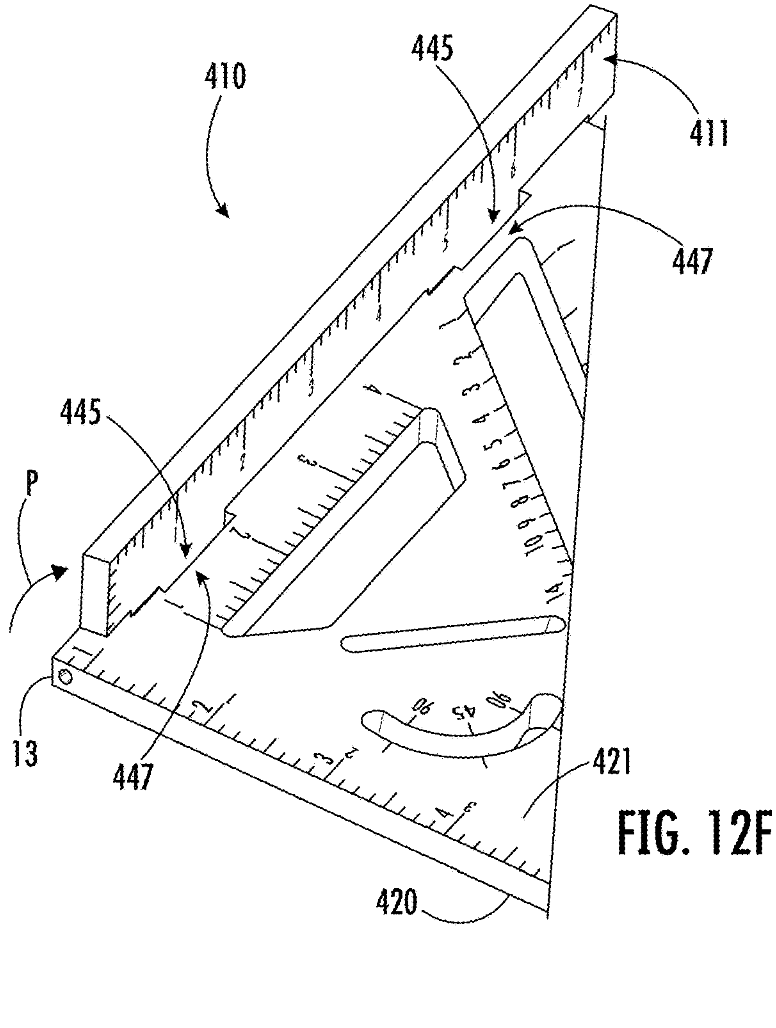
Figure 12G:
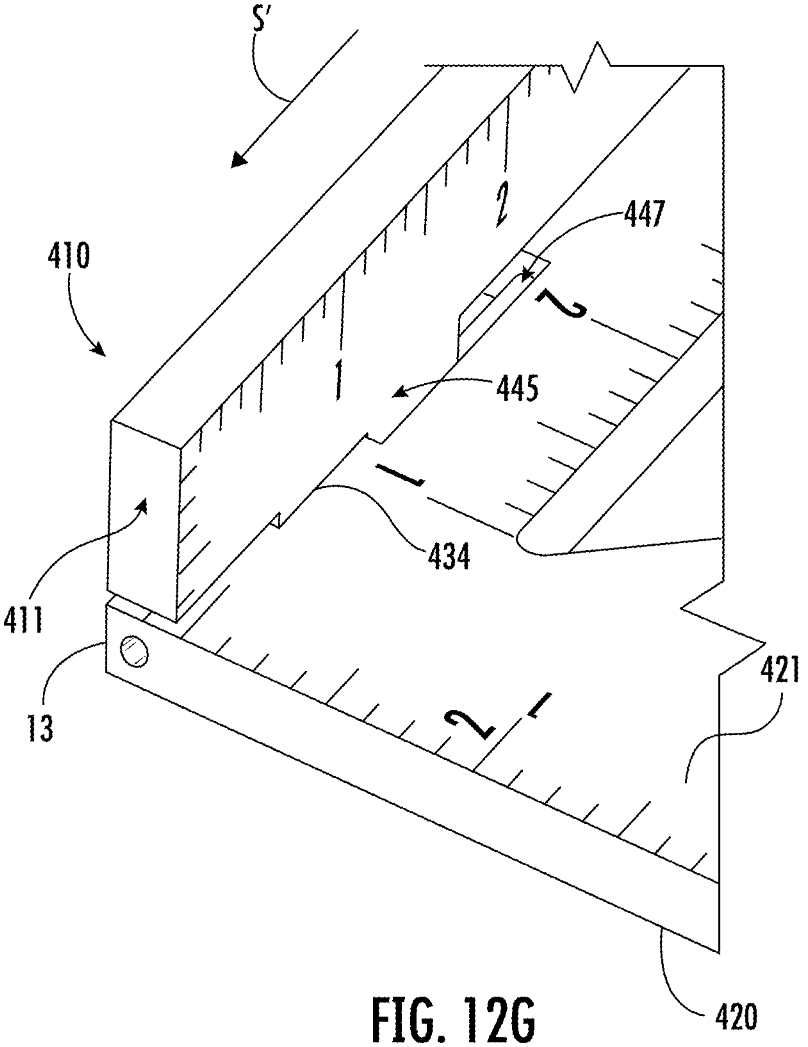

Once the fence 411 is moved to the position shown in FIGS. 12B and 12F (first position, advanced stance), the carpenter can slide the fence 411 back along the arrowed line S' in FIG. 12C, which is opposite the arrowed line S. This moves the fence 411 into the first position, neutral stance, as shown in FIGS. 12D and 12G. In the first position, the tab 445 and the inner edge 452 thereof is moved out of registration with the recess 447. The inner edge 434 of the fence 411 is placed in flat, abutting, confronting, but slidable contact with the second face 421 of the body 11 of the square 410. The fence 411 is now locked against the second face 421 in the first position, unable to pivot.

The carpenter can also move the fence 411 into the second position in a similar manner, but by instead pivoting the fence 411 in an opposite pivotal direction to the line P.

As the fence 411 moves among the first, second, and third positions, the inner edge 452 of the tab 445 moves into and out of registration with the recess 447 and out of and into contact with the flat first and second faces 420 and 421 of the body 11 of the square 410.

When the fence 411 is in the first position and the neutral stance, the inner edge 434 of the fence 411 is in flat, confronting, abutting, but slidable contact with the second face 421 of the body 11 of the square 410. The inner face 446 of the notch 441 confronts the second face 436 of the tab 445. The inner edge 434 of the fence 411 and the second face 421 of the body 11 of the square 410 confront each other. When the fence 411 is in the first position and the neutral stance thereof, the fence 411 is disabled from movement out of the first position; when it is in the advanced stance, the fence 411 is enabled for movement out of the first position.

When the fence 411 is in the second position and the neutral stance, the inner edge 434 of the fence 411 is in flat, abutting, but slidable contact with the first face 420 of the body 11 of the square 410. The inner face 446 of the notch 441 confronts the first face 435 of the tab 445. The inner edge 434 of the fence 411 and the first face 420 of the body 11 of the square 410 confront each other. When the fence 411 is in the neutral stance thereof, the fence 411 is disabled from movement out of the second position; when it is in the advanced stance, the fence 411 is enabled for movement out of the second position.

When the fence 411 is in the third position and the neutral stance, the inner edge 434 of the fence 411 is in flat, abutting, but slidable contact with the first edge 13 of the body 11 of the square 410. The inner face 446 of the notch 441 confronts the inner edge 452 of the tab 445. The inner edge 434 of the fence 411 and the first edge 13 of the body 11 of the square 410 confront each other. When the fence 411 is in the neutral stance thereof, the fence 411 is disabled from movement out of the third position; when it is in the advanced stance, the fence 411 is enabled for movement out of the third position.

When the fence 411 is in each of the first, second, and third positions, if the carpenter attempts to pivot the fence 411 to another position, the flat inner edge 434 of the fence 411 in contact with the flat faces of the body 11 prevents pivotal movement of the fence 411. Thus, the fence 411 cannot be moved unless the tab 445 is first moved out of the neutral stance and into registration with the recess 447. As such, in this embodiment, the first, second, and third positions of the fence 411 are defined, discrete, and indexed positions. In this embodiment, the fence 411 can only be placed and temporarily locked into one of these three indexed positions. Other embodiments have a fewer or greater number of positions, indexed or otherwise. The fence 411 is temporarily locked because inadvertent or accidental movement out of the position is effectively prevented, yet a carpenter can easily and purposefully move the fence 411 out of position by sliding the fence 411 upward into the advanced stance. As such, the above structural elements and features define an engagement assembly for locking and releasing the fence 411 with respect to the body 11 of the square 410.

Referring back to FIG. 11A, the square 410 also includes a bubble level 140 like that described with respect to the embodiment in the square 110 of FIG. 4.

Embodiment of FIGS. 13A-14E

FIGS. 13A-14E show an alternate embodiment of the square 410' with additional features. The square 410' is identical in almost all respects to the square 410, and as such, this description uses the same reference characters for the structural elements and features common to both embodiments. Moreover, complete depiction and detailed description of those common structural elements and features is not presented herein, as such description is redundant and unnecessary, and the reader will already understand the relevant structure of the square 410' from the above description of the square 410 and its corresponding drawings. The square 410' includes a spring detent 460 that snaps into a catch 465 to help lock the fence 411 in position.

Figure 13A:
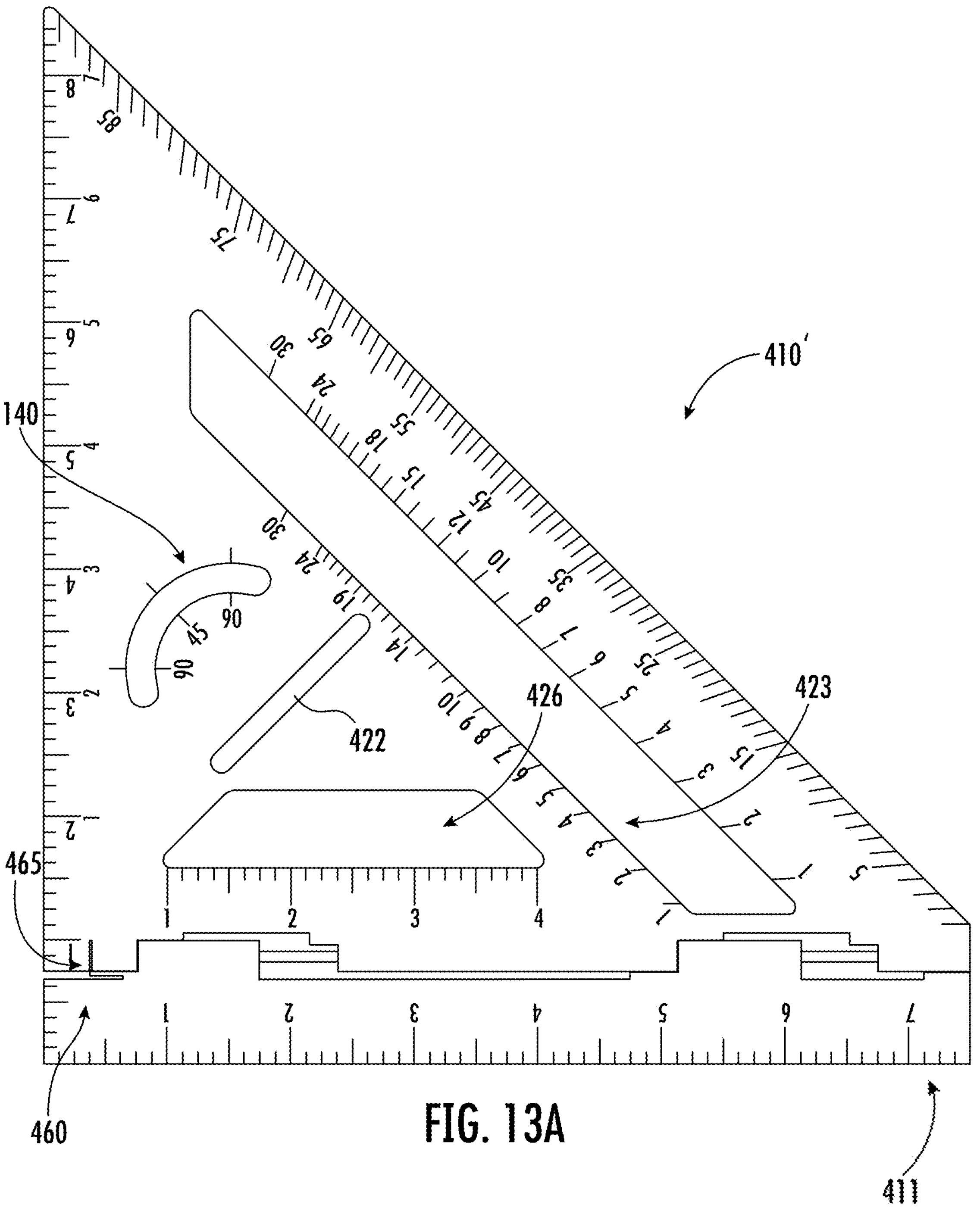
FIG. 13A is an elevation view of an embodiment of an improved carpenter square having a fence mounted for swinging movement.
Figure 13B:
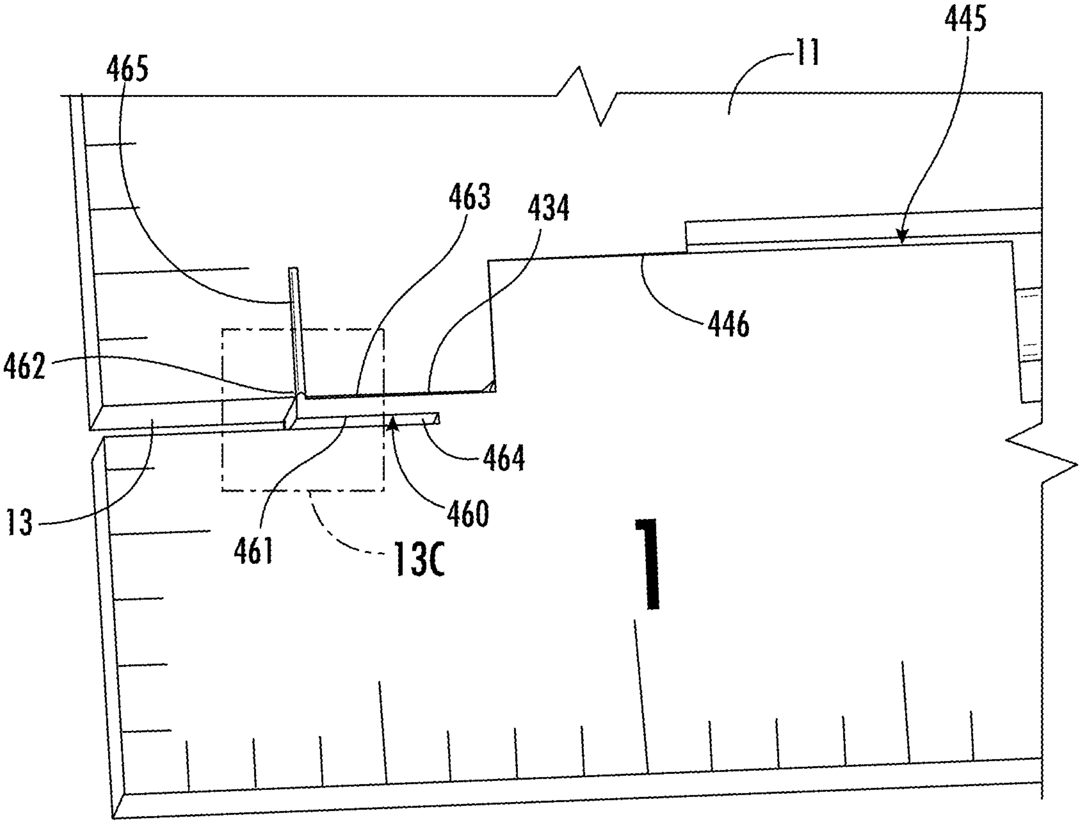
FIGS. 13B-14E are enlarged perspective views of the fence of the improved carpenter square of FIG. 13A, showing the fence moving between stances.

Turning to the enlarged view of FIG. 13B, the spring detent 460 is a small, flat, slender finger 461 extending forwardly from the tab 445, parallel to the inner edge 434. The finger 461 has an inner face 463 which is contiguous to and forms part of the inner edge 434. The finger 461 terminates in a head 462 which is directed toward the body 11 of the square 410'. The finger 461 is spaced apart from the fence by a slender gap 464 extending along the length of the finger 461. The finger 461 is springy, resilient, and capable of deforming into the gap 464 and returning to the position and arrangement shown in FIG. 13B.

Figure 13C:
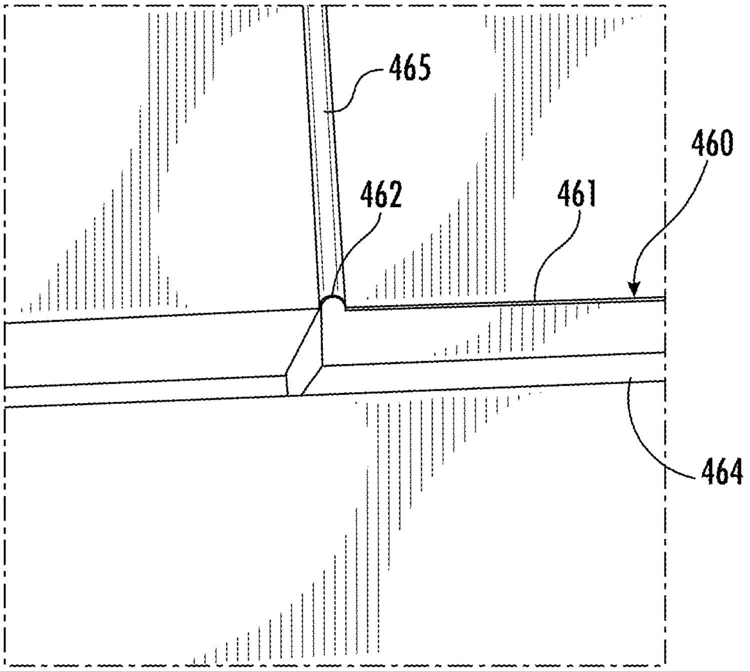

The spring detent 460 engages with the catch 465, which is a slit or notch extending into the body 11 of the square 410' from the first edge 13 thereof. The catch 465 has a width which corresponds in size to the width of the head 462 of the finger 461. As such, the head 462 snaps into and fits within the catch 465, as shown in FIG. 13C.

When the fence 411 is moved along the body 11 of the square 410' along the lines S and S' as described above, the spring detent 460 pops into and out of the catch 465. When the detent 460 is in the catch 465, it exerts a friction force acting to prevent inadvertent movement of the fence 411; a sufficient force must be applied to the fence 411 to move it along lines S. Once that force has been applied and the fence 411 is moved, the spring detent 460 pops out of the catch 465, and the fence 411 can be slid along lines S. This movement is shown in FIGS. 14A-14E.

Figure 14A:
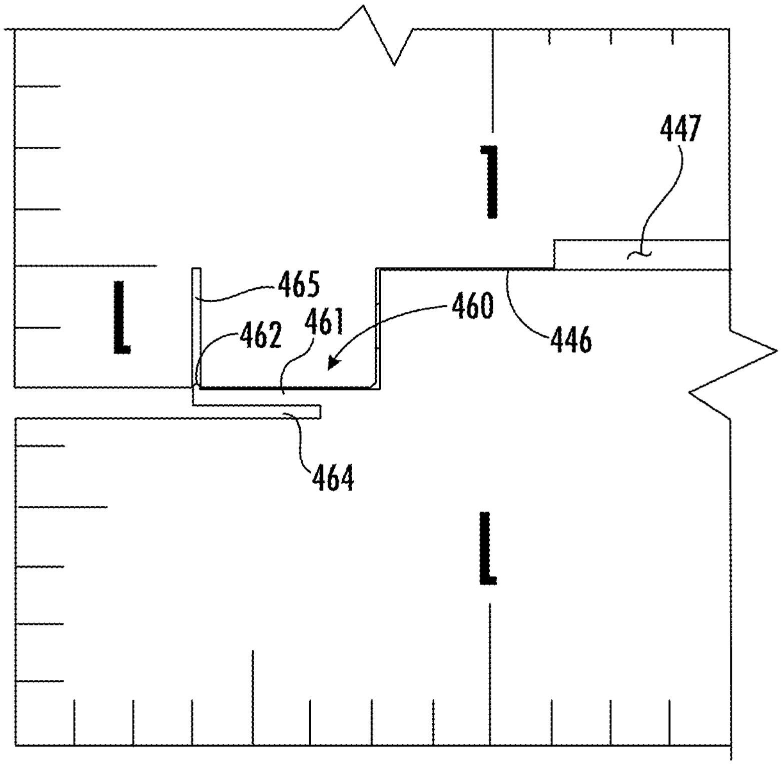

In FIG. 14A, the fence 411 is in the third position, neutral stance. The tab 445 is received in the notch 441, and the fence 411 is disabled from movement out of the third position. Further ensuring that fence 411 is not accidentally moved, the spring detent 460 is engaged with the catch 465. The fence 411 will not move out of the neutral stance unless the user applies sufficient force to bias the spring detent 460 out of engagement with the catch 465.

Figure 14B:
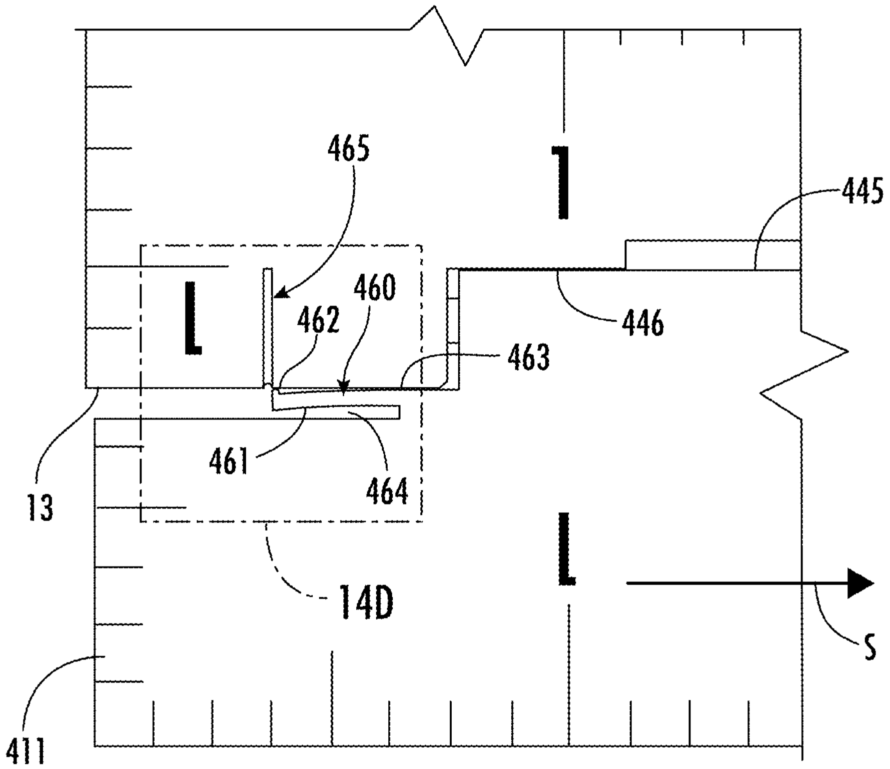
Figure 14C:
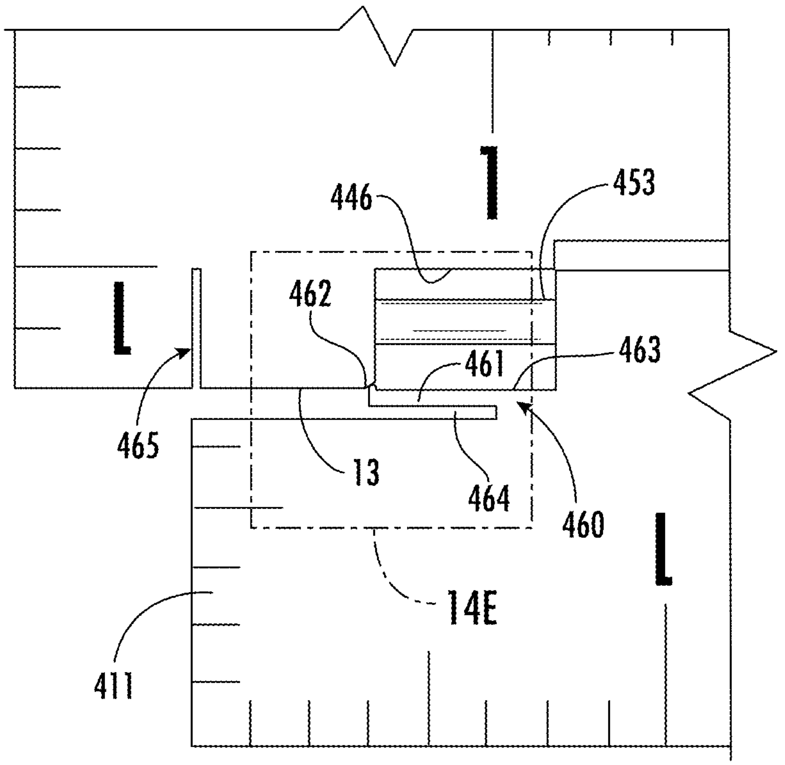
Figure 14D:
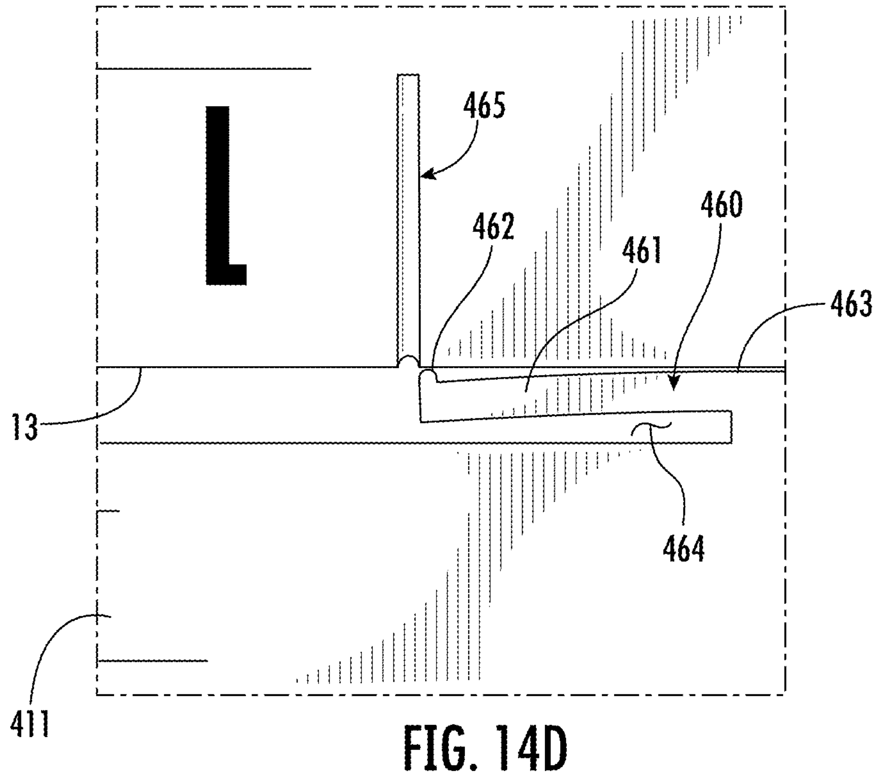

In FIG. 14B (and enlarged FIG. 14D), the user has done just that. By applying force along the line S in FIG. 14B, the user overcomes the spring force engaging the head 462 in the catch 465. The spring detent 460 is pushed back into the gap 464. The head 462 pops out of the catch 465 and begins to slide along the first edge 13. This movement continues through FIG. 14C (and enlarged FIG. 14E).

Figure 14E:
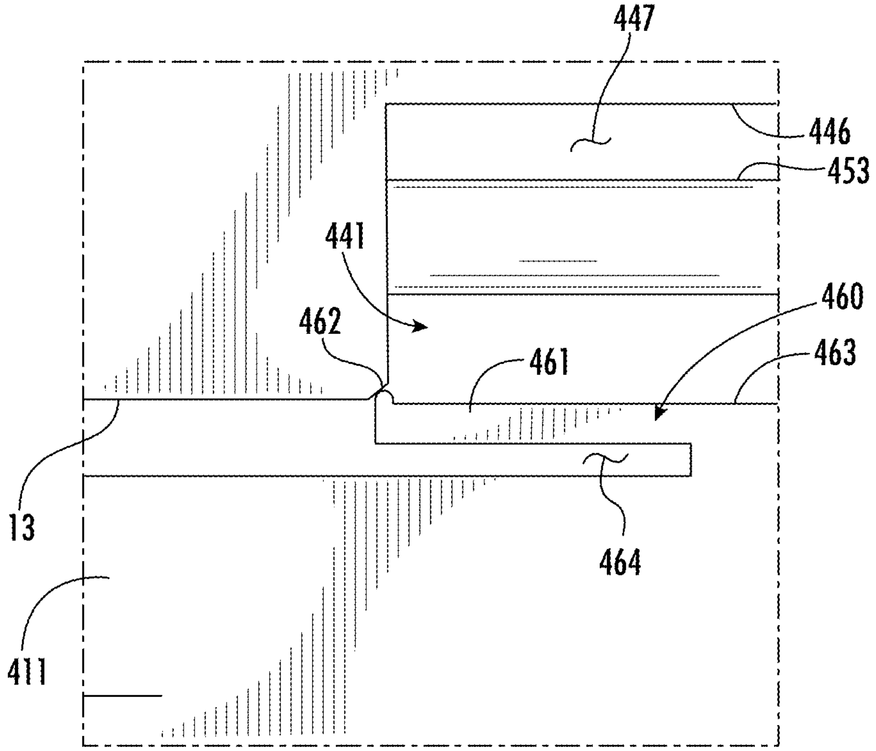

In FIG. 14E (and FIG. 14C), the head 462 is about to enter the recess 447 of the notch 441. Once it does, the head 462 will have cleared the first edge 13, and the fence 411 can be pivoted to move it into the first or second position thereof.

Figure 15A:
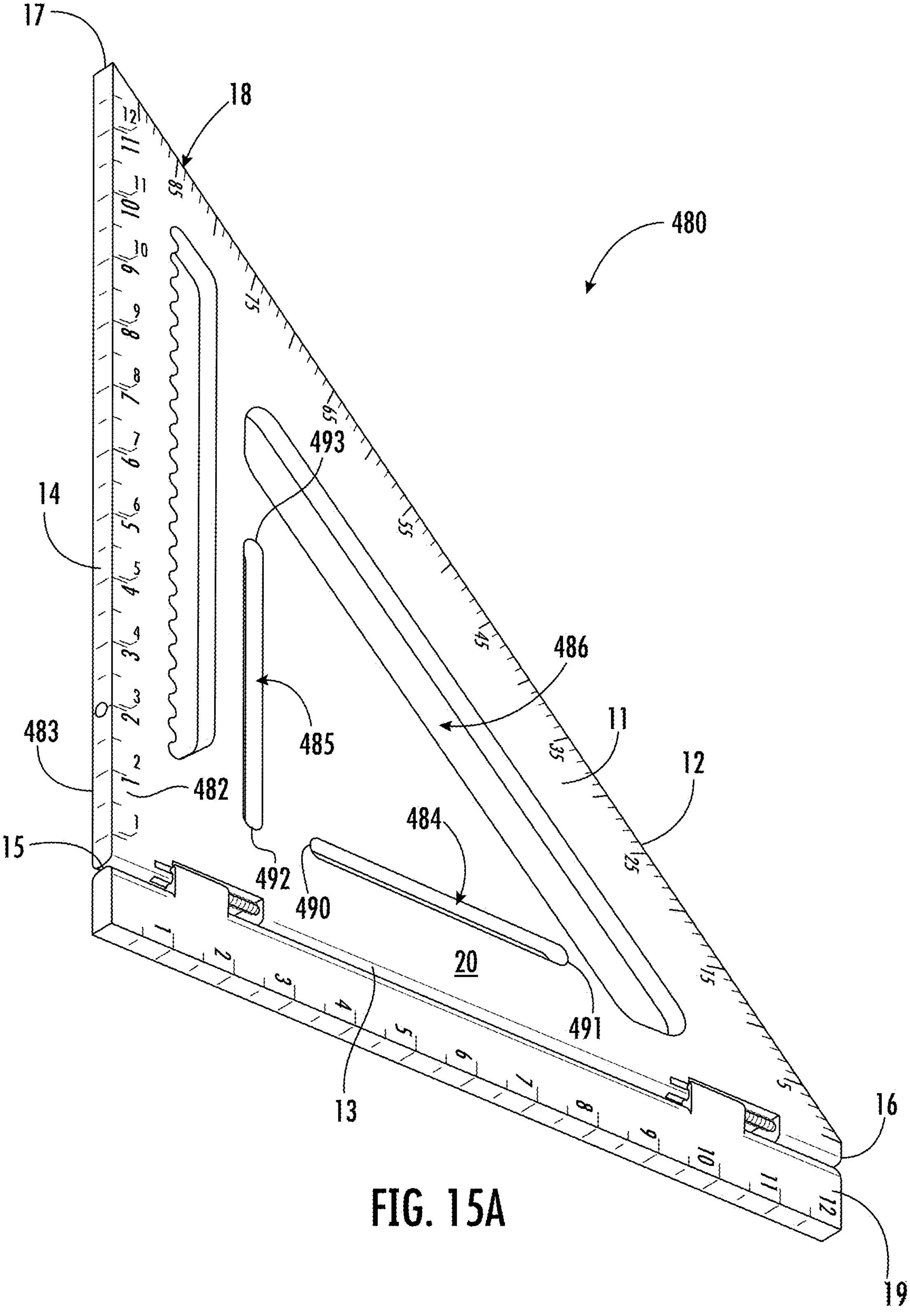
FIGS. 15A-15C are perspective and elevation views of an embodiment of an improved carpenter square having a jig block for laying out a cut pattern on a workpiece.
Figure 15B:
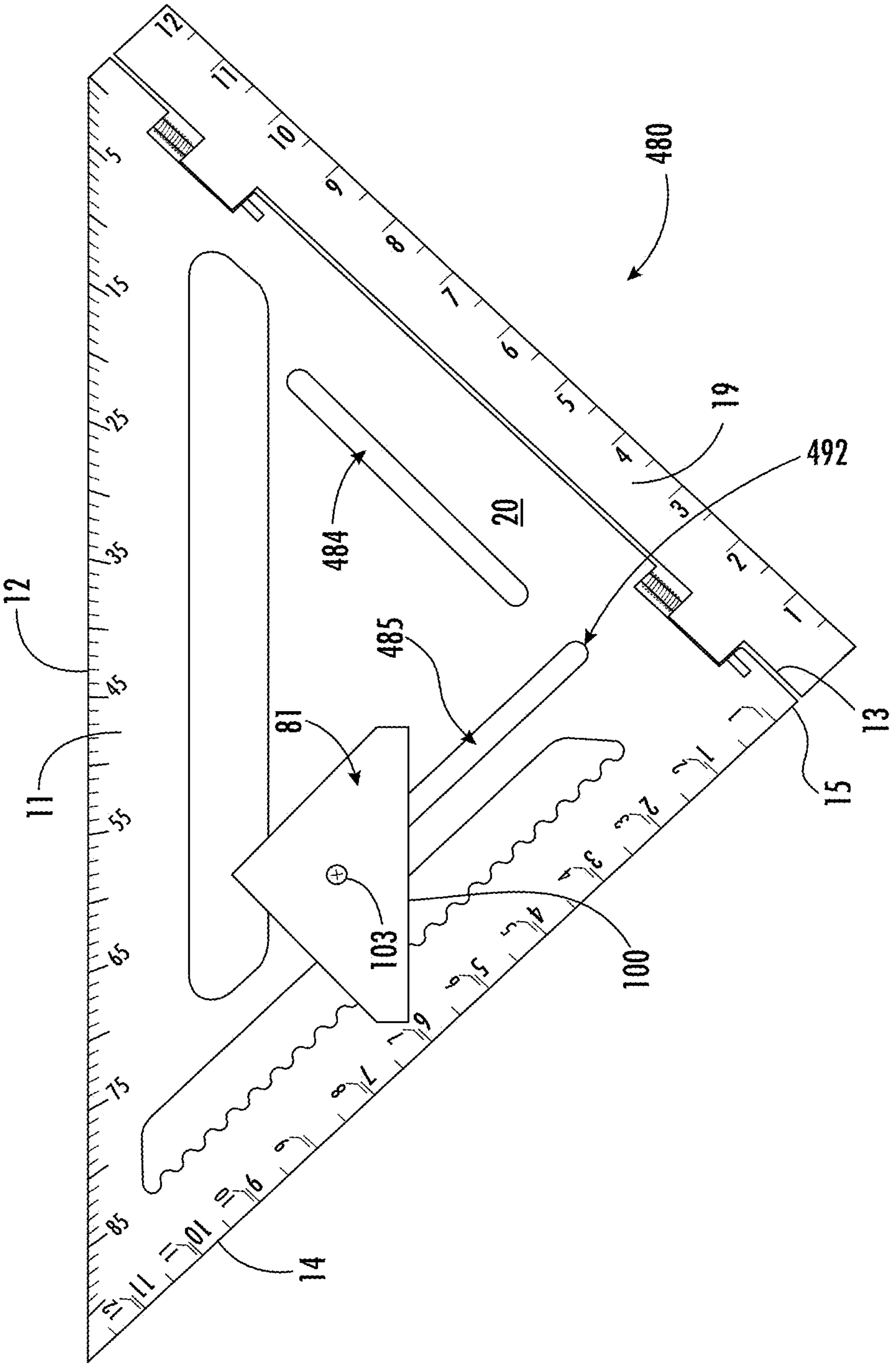
Figure 15C:
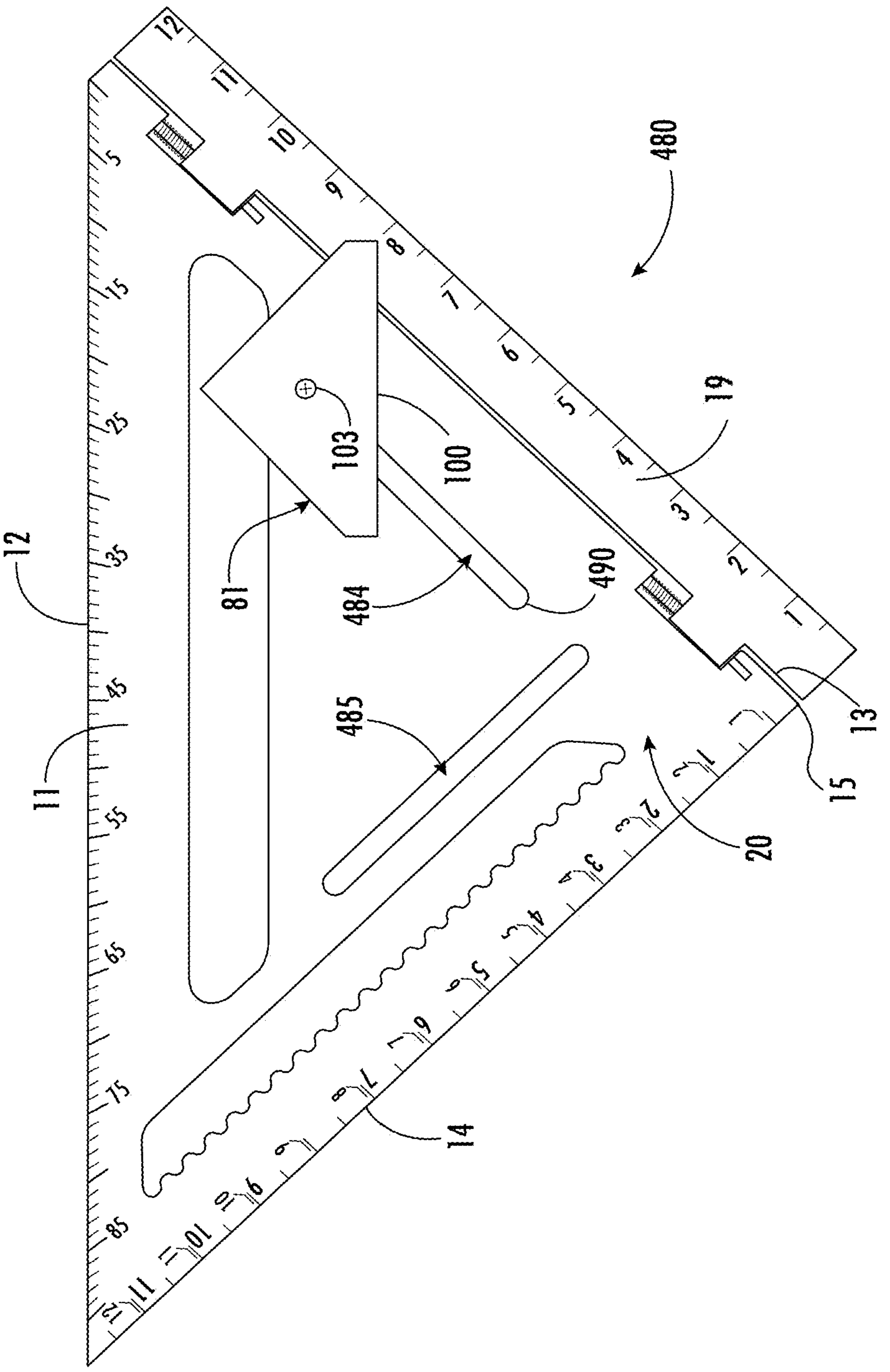

Embodiment of FIGS. 15A-15C

FIGS. 15A-15C illustrate a carpenter square 480 (hereinafter, the "square 480"). The square 480 has similarities to the above embodiments, including the square 10. As such, many of the above reference characters may be used here to identify the same or similar structural elements or features. For instance, the square 480 includes a body 11 having three edges. The square 480 has: 1) a hypotenuse edge 12 opposite a right corner 15; 2) a short first edge 13 extending between the right corner 15 and a first corner 16 formed by and between the short first edge 13 and the hypotenuse edge 12; and 3) a short second edge 14 extending between the right corner 15 and a second corner 17 formed by and between the short second edge 14 and the hypotenuse edge 12. These three edges cooperate to define a perimeter edge 18 of the body 11 of the square 480 itself. Not all structural elements and features of the square 480 are described, as the reader is well familiar with those structural elements and features from the rest of this description.

Pivoted to the first edge 13 is a fence 19. The fence 19 is a roughly rectangular piece of material coextensive to the first edge 13. The fence 19 pivots between preferably three indexed positions similar to those of the fence 19: a first position in which the fence 19 is normal to the body 11 in a first direction; a second position in which the fence 19 is normal to the body 11 in a second direction, opposite the first direction; and a third position in which the fence 19 is coplanar to the body 11. This embodiment of the carpenter square 480 can also be modified to incorporate a fence like the fence 411 in the square 410 or like the fences in other embodiments of the carpenter square.

The body 11 has a first face 482 and an opposed second face 483. The faces 482 and 483 are flat and parallel to each other, spaced apart by a width of the body 11. The faces 482 and 483 are marked with a plurality of indications and measurements. Moreover, slots and slits are formed through the body 11 entirely from the first face 482 through to the second face 483. As shown in previous embodiments, the slots and slits may have various arrangements and embodiments, and the slots and slits of those other embodiments are incorporated here and should be considered as included variations of the embodiment of the square 480 shown here.

For example, the square 480 includes first and second slits 484 and 485. The first slit 484 is parallel to and inboard of the first edge 13. The first slit 484 has a first end 490 inboard of the second edge 14 and an opposed second end 491 inboard of a hypotenuse slot 486. In other embodiments, the first slit 484 has other shapes, orientations, and arrangements, and the embodiment shown in FIGS. 15A-15C is not limiting. The second slit 485 is parallel to and inboard of the second edge 14. The second slit 485 has a first end 492 inboard of the first edge 13 and an opposed second end 493 inboard of the hypotenuse slot 486. In other embodiments, the second slit 485 has other shapes, orientations, and arrangements, and the embodiment shown in FIGS. 15A-15C is not limiting. Both of the first and second slits 484 and 485 are useful with the jig block 81 for laying out cut patterns, as shown in FIGS. 15B and 15C.

FIGS. 15B and 15C show the jig block 81 applied to the first and second slits 484 and 485, respectively. The jig block 81 converts the square 480 into a jig which quickly and easily lays out a pattern of lines for marking cuts along an edge of a workpiece, such as for making the patterned cuts of a stair stringer from a 2×12 piece of lumber.

The jig block 81 is a thin piece of material, preferably made from the same material as the body 11 of the square 480. The jig block 81 has a long edge 100. The long edge 100 is straight and uninterrupted by notches, projections, divots, or other discontinuities. The embodiment of the jig block 81 shown in these drawings has four other edges, arranged to form an irregular pentagon shape roughly similar to a baseball home plate. Other shapes are suitable, so long as the jig block 81 preferably has a long edge 100.

In use, the jig block 81 is taken up by hand and placed against one of the first and second faces 20 and 21. In FIGS. 15B, as an example only, the jig block 81 is placed against the first face 20. The jig block 81 is oriented such that its long edge 100 is generally directed toward the right corner 15 and its through-hole 101 is registered with the second slit 485. The carpenter takes a set screw 103 and passes it through the through-hole 101 and the second slit 485. In some embodiments, the set screw 103 may screw directly into the second slit 485, but, more preferably, a nut is placed over the free end of the set screw 103 and is tightened thereon, thereby binding the jig block 81 against the body 11 of the square 480.

Once the jig block 81 is attached to the face 20 of the square 480, the square 10 is taken up by hand, inverted, and placed over a workpiece such as a piece of lumber. The workpiece has an outer edge along which cuts are to be made. To place the entire face 20 of the square 480 on top of the workpiece 108, the carpenter must move the fence 19 to its third position, flat and coplanar with respect to the body 11 of the square 480.

The carpenter manipulates the square 480 so that the long edge 100 of the jig block 81 is placed in direct and continuous contact with the outer edge of the workpiece. This causes the right corner 15 and much of the body 11 of the square 480 to become disposed over the workpiece.

The carpenter then adjusts the jig block 81 to ensure the square 480 marks out a desired pattern. The carpenter will have a predetermined pattern to cut, and applying the jig block 81 to the second slit 485 enables the carpenter to cut that pattern. With the long edge 100 of the jig block 81 against the workpiece, the carpenter loosens the set screw 103 slightly so that the square 480 can be moved with respect to the jig block 81. The carpenter moves the square 480 to achieve the desired rise and run. This may require sliding the square 480 so that the jig block 81 moves up or down along the second slit 485. It may also require rotating the body 11 of the square 480 while the jig block 81 is maintained against the outer edge of the piece of lumber.

When the carpenter has aligned the square 480 on the workpiece such that the outer edge crosses the desired rise and run measurements, he tightens the set screw 103. With the square 480 properly dialed, the carpenter can now quickly lay out cut lines by marking birdsmouth cuts, translating the square 480 to make subsequent birdsmouth cuts, and repeating that process. He continues to translate the square 10 and mark successive lines, quickly laying out the needed cut pattern.

FIG. 15C shows the same square according to the above description, but with the jig block 81 applied to the first slit 484 instead of the second slit 485. The reader will understand that the above description is equally applicable with substitution of the first slit 484 for the second slit 485.

A preferred embodiment is fully and clearly described above so as to enable one having skill in the art to understand, make, and use the same. Those skilled in the art will recognize that modifications may be made to the description above without departing from the spirit of the specification, and that some embodiments include only those elements and features described, or a subset thereof. To the extent that modifications do not depart from the spirit of the specification, they are intended to be included within the scope thereof.

What is claimed is:

1. A carpenter tool comprising:

a body having a first edge and a second edge;

a bubble level carried in the body, the bubble level comprising a tubular sidewall terminating at opposed first and second closed ends;

the tubular sidewall has a first section, a second section, and a third section, wherein at least one of the first and second sections is parallel to at least one of the first and second edges;

the first and second sections are oriented normally with respect to each other, and the third section has an arcuate shape extending between the first and second sections; and the first, second, and third sections are joined to each other in fluid communication and partially filled with a fluid and a bubble in the fluid, such that the bubble is enabled to move among the first, second, and third sections freely.

2. The carpenter tool of claim 1, wherein the first and second closed ends are normal to each other.

3. The carpenter tool of claim 1, wherein the first and second closed ends are parallel to each other.

4. The carpenter tool of claim 1, wherein the sidewall is transparent and is marked with a first set of level lines on the first section and a second set of level lines on the second section.

5. A carpenter tool comprising:

a body having a first edge and a second edge;

a bubble level carried in the body, the bubble level comprising a tubular sidewall having a first section, second section, and a third section, wherein at least one of the first, second, and third sections is parallel to at least one of the first and second edges, the first and second sections are normal to each other, and the third section is joined between the first and second sections;

a fluid partially filling the tubular sidewall and a float in the fluid enabled to move freely within the tubular sidewall among the first, second, and third sections; and markings at the tubular sidewall indicating an orientation of the tool.

6. The carpenter tool of claim 5, wherein the third section is oriented obliquely with respect to both the first section and the second section.

7. The carpenter tool of claim 5, wherein the markings are on the body of the carpenter tool around the tubular sidewall.

8. The carpenter tool of claim 5, wherein the float is a bubble.

9. The carpenter tool of claim 5, wherein the float is a ball.

10. The carpenter tool of claim 5, wherein the tubular sidewall is uninterrupted.

11. A carpenter tool comprising:

a body having a first edge and a second edge;

a bubble level carried in the body, the bubble level comprising a tubular sidewall bounding an interior, the tubular sidewall including four sections formed continuously to each other;

wherein the four sections include first and second sections parallel to each other and parallel to the first edge, and third and fourth sections parallel to each other and parallel to the second edge; and wherein the first section includes opposed ends which are formed to first ends of each of the third and fourth sections, and the second section includes opposed ends which are formed to second ends of each of the third and fourth sections, such that the four sections of the tubular sidewall define the interior as having a continuous quadrilateral shape.

12. The carpenter tool of claim 11, wherein the tubular sidewall has a continuous outer edge and a continuous inner edge.

13. The carpenter tool of claim 12, wherein the continuous outer edge has a local along each of the four sections.

14. The carpenter tool of claim 12, wherein the continuous outer edge is convex along each of the four sections.

15. The carpenter tool of claim 12, wherein the continuous outer edge includes four corners.

16. The carpenter tool of claim 11, wherein the tubular sidewall is transparent and is marked with at least a first set of level lines on one of the four sections and a second set of level lines on an other of the four sections.

* * * * *